US009779557B2

(12) United States Patent
Hauser et al.

(10) Patent No.: US 9,779,557 B2
(45) Date of Patent: Oct. 3, 2017

(54) AUTOMOTIVE ACTIVITY MONITOR

(71) Applicant: Carfit Corp., Kenmore, WA (US)

(72) Inventors: Peter Edmund Heinrich Hauser, Bellingham, WA (US); Henri-Nicolas Olivier, Hong Kong (CN)

(73) Assignee: Carfit Corp., Kenmore, WA (US)

( * ) Notice: Subject to any disclaimer, the term of this patent is extended or adjusted under 35 U.S.C. 154(b) by 5 days.

(21) Appl. No.: 15/233,840

(22) Filed: Aug. 10, 2016

(65) Prior Publication Data

US 2017/0053460 A1 Feb. 23, 2017

Related U.S. Application Data

(60) Provisional application No. 62/206,560, filed on Aug. 18, 2015.

(51) Int. Cl.
*G07C 5/08* (2006.01)
*G07C 5/00* (2006.01)
(Continued)

(52) U.S. Cl.
CPC ............. *G07C 5/008* (2013.01); *B60W 50/00* (2013.01); *G07C 5/04* (2013.01); *G07C 2205/02* (2013.01); *H04L 67/12* (2013.01)

(58) Field of Classification Search
CPC combination set(s) only.
See application file for complete search history.

(56) References Cited

U.S. PATENT DOCUMENTS 6,268,794 B1 * 7/2001 Tzanev ................. B62J 27/00
340/427
6,330,499 B1 12/2001 Bao-Luo et al.
(Continued)

FOREIGN PATENT DOCUMENTS

JP 2001154727 6/2001
KR 1020050019411 3/2005
(Continued)

OTHER PUBLICATIONS

International Search Report and Written Opinion for International Application No. PCT/US2016/046612, dated Nov. 17, 2016, 28 pages.

*Primary Examiner* — Edward J Pipala
(74) *Attorney, Agent, or Firm* — John W. Branch; Lowe Graham Jones PLLC

(57) ABSTRACT

Embodiments are directed to monitoring vehicle operations. If sensor information based on sensor data captured by a sensor computer installed in a vehicle is provided to a server by a client computer. An analysis engine may compare the sensor information to vehicle models associated with the vehicle. One or more reports based on the comparison may be distributed registered subscribers. A modeling engine may be employed to update the vehicle models based on the sensor information. The one or more updated vehicle models may be communicated to one or more client computers that may be associated with one or more users. The sensor information may be obtained from the sensor computer. Sensor information may include metrics associated with the operation of the vehicle. Metrics may include timestamps, road shocks, straight line driving, harshness, acceleration, deceleration, trip length, travel speeds, or the like.

30 Claims, 34 Drawing Sheets

(51) Int. Cl.
*G07C 5/04* (2006.01)
*B60W 50/00* (2006.01)
*H04L 29/08* (2006.01)

(56) References Cited

U.S. PATENT DOCUMENTS

| | | |
|---|---|---|
| 9,173,052 B2 | 10/2015 | Hauser et al. |
| 2007/0005202 A1 | 1/2007 | Breed |
| 2008/0004840 A1 | 1/2008 | Pattipatti et al. |
| 2014/0344375 A1 | 11/2014 | Hauser et al. |
| 2016/0112216 A1* | 4/2016 | Sargent .................. H04L 12/66 370/328 |
| 2016/0133066 A1* | 5/2016 | Lavie ....................... G07C 5/08 701/31.4 |

FOREIGN PATENT DOCUMENTS

| | | |
|---|---|---|
| WO | 2014/189676 A1 | 11/2014 |
| WO | 2015/148365 A1 | 1/2015 |

* cited by examiner

| Tyre characteristics | Tyre Operating Conditions | Environmental Conditions | Road Surface Characteristics |
|---|---|---|---|
| Construction:<br>cross-ply<br>bias-belted<br>radial<br>Tread:<br>compound<br>pattern<br>depth<br>fragmentation | Inflation pressure<br>Load<br>Speed<br>Slip angle<br>Camber angle<br>Driving/braking force<br>Wheel/axle configuration | Temperature<br>Water<br>Snow<br>Ice | Micro-texture<br>Macro-texture<br>Mega-texture<br>Unevenness |

Fig. 11

| Pavement type and aggregate size | Texture data | | | | Fuel consumption (ml/10 km) | | |
|---|---|---|---|---|---|---|---|
| | Micro scale*) 0-9 | Macro $L_{tx}$(*) dB | Mega $L_{tx}$() dB | Short-wave unevenness $L_{tx}$() dB | 50 km/h | 60 km/h | 70 km/h |
| Dense Asphalt 0/8 | 6 | 48.0 | 45.0 | 54.4 | 695 | 676 | 736 |
| Dense Asphalt 0/16 | 3 | 50.2 | 48.5 | 54.0 | 714 | 692 | 732 |
| Cement concrete 0/25 | 2 | 52.0 | 56.3 | 58.6 | 720 | 710 | 756 |
| Surface Dressing 4/8 | 7 | 53.9 | 50.2 | 56.1 | 696 | 701 | 781 |
| Surface Dressing 12/16 | 6 | 63.9 | 60.3 | 58.8 | 708 | 725 | 788 |

*) Estimated microtexture on a scale 0 – 9 where 0 = perfectly smooth and polished and 9 = very harsh

**) The following wavelength ranges were used in the study:
- $L_{M1}$: level of macrotexture, range 2 to 50 mm
- $L_{M2}$: level of megatexture, range 63 to 500 mm
- $L_{U}$: level of shortwave unevenness, range 0.65 to 3.15 m Table 3 - Texture data and fuel consumption for different Pavement Types
The values are normalised with respect to speed and temperature. [9]

*Fig. 12*

AUTOMOTIVE ACTIVITY MONITOR

CROSS-REFERENCE TO RELATED APPLICATIONS

This application is a Utility patent application based on a previously filed U.S. Provisional Patent Application U.S. Ser. No. 62/206,560 filed on Aug. 18, 2015, the benefit of the filing date of which is hereby claimed under 35 U.S.C. §119(e) and which is further incorporated by reference in its entirety.

TECHNICAL FIELD

The present invention relates generally to vehicle monitoring, and more particularly, but not exclusively, to diagnosing issues identified by monitoring vehicle activity using a plurality of sensors.

BACKGROUND

Currently, multiple systems exist that directly monitor diagnostic information for vehicle through one or more diagnostic ports that may use one or more diagnostic reporting protocols, such as, On Board Diagnostic-II (OBD2). This information, while available, may be limited in that the diagnostics ports only provide data from sensors that are mounted in the vehicle, and may not provide accelerometer information real-time, at sufficiently high reporting rates, nor do vehicles currently have real-time accelerometers at the steering wheel. Further, studies have also shown that as vehicles age or if there are mechanical issues with alignment, wheel balancing, engine mounts, tire inflation, vehicle suspension, engine tuning, or the like, the noise and vibrations in the vehicle tend to change and increase. Various vibrations, steering wheel positions, or the like, may generally point to issues with the vehicle that could impact fuel efficiency, comfort, and the safety of the vehicle's occupants. In some cases, it is difficult for sensors currently installed in vehicles to update the standard diagnostic systems (e.g., OBD2 compliant systems) with sufficient vibration/motion related signals to identify unique vibrations and to correlate them with potential issues. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein:

FIG. 11 illustrates a Factors Affecting the Rolling Resistance of Vehicles in accordance with at least one of the various embodiments;

FIG. 12 illustrates a Road Texture and Fuel Consumption in accordance with at least one of the various embodiments;

DETAILED DESCRIPTION OF THE INVENTION

Figure 1:
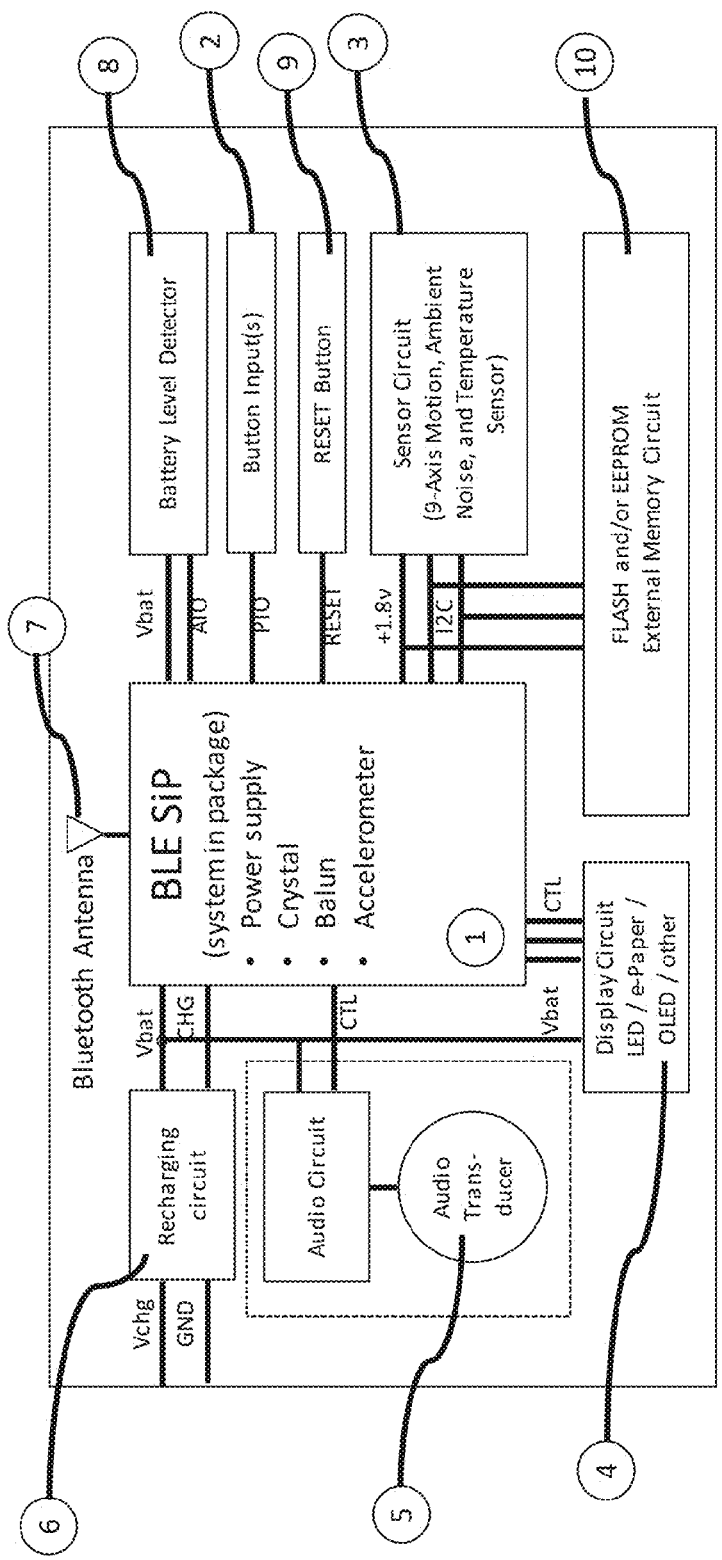
FIG. 1 illustrates the logical architecture of a Connected BLE Vehicle Activity Monitor (e.g., sensor computer) in accordance with at least one of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

Briefly stated embodiments are directed to a system for monitoring vehicle operations that may include one or more network computers, one or more client computers (e.g., including, mobile computers, mobile telephones, or the like), and one or more sensor computers. In at least one of the various embodiments, if sensor information based on sensor data captured by the sensor computer installed in a vehicle is provided to the network computer, the network computer may perform various actions.

In at least one of the various embodiments, the network computer may store the sensor information in a memory. In at least one of the various embodiments, the network computer may employ an analysis engine to compare the sensor information to one or more vehicles models such that the one or more vehicle models are associated with the vehicle. In at least one of the various embodiments, the network computer may provide one or more reports based on the comparison. And, the network computer may distribute the one or more reports or notifications to one or more registered subscribers.

In at least one of the various embodiments, the network computer may employ a modeling engine to update the one or more vehicle models based in part on the sensor information. In at least one of the various embodiments, the network computer may communicate the one or more updated vehicle models to one or more client computers that may be associated with one or more users.

In at least one of the various embodiments, the network computer may retrieve the sensor data from the client computer that the client computer obtained from the sensor computer. And, in at least one of the various embodiments, the network computer may store the sensor data in a datastore.

In at least one of the various embodiments, the network computer may map one or more portions of the signal information to one or more trouble codes such that the one or more trouble codes may be associated with one or more vehicle systems that generate vibrations, including one or more of tires, wheels, alignment, suspension, engine, electric motor, brakes, or the like.

In at least one of the various embodiments, the client computer may obtain the sensor information from the sensor computer. In at least one of the various embodiments, the sensor information may include one or more metrics associated with the current operation of the vehicle. The metrics may include one or more of, timestamps, road shocks, straight line driving, harshness, acceleration, deceleration, trip length, hard starts, hard stops, accidents, highway driving, city driving, being stopped, enroute, travel speeds, or the like, or combination thereof.

In at least one of the various embodiments, drive metrics may be designed to map to existing Usage Based Insurance (UBI) standards or other similar standards.

In at least one of the various embodiments, the client computer may provide the sensor information the network computer.

In at least one of the various embodiments, the client computer may employ a chat bot engine to obtain one or more chat inputs from one or more users of the vehicle such that the one or more chat inputs are associated with one or more monitoring operations.

In at least one of the various embodiments, the client computer may update one or more social networks that may be associated with a user of the vehicle based on trip information associated with the operation of the vehicle.

In at least one of the various embodiments, the sensor computer may capture the sensor data. In at least one of the various embodiments, the sensor computer may capture the sensor data during operation of the vehicle. And, in at least one of the various embodiments, the sensor computer may compare the sensor data to one or more vehicle baselines models. Accordingly, in at least one of the various embodiments, if the comparison indicates an anomaly, the sensor computer may communicate the sensor information to the client computer such that the sensor information may be based in part on the sensor data captured by the sensor computer.

In at least one of the various embodiments, the sensor computer may be installed on the steering wheel of the vehicle. Also, in at least one of the various embodiments, the sensor computer, or portions of the sensor computer, may be installed at other positions within a vehicle. For example, in some embodiments, the sensor computer may be installed to form a rigid connection with the chassis of the vehicle, with the engine, or with any other components whose specific vibration or motion characteristics are of interest. In some embodiments, the sensor computer may be integrated with one or more other vibration sensors located within the vehicle. Accordingly, in some embodiments, the sensor computer may be located in one position while one or more sensors are located at other positions separate from the sensor computer.

Connected Bluetooth Low Energy Vehicle Activity Monitor Description

One embodiment of the Connected Bluetooth Low Energy Vehicle Activity Monitor may be found in FIG. 1. In this embodiment, the automotive activity monitor platform leverages a plurality of sensors (3) coupled with a Bluetooth Low Energy (BTLE) radio System in Package or SiP (1) to monitor the status and activity of a vehicle without requiring a physical connection to an OBD2 port.

The BTLE SiP (1) may manage a plurality of interface including but not limited to a Button and Input Interface (2), Sensor Circuit (3) containing a plurality of sensors such as a 9-axis accelerometer, ambient noise sensor, and temperature sensor. Furthermore, this system may support a Display (4), and Audio Transducer (5).

The BTLE SiP (1) may receive stable power directly from a replaceable battery, or from a Recharging Circuit (6) that may use as its power source a rechargeable battery. Furthermore, the Recharging Circuit (6) may receive power from one or more external sources such as solar power, 5 v power via the USB port in the vehicle, 12 v power from the vehicle's wiring or a cigarette lighter, or inertial power through energy harvesting.

This Recharging Circuit (6) may also provide the current vehicle battery information to the chip via a Battery Level Detector (8). The BLE SiP (1) may contain an internal or external balun, or may be connected to the Antenna (7) via an external RF matching circuit that matches the digital radio's output to the Antenna (7) thus providing an optimized RF connection.

Figure 2:
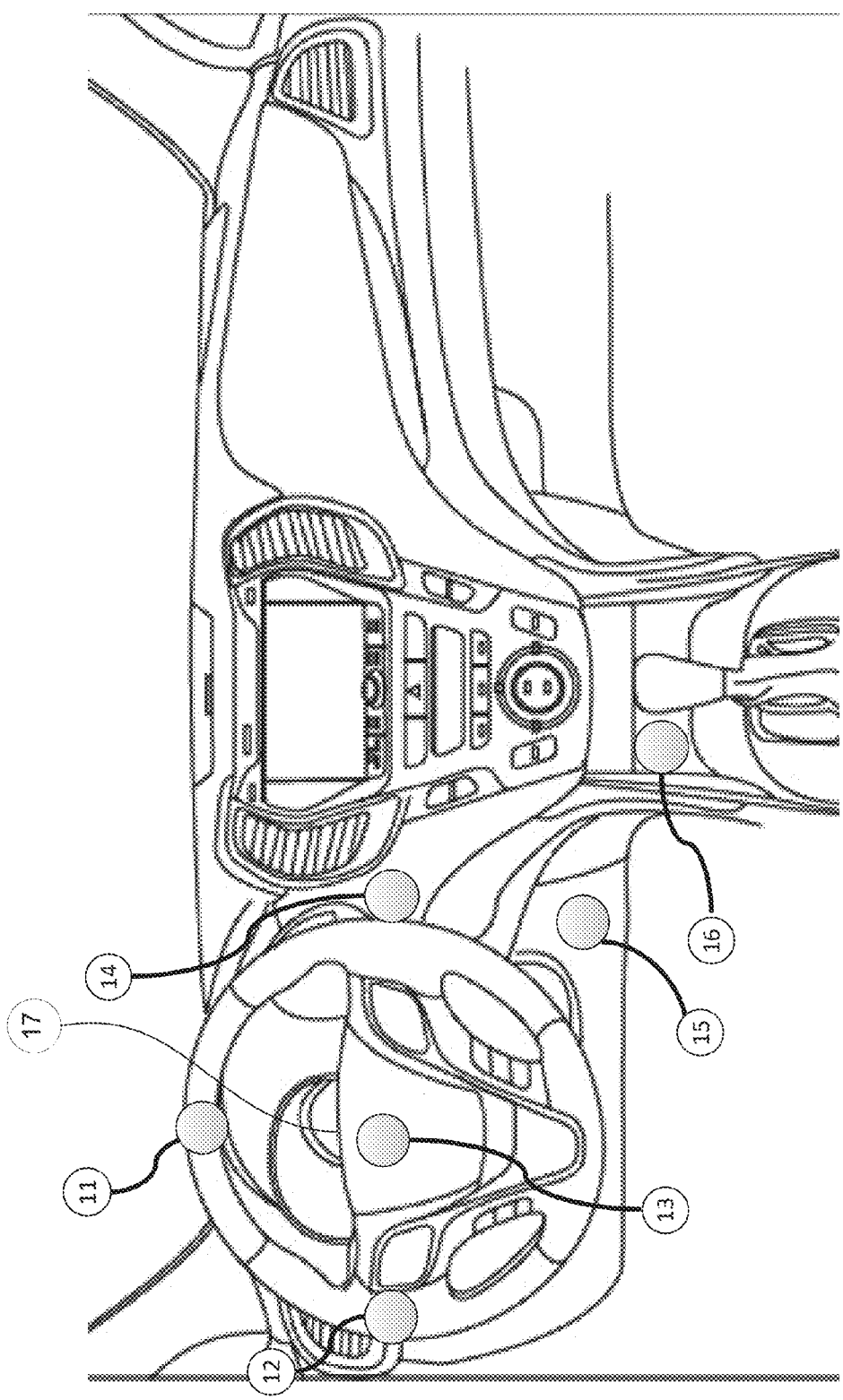
FIG. 2 illustrates an in-vehicle placement of the connected BLE Vehicle Activity Monitor in accordance with at least one of the various embodiments.

By mounting the Vehicle Activity Monitor hardware in an ideal location inside the vehicle as shown in FIG. 2 such as directly on the steering wheel (11, 12, 13), or on the steering column (17), the sensor may be used to directly measure the angle of the steering wheel in real-time, as well as vibrations that translate exclusively through the steering column and may be felt by the user under different driving conditions.

Furthermore, as shown in FIG. 2, placement directly on the steering wheel (11, 12, 13, 17) or on the dashboard (14, 16) also offers an ideal location from which to provide a plurality of controls that may be used to access or manage apps that are running on mobile devices today such as mobile phones or tablets.

Unlike the Connected Bluetooth Low Energy Vehicle Activity Monitor, OBD systems must be mounted inside the OBD2 port, which is hidden behind a flap under the dashboard of most vehicles (15). Furthermore, the OBD2 connector may be suspended on wires and thus not provide direct translation of vibrations to the plug-mounted device sensors.

As a result of its convenient mounting locations (11, 13, 14, 16, 17), the Connected Bluetooth Low Energy Vehicle Activity Monitor may support an LED or e-Paper Display, or the like.

In at least one of the various embodiments, Connected Bluetooth Low Energy Vehicle Activity Monitor may be considered to be sensor computers as described below in FIG. 19.

Connected BLE Vehicle Activity Monitor User Interface

Figure 3:
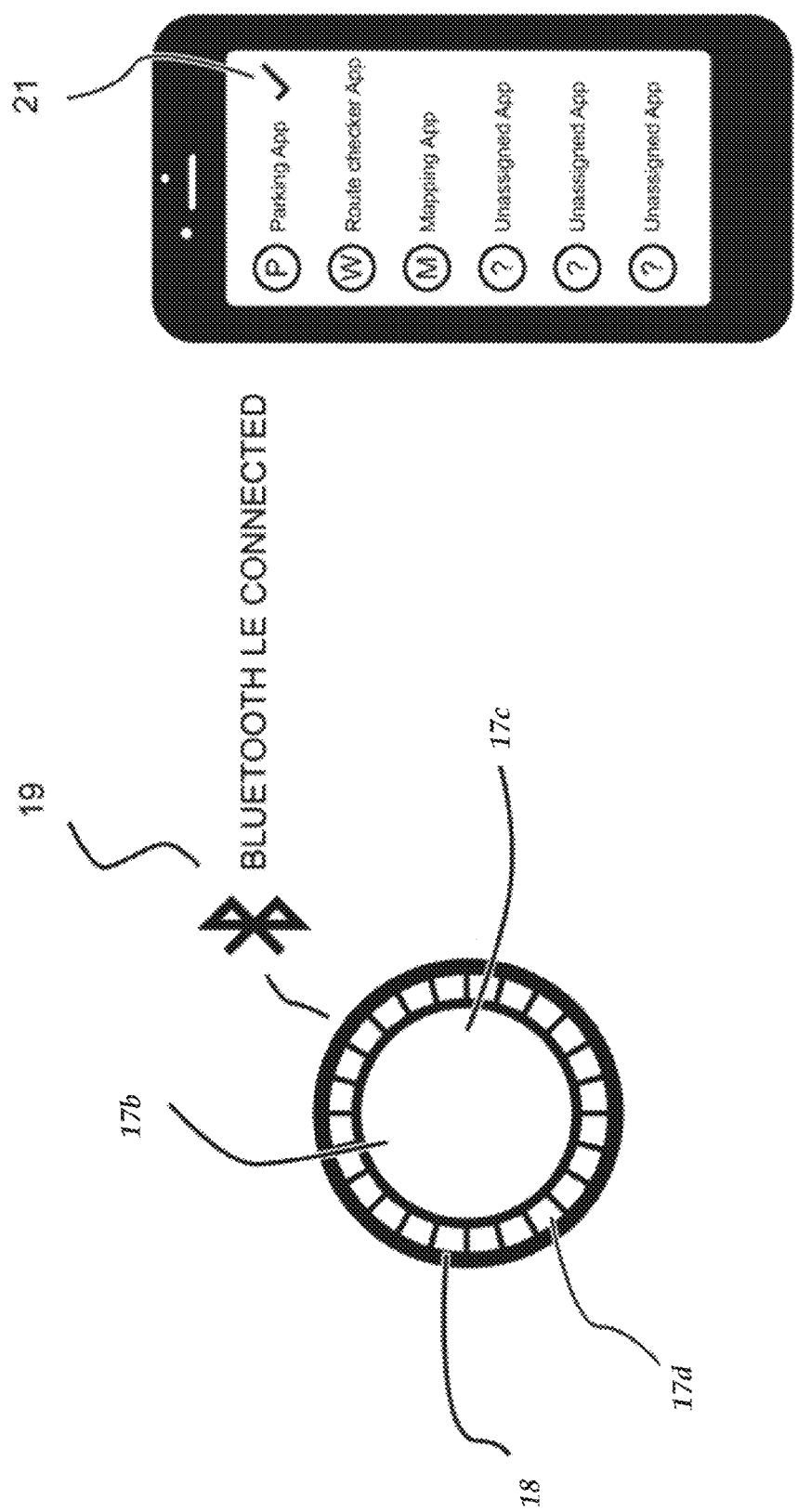
FIG. 3 illustrates a Simple Connected Vehicle Activity Monitor User Interface in accordance with at least one of the various embodiments.

One embodiment of the Connected BLE Vehicle Activity Monitor's user interface is shown in FIG. 3. In this embodiment, a Main Button (17*b*) and LED (18) interface are used to interact with the user. The Main Button (17*b*) may serve as a trigger to launch one or more features of the associated app on a mobile device (20) via the BLE connection (19). It may also be used to trigger a plurality of 3rd party apps (21) that reside on the mobile device either my sending messages to the cloud, which then trigger and launch the 3rd party app (21), directly via APIs, or through other means based-on the available mobile phone's OS features. Further, in some embodiments, Connected BLE Vehicle Activity Monitors (e.g., sensor computers) may include button 17*c*, as well as, light ring 17*d*. In some embodiments, button 17*c* may be arranged to enable a user to press to provide user input directly on the Connected BLE Vehicle Activity Monitor. Likewise, in some embodiments, light ring 17*d* may be a LED based ring that may be arranged to provide visual cues to a user.

Figure 4:
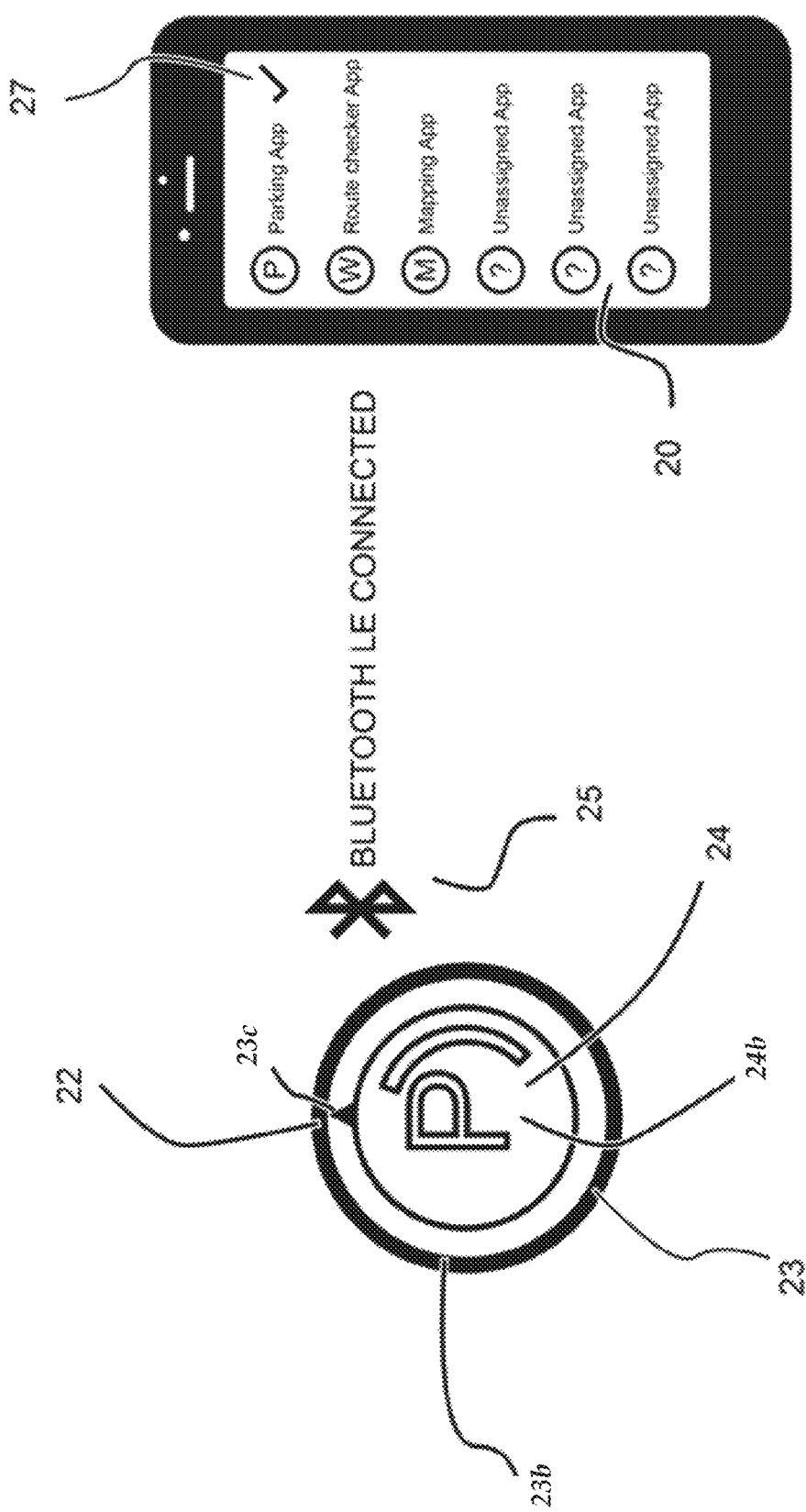
FIG. 4 illustrates a Rich Display Connected Vehicle Activity Monitor User Interface in accordance with at least one of the various embodiments.

In another embodiment of the Connected BLE Vehicle Activity Monitor shown in FIG. 4, the Connected BLE Vehicle Activity Monitor may support a rich display (24). In this embodiment, the Connected BLE Vehicle Activity Monitor may also be equipped with a rotating bezel, dial, or detented rotating switch system (23). In some embodiment, there may be an external bezel rings, such as, bezel ring 23*b*, and an indicator point, such as, indicator point 23*c*. In this embodiment, the switch may be turned to various positions as indicated by the positional indicator (22) and indicator point 23*c*. When turned, the bezel (23) may show the logo (24*b*) for a plurality features or 3rd party apps on the display (24). The system may also transmit information to the app (26) via the BLE link (25) which may then change the selector in the Connected BLE Vehicle Activity Monitor app (26) on the mobile phone to point to a specific app (27).

Because of how BLE devices are handled on the mobile phones today, the apps that are being launched need not be actively running on the mobile device at the time where the button is pressed. Instead, due to the Over the Top (OTT) nature of the Connected BLE Vehicle Activity Monitor app (20, 26), and because of its Bluetooth Low Energy connection.

Data Aggregation

One app that may be launched by the Connected Bluetooth Low Energy Vehicle Activity Monitor is a parking application that resides on the mobile phone. In this manner, as a user approaches the proximity of his or her destination, the user may press the Connected Bluetooth Low Energy Vehicle Activity Monitor's button (17b). The Connected Bluetooth Low Energy Vehicle Activity Monitor may then trigger a command to the phone, which is then interpreted by the Vehicle Activity Monitor App (20, 26)) on the Mobile Phone. In one implementation, the Vehicle Activity Monitor App (20, 26) may then in turn enable the GPS of the Mobile Phone and send the GPS coordinates to a Cloud Server. The Cloud Server may then interpret the GPS coordinates along with the user's profile information, and return the best app for finding parking to the user's Vehicle Activity Monitor App (20, 26). The Vehicle Activity Monitor App (20, 26) may then trigger the proposed parking app (21, 27) or a different app from the available list of apps on the mobile phone.

Thus the Vehicle Activity Monitor App (20, 26)) may trigger a parking app (21, 27), making it active and initiating a parking spot search. The parking app may then in-turn initiate turn-by-turn instructions to lead the user to the parking space without the user having to pull out their phone and physically launch the app.

Figure 5:
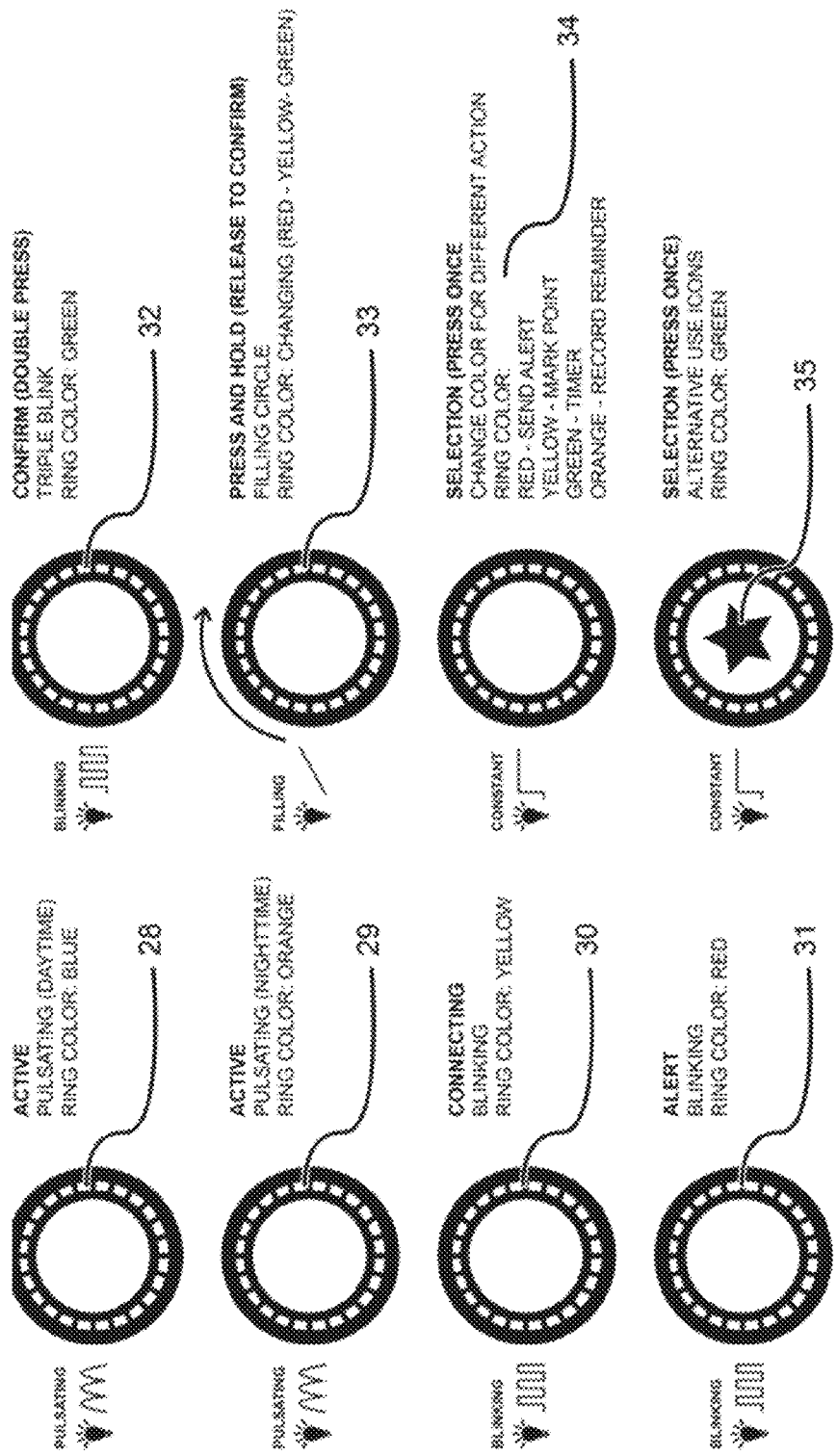
FIG. 5 illustrates a Connected BLE Vehicle Activity Monitor User Interface Description in accordance with at least one of the various embodiments.

In one embodiment of the invention, the Connected BLE Vehicle Activity Monitor may use a plurality of color, image, light, and blinking patterns to show the status of the Connected BLE Vehicle Activity Monitor under different operating conditions (28, 29, 30, 31, 32, 33, 34, 35) as shown in FIG. 5. In this embodiment, device states such as CONNECTING (30) may be interpreted as a blinking pattern or open link icon (35). Furthermore, alerts (31) and other notifications may be displayed to the user via changes in the color, icon (35), light, and blinking pattern. These patterns may be assigned to different app or device notifications.

The system may support a plurality of sensors (3), including but not limited to an accelerometer, gyroscope, temperature sensor, an ambient noise sensor, or other environmental sensors such as a particle or gas sensors. These sensors (3) may be connected to a microprocessor (1) that, in-turn may be connected to, or serve as Bluetooth Low Energy radio antenna (7) and therefore may directly feed the app (20,26) with data that can be shared via the cloud with other 3rd party apps or cloud-based services via an in-app API or cloud-based API. Furthermore, the Bluetooth Low Energy radio may use BLE mesh networking and beaconing protocols to broadcast to other devices in the area.

In another embodiment of the system, an LTE-M or other radio may be used to transmit sensor data directly to the cloud, thus enabling data to be interpreted directly by the network computer without the need for a tablet or client computer.

Beaconing, Location, and Parking

While the systems may or may not itself support an onboard GPS, the system may leverage the GPS in the mobile phone or other precise location data to establish the current position of the vehicle. This information may be useful in several applications, including but not limited to parking applications.

In one embodiment, the user may pre-register with a parking authority. As part of the registration, the parking authority may assign a specific user code to the user that may be communicated via the app to the Connected BLE Vehicle Activity Monitor. The Connected BLE Vehicle Activity Monitor may thus be used in conjunction with the mobile phone as a virtual parking meter.

In this embodiment, the Connected BLE Vehicle Activity Monitor may detect if the vehicle has come to a complete stop and that the user has exited the vehicle. In this embodiment, the Connected BLE Vehicle Activity Monitor may always request the current location of the vehicle when the vehicle comes to a complete stop for a period of time that exceeds a threshold, when the driver stops moving the steering wheel, or when the engine gets turned off which it may detect through the change in vibration that occurs when stopping the engine.

Furthermore, this location may be used by the app to register the parking location with a parking authority via the app, and the Connected BLE Vehicle Activity Monitor may switch modes to begin beaconing the current location of the vehicle, together with a secret code representing that the user has a valid parking account and that the vehicle has been registered for parking.

Should the vehicle be parked next to a meter equipped with a Bluetooth Low Energy system, then the parking meter may also confirm that the user is parked in a valid spot, and the parking system may start tallying the time that the vehicle was parked in front of the meter. Furthermore, the system may change the status of the parking meter from a color indicating that there is nobody parked at the meter (e.g. RED) to a color indicating that the vehicle at the meter is parked legally (e.g. GREEN).

Parking enforcement officers may get equipped with an app that also monitors the presence or absence of vehicles equipped with the Connected BLE Vehicle Activity Monitor-based parking system. Thus they may quickly scan for the presence of such vehicles as they drive by, pausing only to ticket vehicles that are not equipped with the system.

External Data Sources

The system may also collect data from external sources via the Vehicle Activity Monitor app (20, 26). Data may include but not be limited to data from other apps, cloud-based services, or third party hardware devices such as OBD2 monitors. Data may include weather, traffic conditions, road conditions, police activity, and other information that may affect the user's commute, or may include detailed vehicle or diagnostic information as may be obtained via 3rd party OBD2 devices.

Data may also be drawn from multiple sources including commercial street map applications, government street/traffic information publicly on the web, or the like, using public or private APIs.

Ultimately, the available data may be used in conjunction with the data created by the Connected BLE Vehicle Activity Monitor to create a picture of the user's specific vehicle environment, vehicular usage model, the condition of the vehicle, in-car schedule, and in-car behavior.

The data may then be used to evaluate and propose behavioral changes that reduce the time spent in the vehicle with the engine running, and thus a reduction in fuel consumption and operating cost.

This predictive modeling may also in turn propose other improvements in daily habits that positively impact the user's commute by anticipating traffic patterns. For example a user may be notified to leave 10 minutes earlier on Mondays due to the increase in traffic that occurs at 9:35 am vs. 9:25 am. This may result in a 10 minute reduction out of an otherwise 40 minute commute (e.g. a 25% saving in commuting time) by bypassing the worst traffic conditions and times.

Figure 6:
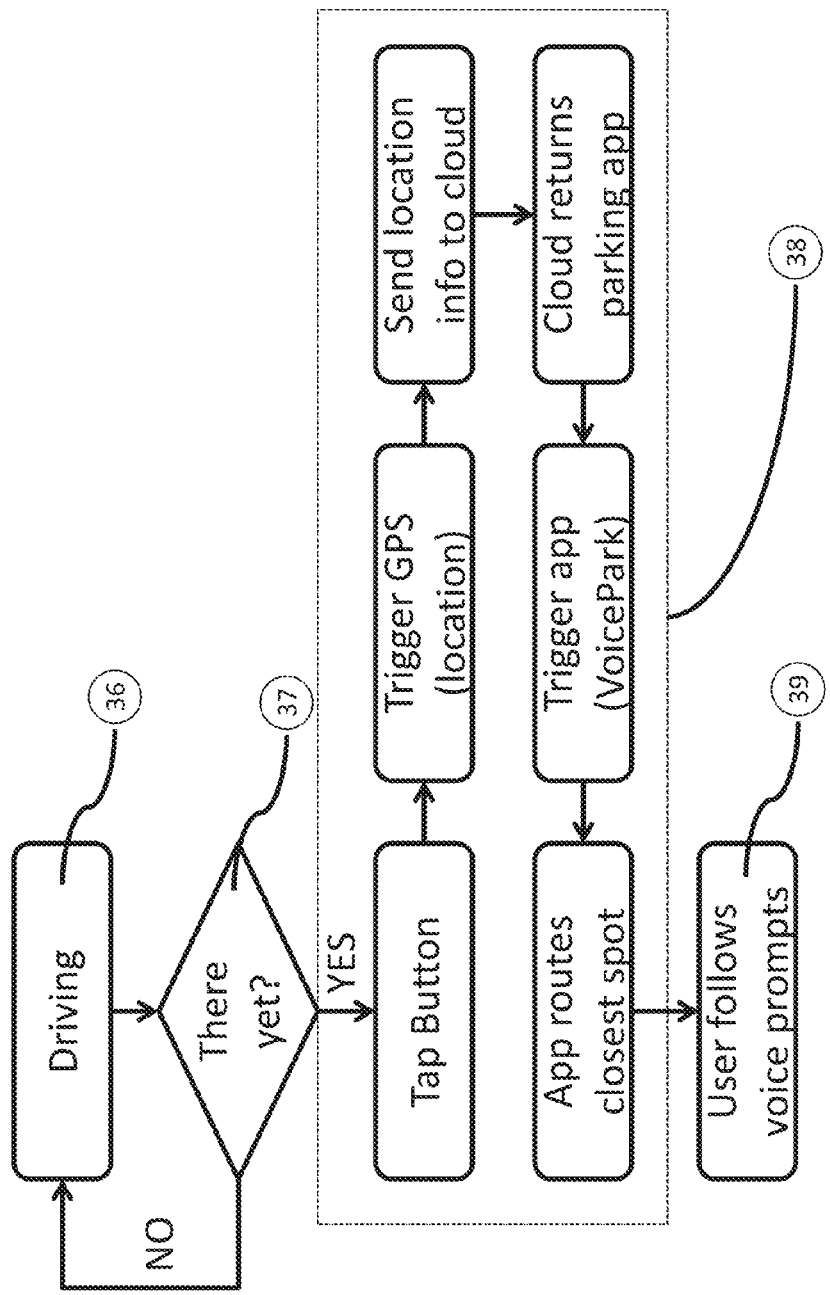
FIG. 6 illustrates a Connected Vehicle Activity Monitor Contextual Button Example Flow Diagram in accordance with at least one of the various embodiments.

Other similar models may be derived using a learning engine in the cloud or in the mobile phone app (20, 26). One example of such a flow is shown in FIG. 6 where the User Actions in Vehicle Context are described as a flow diagram. In this example, the user is initially driving (36) and arrives in the proximity of his destination (37). Normally, the user would need to pull out his or her phone at this point in order to trigger a parking app or an equivalent app. When using the Connected BLE Vehicle Activity Monitor, however, the user may simply tap a button thus triggering a sequence of events (38) that ultimately lead to the optimal parking spot being identified. The user may then follow the voice prompts (39) to his or her desired parking place.

As can appreciated by somebody skilled in the art, a similar approach may be used with other apps and software services that can save the user time and money, or make the user more productive while driving without distracting the user from the road ahead.

Connected Bluetooth Low Energy Vehicle Activity Monitor Operation

The Connected Bluetooth Low Energy Vehicle Activity Monitor's (e.g., sensor computer) may be used to manage the user interfaces, send and receive data via the Bluetooth Low Energy wireless link, and manage inter-chip communication. The firmware that controls the circuit, user interfaces, Bluetooth Low Energy wireless link, etc. may also be modular and may include firmware build switches (used by compilers to turn on-and-off firmware modules, features, and function) and thus compile only those sections of firmware that are required to work with the specific device implementation in question.

This Connected Bluetooth Low Energy Vehicle Activity Monitor may therefore be used to drive an audio output such as a Piezo transducer or other speaker through a pulse-width modulated output provided by the Bluetooth Low Energy Radio in the SiP (1) to generate noise whenever a traffic alert or other notification is received. The tone of the alert may vary based-on the type or severity of the notification and thus provide contextual feedback to the user.

The Connected Bluetooth Low Energy Vehicle Activity Monitor's button may be used to trigger multiple actions based-on context. For example, if no alert or notification is present, the button may be used to trigger an action. Alternatively, the button may be used to clear the current notification.

A protocol based on the Connected Device Protocol may be used in order to minimize the amount of Bluetooth communication needed to convey the most valuable information from the Connected Bluetooth Low Energy Vehicle Activity Monitor to the mobile phone.

For example, instead of conveying raw X, Y, and Z acceleration information from the accelerometer via the Bluetooth Low Energy link to the mobile phone, the Connected Bluetooth Low Energy Vehicle Activity Monitor may interpret the information and convert it into valuable metrics such as time spent driving, time spent breaking, time spent accelerating, time spent turning left, time spent turning right, and ride smoothness.

In at least one of the various embodiments, raw data may be sent to a user's mobile phone. In some embodiments, the data may be associated with metadata that may be used to identify the precise context of the captured data. In some embodiments, the metadata may include various contextual information, such as, a plurality of locations, date and time information, steering wheel positions, or the like, that may be related to when the data was captured by the Connected Bluetooth Low Energy Vehicle Activity Monitor.

Figure 7:
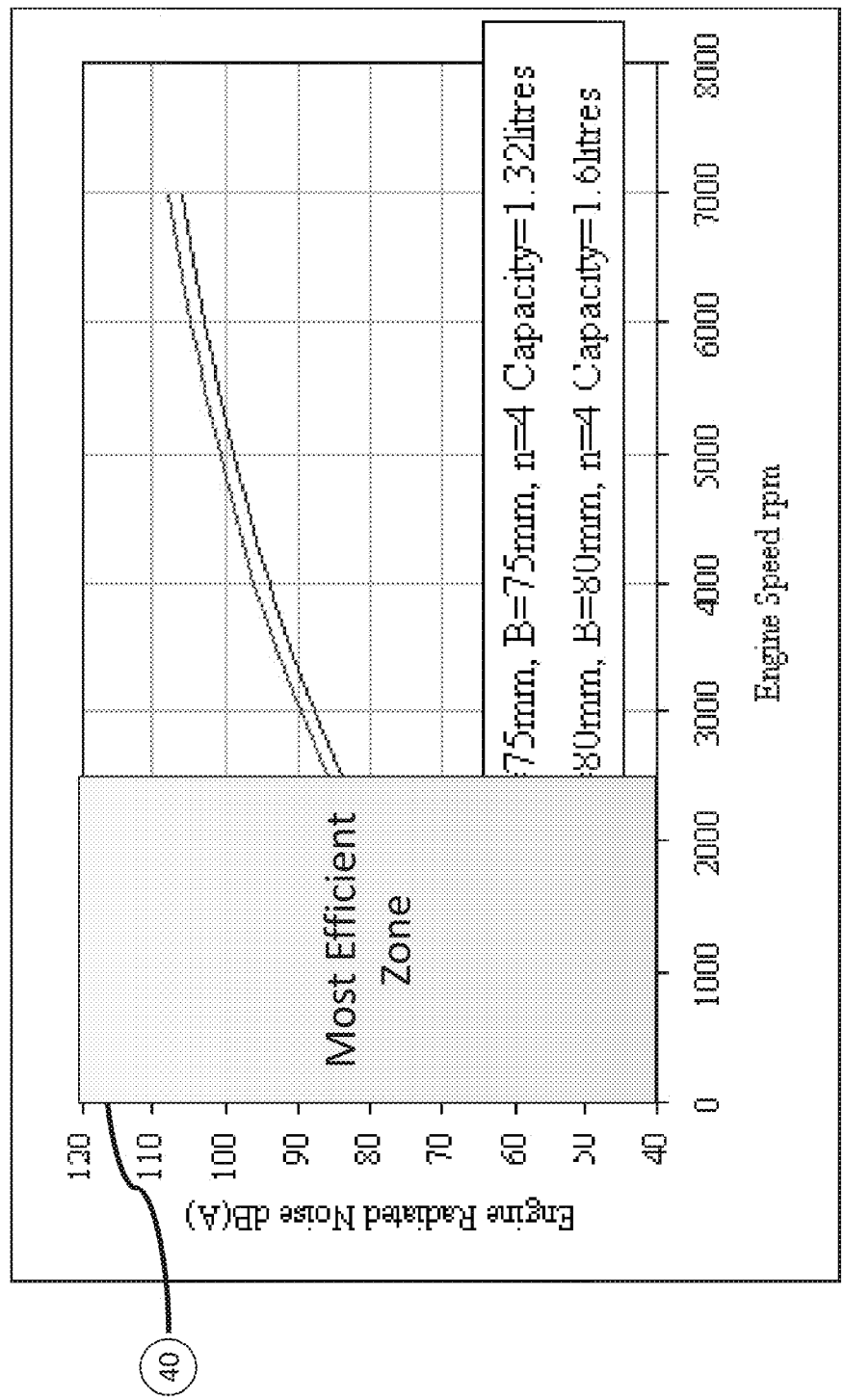
FIG. 7 illustrates a Engine Noise vs. RPM Example in accordance with at least one of the various embodiments.
Figure 8:
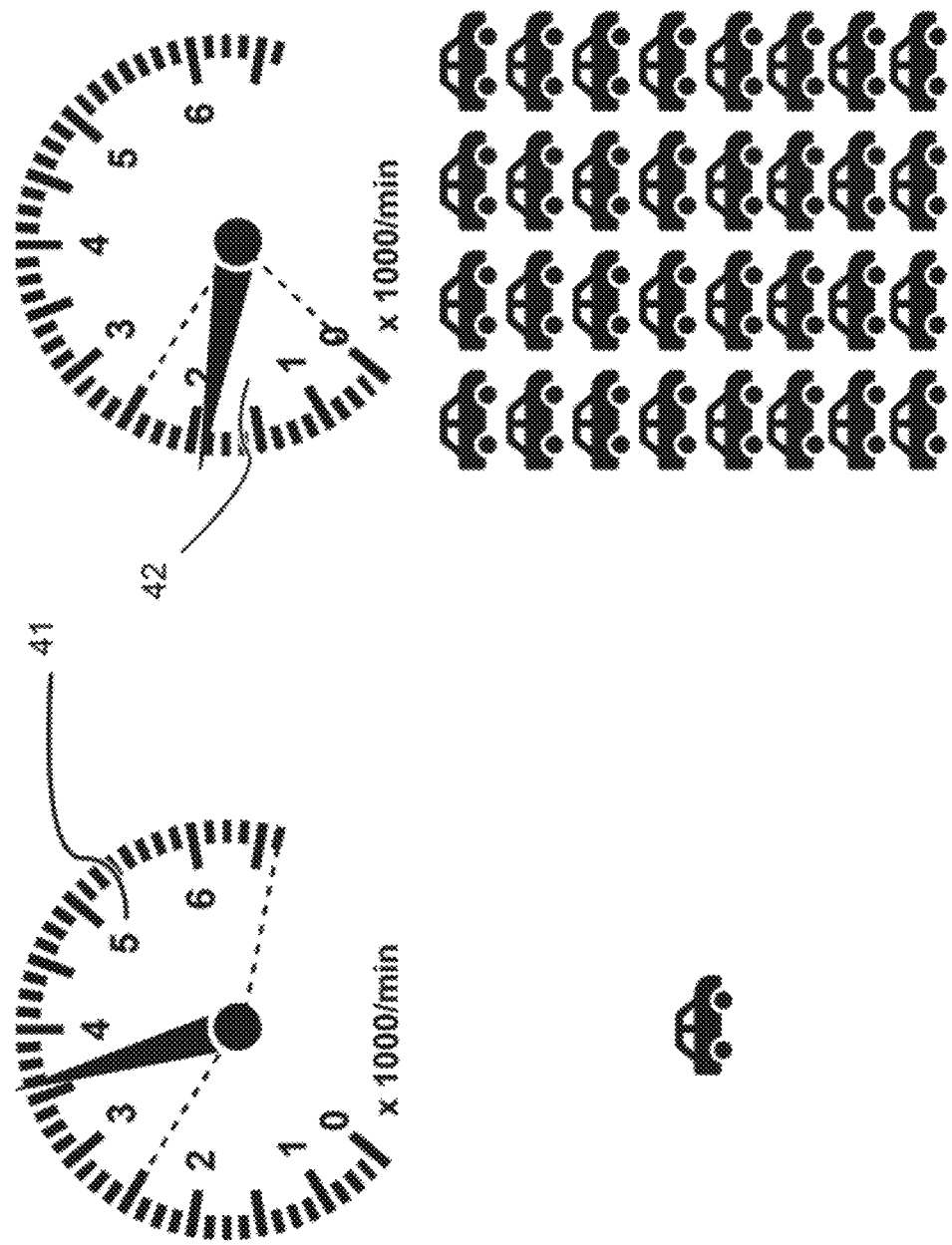
FIG. 8 illustrates a Driving Efficiency vs. RPM in accordance with at least one of the various embodiments.

In at least one of the various embodiments, if the metadata may be captured while the Connected Bluetooth Low Energy Vehicle Activity Monitor (e.g., sensor computer) may be connected with the mobile phone it may be communicated to the mobile phone immediately. Otherwise, in some embodiments, if the metadata may be captured while the Connected Bluetooth Low Energy Vehicle Activity Monitor may be disconnected from the mobile phone, it may be stored in a local memory of the Connected Bluetooth Low Energy Vehicle Activity Monitor. Accordingly, in at least one of the various embodiments, if communication connections are restored, the stored metadata may be provided to another computer, such as, the mobile phone, a network computer, or the like. It is well established that the amplitude of both engine noise and vibration are closely related to the engine RPM as illustrated in FIG. 7 (Engine Noise vs. RPM Example). Furthermore, there is plenty of data that supports that the most economic RPM zone is between idle (usually between 500-800 RPM) and 2500 RPM for most internal combustion engines as shown in FIG. 8 (RPM and Fuel Consumption).

Figure 9:
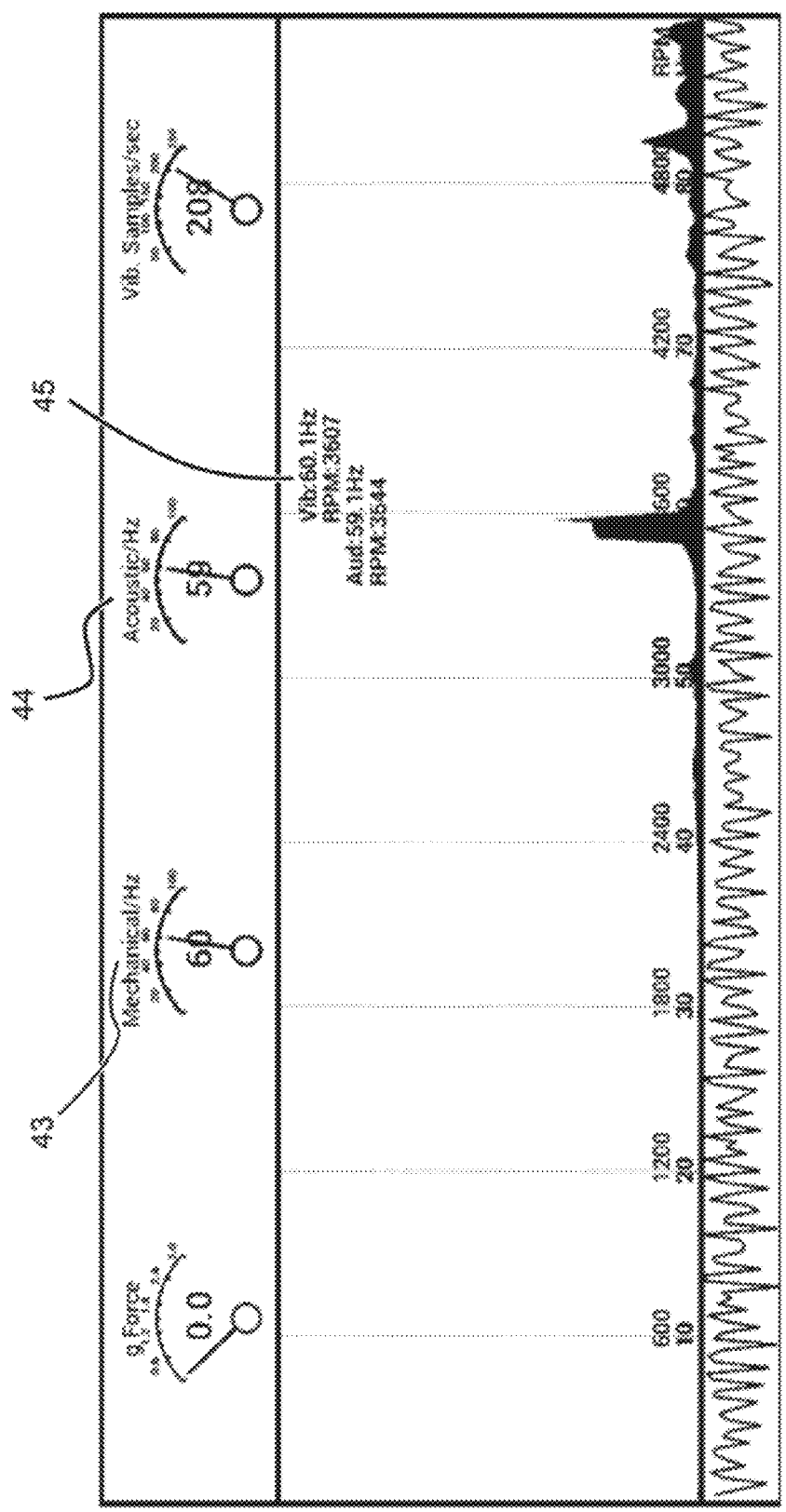
FIG. 9 illustrates a Correlating Vibration and Acoustic Frequency of Engines in accordance with at least one of the various embodiments.

Similarly, there may be a high correlation between the frequency of engine noise and the frequency of vibrations in the vehicle while operating. For example, in some embodiments, the vibration of the vehicle may be correlated to the engine vibrations as shown in FIG. 9.

In this instance, we can see that at 3600 RPM, the engine vibration is approximately 60.1 Hz (43) while the acoustic tone the engine makes is at approximately 59 Hz (44). Thus, by correlating engine noise frequency via the ambient noise sensor (3) and the frequency of the vibration via the accelerometer (3) of the Connected Bluetooth Low Energy Vehicle Activity Monitor of FIG. 1, the firmware can estimate the engine RPM and thus the manner in which the car is being driven.

The Connected Bluetooth Low Energy Vehicle Activity Monitor metrics may be transmitted to and aggregated by the mobile phone app, and may then be related back to CO2 emissions and refined based-on profile information about the vehicle, the driver's behavior, and contextual information provided via cloud-based services and third party data sources such as traffic information, weather information, road conditions, etc.

In one such embodiment, the vehicle's make (e.g. Volkswagen), model (e.g. Jetta), model year (e.g. 2014), fuel type (e.g. Diesel), engine (e.g. 2.0 liter, 4 cylinder TDI) drivetrain (e.g. front wheel drive) may discovered using automated background searches to obtain detailed vehicle information, tire and wheel size information, vehicle history information, fuel consumption statistics from one or more publically available knowledge bases. These statistics may be combined with information about the driver's habits obtained via the accelerometer such as acceleration/deceleration, driving speed at any given time, engine RPM, direction of motion, frequency and speed of directional changes, etc., along with road conditions as measured via the vehicular vibrations while driving to estimate the overall fuel consumption and thus emissions.

These data, once collected, may be uploaded to the cloud to be analyzed or analyzed directly by the mobile phone app. The analysis may provide useful feedback to the user, such as:

a. How much time do I spend in the car with the engine running?

b. How much time do I spend with the engine running where the car is not moving?

c. How long is my typical commute?

d. At which times of the day is the commute the worst?

e. What would be the best time of the day to commute?

This data may be further analyzed, along with traffic data to assess whether there may be timely issues that would affect a user's impending commute. Thus, the mobile phone app may issue alerts or notifications to the user that warn of potential issues that could negatively affect the commute and thus increase the time spent driving.

Connected Device Mesh Networking

As a mobile device may not always be available, and as there are experiences that may benefit from the sharing of information via peer-to-peer intra-vehicular links, a Mesh Networking Protocol has been devised. This protocol maintains the privacy of the user by constantly modifying the vehicle's Bluetooth Low Energy address while simultaneously broadcasting encrypted data to devices in the area that are cloud-connected. Therefore, even if the user is not present, the user may enable his or her mobile device to act as a relay to the cloud, and thus deliver important information to a cloud-based server that may then be used to analyze the data, and inform the vehicle's owner of any anomalies.

Calibrating the Steering Wheel Position

The camera in the mobile phone that is associated with the Connected Bluetooth Low Energy Vehicle Activity Monitor app provides a useful method for calibrating the zero position of the Connected Bluetooth Low Energy Vehicle Activity Monitor (e.g., sensor computer). The method shown in FIG. 10 may be used to calibrate the steering wheel angle.

This basic premise, is that when driving on an even level surface (such as in a parking lot or on a highway) if the vehicle's wheels are well aligned, the steering wheel should remain in a neutral position even if the driver lets go of the wheel. Therefore, if the Connected Bluetooth Low Energy Vehicle Activity Monitor is mounted on the steering wheel (11, 12, 13, 17), then its orientation may be detected and processed using digital image processing techniques.

The user first affixes the Connected Bluetooth Low Energy Vehicle Activity Monitor to the steering wheel of the car and starts driving slowly in a straight line on a level parking lot while removing his or her hands from the wheel.

If the wheels have reached their neutral position, the user stops the car and takes a picture of the front of the car. By using the outline of the dashboard against the contrast of the window, and by using the outlines of the interior features of the car, an artificial horizon may be identified in the image. This horizon may then be used, in conjunction with the position of the steering wheel, to determine the position and angle of the Connected Bluetooth Low Energy Vehicle Activity Monitor. This angle may then be transmitted back to the Connected Bluetooth Low Energy Vehicle Activity Monitor via the Bluetooth Low Energy link, and may be used by the Connected Bluetooth Low Energy Vehicle Activity Monitor as a corrective factor when setting the offset angle of the Connected Bluetooth Low Energy Vehicle Activity Monitor.

In this manner, the Connected Bluetooth Low Energy Vehicle Activity Monitor's orientation in the car may be concretely measured and used to help assess any drift in the steering wheel angle at various speeds during operation which may indicate an alignment or an uneven tire wear issue.

Figure 10:
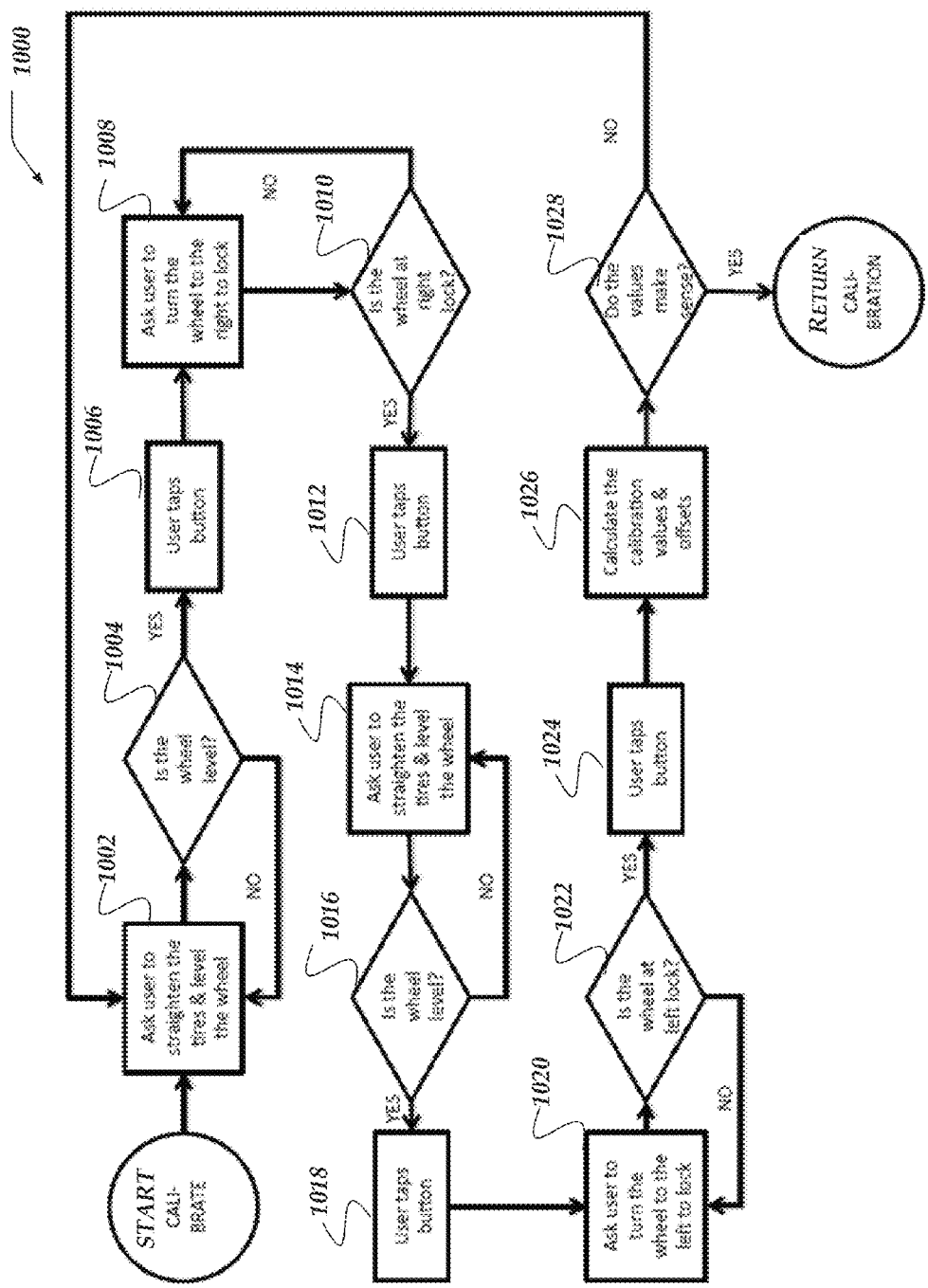
FIG. 10 illustrates a Calibrating the Steering Wheel Position in accordance with at least one of the various embodiments.

FIG. 10 illustrates an overview flowchart for process 1000 for calibrating a sensor computer in accordance with at least one of the various embodiments.

In at least one of the various embodiments, the calibration process may be a guided process where the user is directed to perform various actions as part of the calibration process. In some embodiments, users may be directed by audio commands, graphical commands (e.g., rendered on a graphical display), visual indicators (e.g., lights, light bars, LEDs, or the like), or the like, or combination thereof. In at least one of the various embodiments, directions may be provided by various sources, such as, the sensor computer (e.g., Connected Bluetooth Low Energy Vehicle Activity Monitor), applications running on the user's mobile phone, the vehicle's infotainment center/computer, or the like, or combination thereof.

In some embodiments, the steering wheel position may be calibrated at the factory or at the point of professional installation. In such embodiments, no calibration may be needed as the sensor may be placed in a known mounting location and position such that the position of the sensor is known a-priori (e.g. by design). In those embodiments, the sensor computer may be configured to bypass the calibration process.

In some embodiments, the user may be directed to level the steering wheel to calibrate a sensor computer that may be mounted on the steering wheel (11, 12, 13, 17). Accordingly, in some embodiments, the user may be guided to use a button on the top of the device (17*b*) to indicate when the steering wheel is level. The accelerometer and gyro (3) may then be used to assess the actual position of the sensor relative to the steering wheel position.

After a start block, at block 1002, in at least one of the various embodiments, the user may be asked to straighten the tires and level the steering wheel.

At decision block 1004, in at least one of the various embodiments, if the wheel is level, control may flow to block 1006; otherwise, control may loop back to block 1002. In at least one of the various embodiments, the sensor computer may be arranged to use sensors, such as, accelerometers and/or gyroscopes to determine if the steering is level. In at least one of the various embodiments, the sensor computer may record the current angle of the sensor computer as the zero angle.

At block 1006, in at least one of the various embodiments, the user may tap a button on the sensor computer to advance the process to block 1008.

At block 1008, in at least one of the various embodiments, the user may be directed to turn the steering wheel to the right until it locks.

At decision block 1010, in at least one of the various embodiments, if the steering wheel is at the right hand lock position, control may flow to block 1012; otherwise, control may loop back to block 1008. In at least one of the various embodiments, the sensor computer may be arranged to store the current angle of the sensor computer as the maximum right angle.

At block 1012, in at least one of the various embodiments, the user may be directed to push the same or another button to advance the process to block 1014.

At block 1004, in at least one of the various embodiments, the user may be directed to straighten the tires and level the steering wheel. The current angle of the sensor computer may be compared to the zero angle collected at block 1004. In at least one of the various embodiments, if the different between the zero angle and the current angle of the sensor computer exceeds a defined threshold, the calibration process may be restarted.

At decision block 1016, in at least one of the various embodiments, if the steering wheel is level, control may flow to block 1018; otherwise, control may loop back to block 1014.

At block 1018, in at least one of the various embodiments, the user may push one or more buttons to advance the process to block 1020.

At block 1020, in at least one of the various embodiments, the user may be asked to turn the steering wheel to the left until the steering wheel is locked to the left.

At decision block 1022, in at least one of the various embodiments, if the steering wheel is at the left lock position, control may flow to block 1024; otherwise, control may loop back to block 1012. In at least one of the various embodiments, the sensor computer may be arranged to store the current angle of the sensor computer as the maximum left angle.

At block 1024, in at least one of the various embodiments, the user may use one or more buttons to advance the process to the block 1026.

At decision block 1026, in at least one of the various embodiments, the sensor computer may perform one or one operations to validate the range of motion that was determined during the calibration steps. In at least one of the various embodiments, the zero angle, the maximum right angle, and the maximum left angle may be used to calibrate the range of motion of the sensor computer at its current placement on the steering wheel and/or steering wheel column.

At decision block 1028, in at least one of the various embodiments, if the calibration was successful, control may be returned to a calling process; otherwise, control may loop back to block 1002. In at least one of the various embodiments, these value may be compared to previously recorded values for the same type of vehicle to determine if the calibration may be considered acceptable.

FIG. 11 illustrates a Factors Affecting the Rolling Resistance of Vehicles in accordance with at least one of the various embodiments. In at least one of the various embodiments, the sensor computer may be arranged to measure vibration, shock, rotations, or the like. For example, in some embodiments, sensor signals collected by the sensor computer may be correlated with various factors such as those listed in FIG. 11.

FIG. 12 illustrates a Road Texture and Fuel Consumption in accordance with at least one of the various embodiments. In at least one of the various embodiments, sensor signals may be correlated with road pavement types and thus the sensor data may be used to convey the impacts of the road surface on vehicle fuel consumption or on the wear to the vehicle.

Figure 13A:
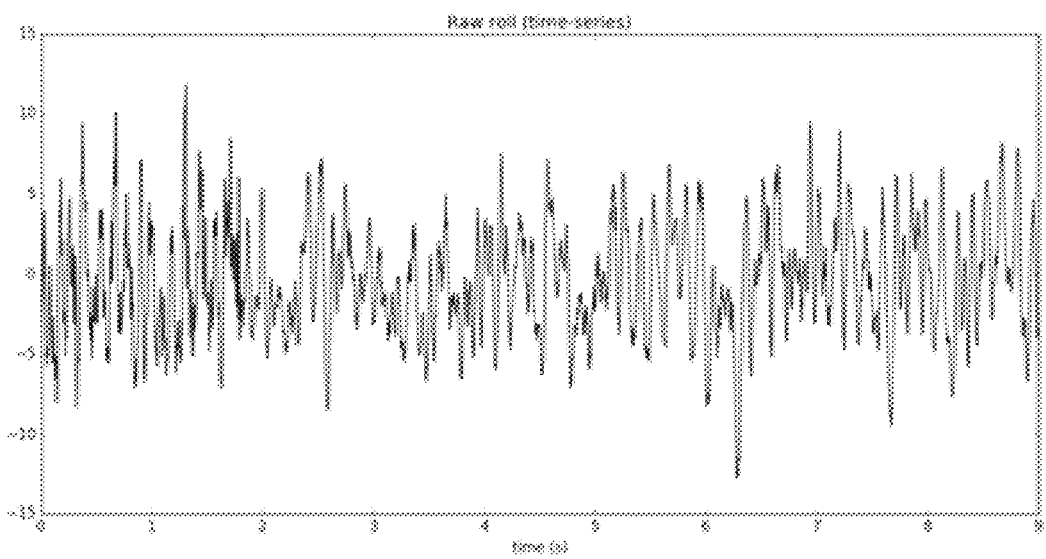
FIG. 13A illustrates an example of raw road vibration as measured by an accelerometer installed on a steering wheel hub in accordance with at least one of the various embodiments.

FIG. 13A illustrates raw steering wheel position (roll of the steering wheel) including vibrations while driving as measured by an accelerometer installed on a steering wheel hub in accordance with at least one of the various embodiments.

Figure 13B:
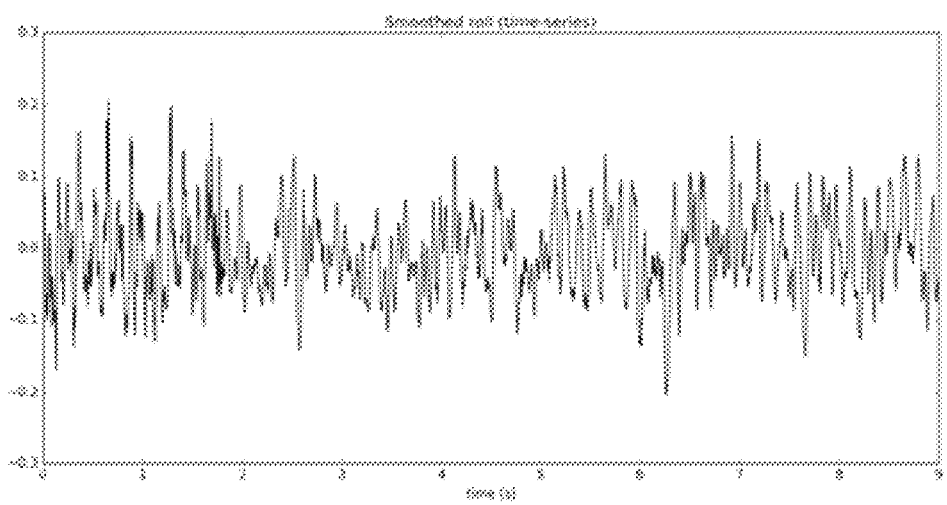
FIG. 13B illustrates an example of smoothed raw road vibration as measured by an accelerometer installed on a steering wheel hub in accordance with at least one of the various embodiments.

FIG. 13B illustrates smoothed raw steering wheel position (roll of the steering wheel) including road vibration as measured by an accelerometer installed on a steering wheel hub in accordance with at least one of the various embodiments.

Figure 14:
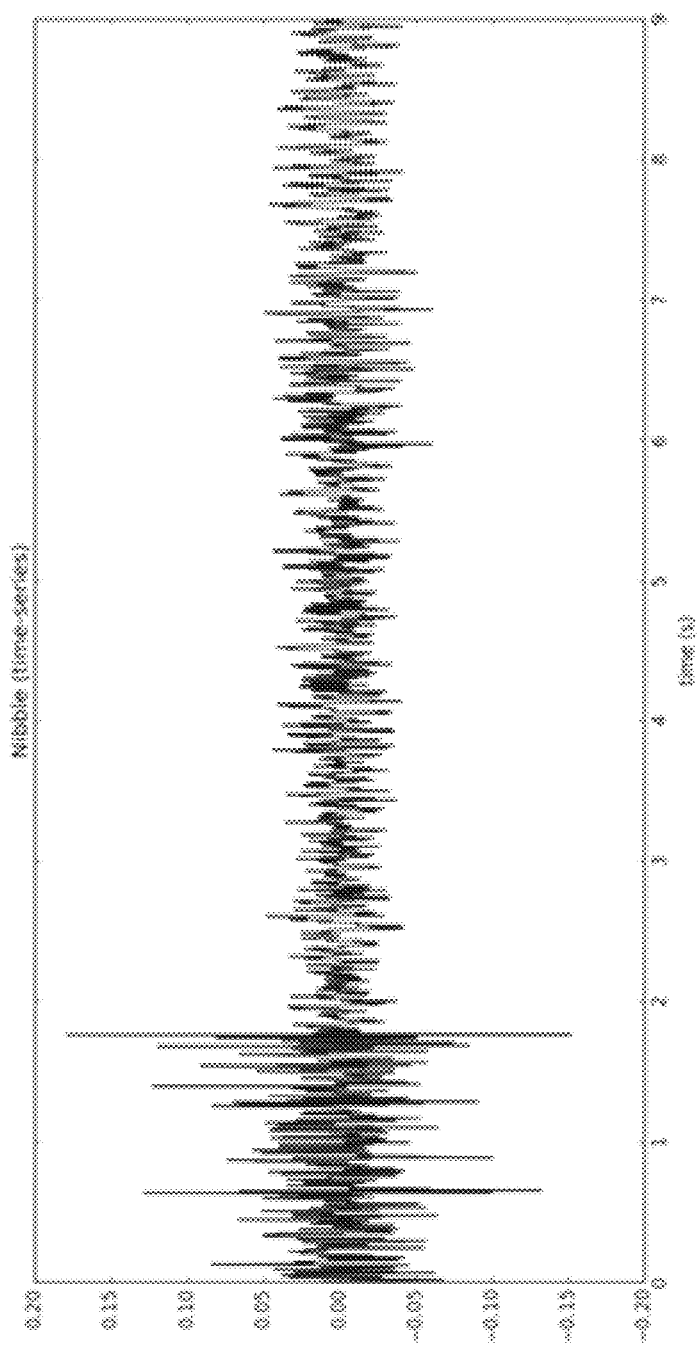
FIG. 14 illustrates an example of the time domain measured road vibration at the steering wheel in accordance with at least one of the various embodiments.

FIG. 14 illustrates measured changes in the roll angle (derivative of the roll angle/nibble) while driving in accordance with at least one of the various embodiments.

Figure 15:
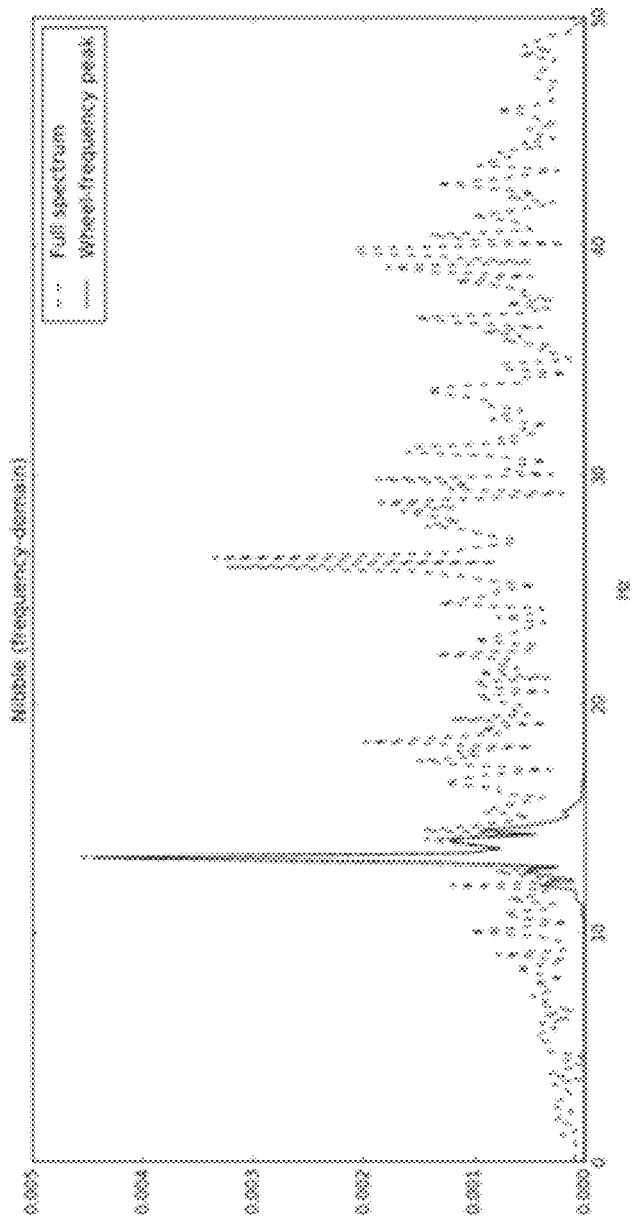
FIG. 15 illustrates an example of the frequency domain of the measured road vibration at the steering wheel in accordance with at least one of the various embodiments.

FIG. 15 illustrates the Fourier transform of the measured road vibration associated with a nibble in accordance with at least one of the various embodiments.

Illustrated Operating Environment

Figure 16:
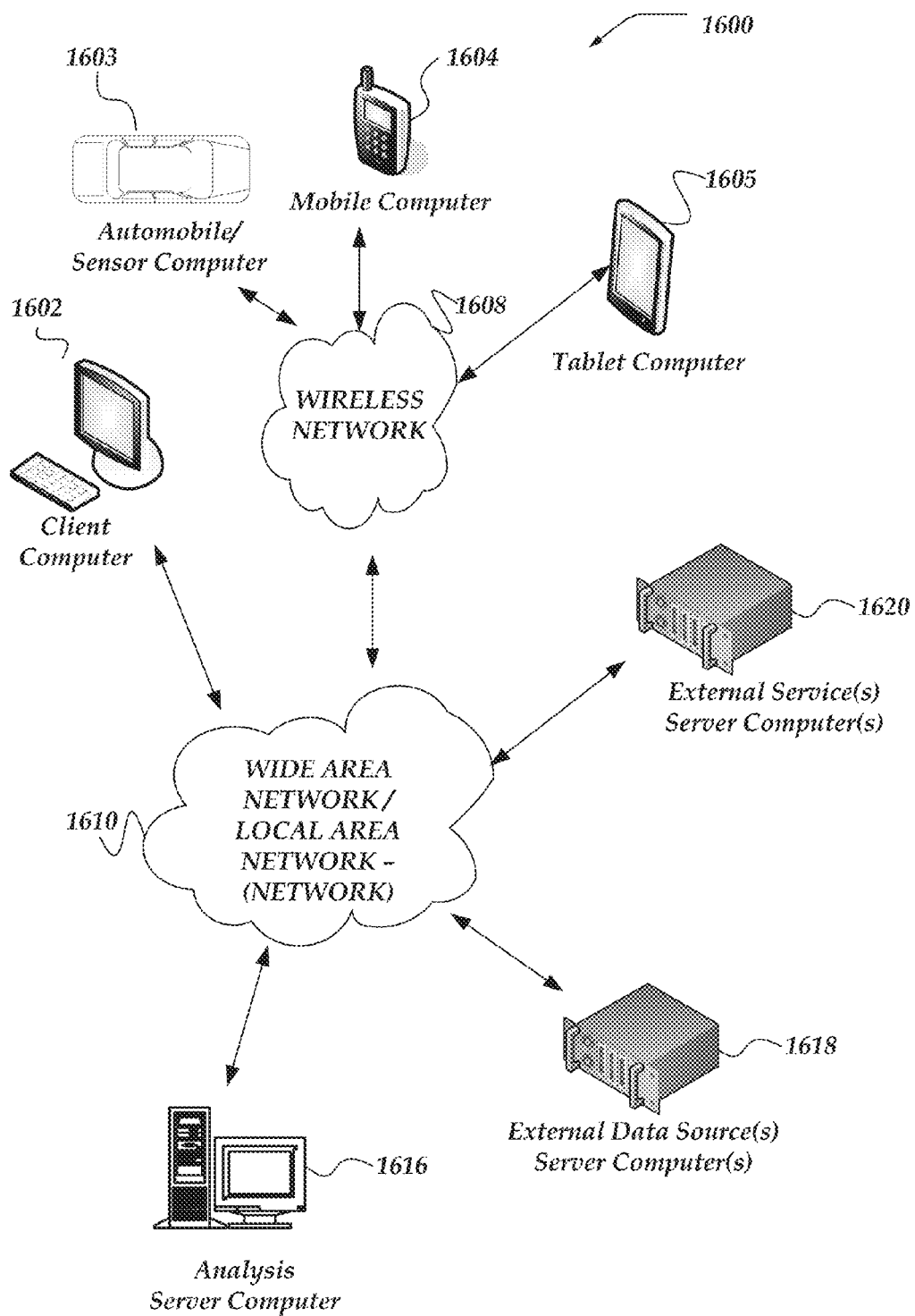
FIG. 16 illustrates one embodiment of a system environment in which various embodiments may be implemented.

FIG. 16 shows components of one embodiment of an environment in which embodiments of the invention may be practiced. Not all of the components may be required to practice the invention, and variations in the arrangement and type of the components may be made without departing from the spirit or scope of the invention. As shown, system 1600 of FIG. 16 includes local area networks (LANs)/wide area networks (WANs)—(network) 1610, wireless network 1608, client computers 1602-1605, Analysis Server Computer 1616, External Data Sources Server Computer 1618, or the like.

At least one embodiment of client computers 1602-1605 is described in more detail below in conjunction with FIG. 17. In one embodiment, at least some of client computers 1602-1605 may operate over one or more wired and/or wireless networks, such as networks 1608, and/or 1610. Generally, client computers 1602-1605 may include virtually any computer capable of communicating over a network to send and receive information, perform various online activities, offline actions, or the like. In one embodiment, one or more of client computers 1602-1605 may be configured to operate within a business or other entity to perform a variety of services for the business or other entity. For example, client computers 1602-1605 may be configured to operate as a web server, firewall, client application, media player, mobile telephone, game console, desktop computer, or the like. However, client computers 1602-1605 are not constrained to these services and may also be employed, for example, as for end-user computing in other embodiments. It should be recognized that more or less client computers (as shown in FIG. 16) may be included within a system such as described herein, and embodiments are therefore not constrained by the number or type of client computers employed.

Computers that may operate as client computer 1602 may include computers that typically connect using a wired or wireless communications medium such as personal computers, multiprocessor systems, microprocessor-based or programmable electronic devices, network PCs, or the like. In some embodiments, client computers 1602-1605 may include virtually any portable computer capable of connecting to another computer and receiving information such as, automobile sensor computer 1603, mobile computer 1604, tablet computers 1605, or the like. However, portable computers are not so limited and may include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 1602-1605 typically range widely in terms of capabilities and features. Moreover, client computers 1602-1605 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 1602-1605 also may include at least one other client application that is configured to receive and/or send content between another computer. The client application may include a capability to send and/or receive content, or the like. The client application may further provide information that identifies itself, including a type, capability, name, and the like. In one embodiment, client computers 1602-1605 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, analysis server computer 1616, external data source server computer 1618, external service server computer 1620, or other computers. In some embodiments, the one or more processors of analysis server computer 1616 may be arranged to perform one or more specific tasks for estimated adjusted property values as described in detail below.

Client computers 1602-1605 may further be configured to include a client application that enables an end-user to log into an end-user account that may be managed by another computer, such as, analysis server computer 1616, external data source server computer 1618, external service server computer 1620, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 1608 is configured to couple client computers 1603-1605 and its components with network 1610. Wireless network 1608 may include any of a variety of wireless sub-networks that may further overlay stand-alone ad-hoc networks, and the like, to provide an infrastructure-oriented connection for client computers 1603-1605. Such sub-networks may include mesh networks, Wireless LAN (WLAN) networks, cellular networks, and the like. In one embodiment, the system may include more than one wireless network.

Wireless network 1608 may further include an autonomous system of terminals, gateways, routers, and the like connected by wireless radio links, and the like. These connectors may be configured to move freely and randomly and organize themselves arbitrarily, such that the topology of wireless network 1608 may change rapidly.

Wireless network 1608 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 1603-1605 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), Long Term Evolution for Machine to Machine networks, or the like. In essence, wireless network 1608 may include virtually any wireless communication mechanism by which information may travel between client computers 1603-1605 and another computer, network, a cloud-based network, a cloud instance, or the like.

Network 1610 is configured to couple network computers with other computers, including, analysis server computer 1616, external data source server computer 1618, external service server computer 1620, client computers 1602-1605 through wireless network 1608, or the like. Network 1610 is enabled to employ any form of computer readable media for communicating information from one electronic device to another. Also, network 1610 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 1610 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of analysis server computer 1616 is described in more detail below in conjunction with FIG. 18. Briefly, however, analysis server computer 1616 includes virtually any network computer capable of estimating processing automobile sensor data in a network environment.

Although FIG. 16 illustrates analysis server computer 1616, external data source server computer 1618, and external service server computer 1620 each as a single computer, the innovations and/or embodiments are not so limited. For example, one or more functions of analysis server computer 1616, external data source server computer 1618, external service server computer 1620, or the like, may be distributed across one or more distinct network computers. Moreover, analysis server computer 1616, external data source server computer 1618, or external service server computer 1620 are not limited to a particular configuration such as the one shown in FIG. 16. Thus, in one embodiment, analysis server computer 1616, external data source server computer 1618, or external service server computer 1620 may be implemented using a plurality of network computers. In other embodiments, analysis server computer 1616, external data source server computer 1618, or external service server computer 1620 may operate as a plurality of network computers within a cluster architecture, a peer-to-peer architecture, or the like. Further, in at least one of the various embodiments, analysis server computer 1616, external data source server computer 1618, or external service server computer 1620 may be implemented using one or more cloud instances in one or more cloud networks and/or cloud computing environments. In some embodiments, analysis server computer 1616, external data source server computer 1618, external service server computer 1620, or the like, may be arranged to operate in one or more distributed systems, including lambda architecture based systems.

Illustrative Client Computer

Figure 17:
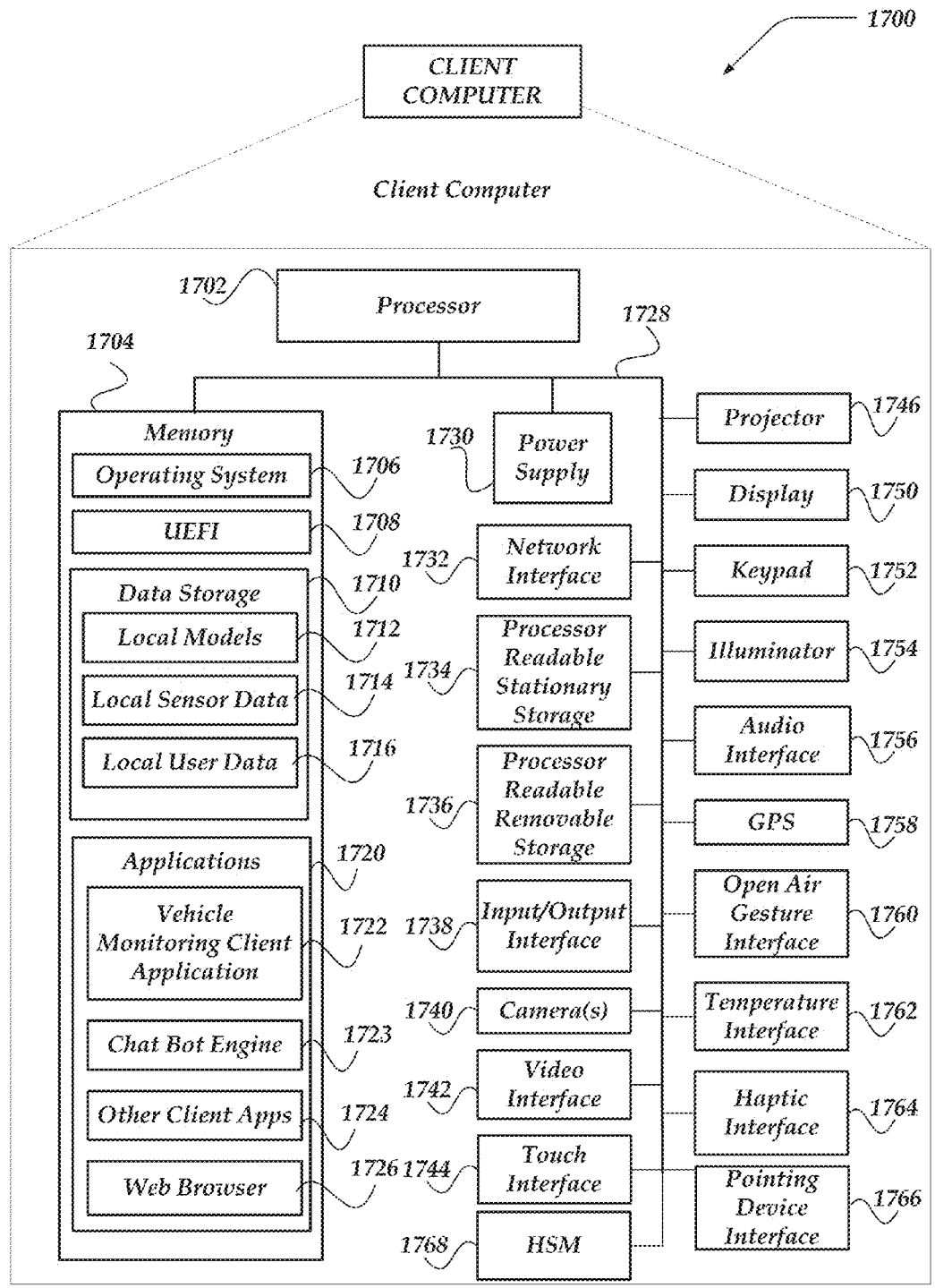
FIG. 17 illustrates a schematic embodiment of a client computer.

FIG. 17 shows one embodiment of client computer 1700 that may include many more or less components than those shown. Client computer 1700 may represent, for example, at least one embodiment of mobile computers or client computers shown in FIG. 1.

Client computer 1700 may include one or more processors, such as, processor 1702 in communication with memory 1704 via bus 1728. Client computer 1700 may also include power supply 1730, network interface 1732, audio interface 1756, display 1750, keypad 1752, illuminator 1754, video interface 1742, input/output interface 1738, haptic interface 1764, global positioning systems (GPS) receiver 1758, open air gesture interface 1760, temperature interface 1762, camera(s) 1740, projector 1746, pointing device interface 1766, processor-readable stationary storage device 1734, and processor-readable removable storage device 1736. Client computer 1700 may optionally communicate with a base station (not shown), or directly with another computer. And, in one embodiment, although not shown, a gyroscope may be employed within client computer 1700 to measuring and/or maintaining an orientation of client computer 1700.

Power supply 1730 may provide power to client computer 1700. A rechargeable or non-rechargeable battery may be used to provide power. The power may also be provided by an external power source, such as an AC adapter or a powered docking cradle that supplements and/or recharges the battery.

Network interface 1732 includes circuitry for coupling client computer 1700 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1732 is sometimes known as a transceiver, transceiving device, or network interface card (NIC).

Audio interface 1756 may be arranged to produce and receive audio signals such as the sound of a human voice. For example, audio interface 1756 may be coupled to a speaker and microphone (not shown) to enable telecommunication with others and/or generate an audio acknowledgement for some action. A microphone in audio interface 1756 can also be used for input to or control of client computer 1700, e.g., using voice recognition, detecting touch based on sound, and the like.

Display 1750 may be a liquid crystal display (LCD), gas plasma, electronic ink, light emitting diode (LED), Organic LED (OLED) or any other type of light reflective or light transmissive display that can be used with a computer. Display 1750 may also include a touch interface 1744 arranged to receive input from an object such as a stylus or a digit from a human hand, and may use resistive, capacitive, surface acoustic wave (SAW), infrared, radar, or other technologies to sense touch and/or gestures.

Projector 1746 may be a remote handheld projector or an integrated projector that is capable of projecting an image on a remote wall or any other reflective object such as a remote screen.

Video interface 1742 may be arranged to capture video images, such as a still photo, a video segment, an infrared video, or the like. For example, video interface 1742 may be coupled to a digital video camera, a web-camera, or the like. Video interface 1742 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1752 may comprise any input device arranged to receive input from a user. For example, keypad 1752 may include a push button numeric dial, or a keyboard. Keypad 1752 may also include command buttons that are associated with selecting and sending images.

Illuminator 1754 may provide a status indication and/or provide light. Illuminator 1754 may remain active for specific periods of time or in response to event messages. For example, when illuminator 1754 is active, it may backlight the buttons on keypad 1752 and stay on while the client computer is powered. Also, illuminator 1754 may backlight these buttons in various patterns when particular actions are performed, such as dialing another client computer. Illuminator 1754 may also cause light sources positioned within a transparent or translucent case of the client computer to illuminate in response to actions.

Further, client computer 1700 may also comprise hardware security module (HSM) 1768 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 1768 may be a stand-alone computer, in other cases, HSM 1768 may be arranged as a hardware card that may be added to a client computer.

Client computer 1700 may also comprise input/output interface 1738 for communicating with external peripheral devices or other computers such as other client computers and network computers. The peripheral devices may include an audio headset, virtual reality headsets, display screen glasses, remote speaker system, remote speaker and microphone system, and the like. Input/output interface 1738 can utilize one or more technologies, such as Universal Serial Bus (USB), Infrared, WiFi, WiMax, Bluetooth™, and the like.

As mentioned above, client computer 1700 may be an in-vehicle client computer, such as, an infotainment system, or the like. Accordingly, in some embodiments, input/output interface 1738 may be arranged pass vehicle error codes to one or more other wireless devices (such as mobile phones, or the like) bypassing OBD2 systems the may be in the vehicle. In some embodiments, OBD2 error codes and/or other similar error codes may be passed directly to customer or service center mobile devices without the need for complex analysis tools. These error codes may be received in the infotainment system, may be mapped to error code messages that may be communicated using Bluetooth Low Energy or other similar low power transmission technology. In some embodiments, an application running on a mobile phone may be arranged to interpret the error code messages and provide additional insight and information related to the error codes.

Input/output interface 1738 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 1700.

Haptic interface 1764 may be arranged to provide tactile feedback to a user of the client computer. For example, the haptic interface 1764 may be employed to vibrate client computer 1700 in a particular way when another user of a computer is calling. Temperature interface 1762 may be used to provide a temperature measurement input and/or a temperature changing output to a user of client computer 1700. Open air gesture interface 1760 may sense physical gestures of a user of client computer 1700, for example, by using single or stereo video cameras, radar, a gyroscopic sensor inside a computer held or worn by the user, or the like. Camera 1740 may be used to track physical eye movements of a user of client computer 1700.

GPS transceiver 1758 can determine the physical coordinates of client computer 1700 on the surface of the Earth, which typically outputs a location as latitude and longitude values. GPS transceiver 1758 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1700 on the surface of the Earth. It is understood that under different conditions, GPS transceiver 1758 can determine a physical location for client computer 1700. In at least one embodiment, however, client computer 1700 may, through other components, provide other information that may be employed to determine a physical location of the client computer, including for example, a Media Access Control (MAC) address, IP address, and the like.

Human interface components can be peripheral devices that are physically separate from client computer 1700, allowing for remote input and/or output to client computer 1700. For example, information routed as described here through human interface components such as display 1750 or keyboard 1752 can instead be routed through network interface 1732 to appropriate human interface components located remotely. Examples of human interface peripheral components that may be remote include, but are not limited to, audio devices, pointing devices, keypads, displays, cameras, projectors, touchscreen or touchpads, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 1726 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 1704 may include RAM, ROM, and/or other types of memory. Memory 1704 illustrates an example of computer-readable storage media (devices) for storage of information such as computer-readable instructions, data structures, program modules or other data. Memory 1704 may store UEFI 1708 (Unified Extensible Firmware Interface) for controlling low-level operation of client computer 1700. The memory may also store operating system 1706 for controlling the operation of client computer 1700. It will be appreciated that this component may include a general-purpose operating system such as a version of UNIX, or LINUX™, or a specialized client computer operating system such as iOS, Android, Windows Phone™, or the Symbian® operating system. The operating system may include, or interface with a Java virtual machine module that enables control of hardware components and/or operating system operations via Java application programs.

Memory 1704 may further include one or more data storage 1710, which can be utilized by client computer 1700 to store, among other things, applications 1720 and/or other data. For example, data storage 1710 may also be employed to store information that describes various capabilities of client computer 1700. The information may then be provided to another device or computer based on any of a variety of methods, including being sent as part of a header during a communication, sent upon request, or the like. Data storage 1710 may also be employed to store social networking information including address books, buddy lists, aliases, user profile information, or the like. Data storage 1710 may further include program code, data, algorithms, and the like, for use by a processor, such as processor 1702 to execute and perform actions. In some embodiments, Data storage 1710 may include local models 1712, local sensor data 1714, local user data 1716, or the like. In one embodiment, at least some of data storage 1710 might also be stored on another component of client computer 1700, including, but not limited to, non-transitory processor-readable removable storage device 1736, processor-readable stationary storage device 1734, or even external to the client computer.

Applications 1720 may include computer executable instructions which, when executed by client computer 1700, transmit, receive, and/or otherwise process instructions and data. Applications 1720 may include, for example, vehicle monitoring client application 1722 other client applications 1724, web browser 1726, or the like. Client computers may be arranged to exchange communications, such as, queries, searches, messages, notification messages, event messages, alerts, performance metrics, log data, API calls, or the like, combination thereof, with application analysis servers, external sources, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 1700 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 1700 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 18:
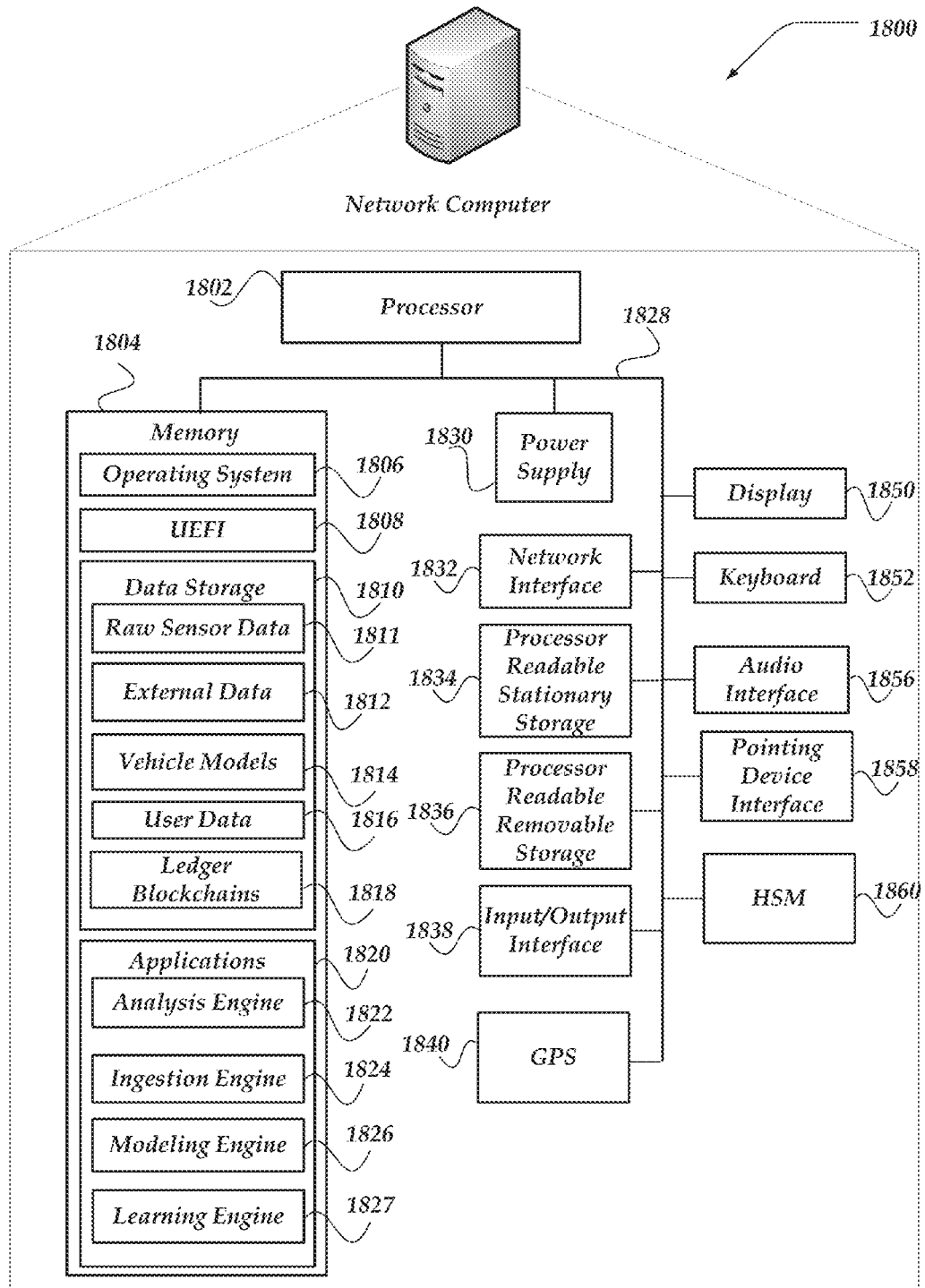
FIG. 18 illustrates a schematic embodiment of a network computer.

FIG. 18 shows one embodiment of network computer 1800 that may be included in a system implementing at least one of the various embodiments. Network computer 1800 may include many more or less components than those shown in FIG. 18. However, the components shown are sufficient to disclose an illustrative embodiment for practicing these innovations. Network computer 1800 may represent, for example, one embodiment of at least one of analysis server computer 1616 shown in FIG. 16.

As shown in the figure, network computer 1800 includes a processor 1802 that may be in communication with a memory 1804 via a bus 1828. In some embodiments, processor 1802 may be comprised of one or more hardware processors, or one or more processor cores. In some cases, one or more of the one or more processors may be specialized processors designed to perform one or more specialized actions, such as, those described herein. Network computer 1800 also includes a power supply 1830, network interface 1832, audio interface 1856, display 1850, keyboard 1852, input/output interface 1838, processor-readable stationary storage device 1834, and processor-readable removable storage device 1836. Power supply 1830 provides power to network computer 1800.

Network interface 1832 includes circuitry for coupling network computer 1800 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 1832 is sometimes known as a transceiver, transceiving device, or network interface card (NIC). Network computer 1800 may optionally communicate with a base station (not shown), or directly with another computer.

Audio interface 1856 is arranged to produce and receive audio signals such as the sound of a human voice. For example, audio interface 1856 may be coupled to a speaker and microphone (not shown) to enable telecommunication with others and/or generate an audio acknowledgement for some action. A microphone in audio interface 1856 can also be used for input to or control of network computer 1800, for example, using voice recognition.

Display 1850 may be a liquid crystal display (LCD), gas plasma, electronic ink, light emitting diode (LED), Organic LED (OLED) or any other type of light reflective or light transmissive display that can be used with a computer. Display 1850 may be a handheld projector or pico projector capable of projecting an image on a wall or other object.

Network computer 1800 may also comprise input/output interface 1838 for communicating with external devices or computers not shown in FIG. 18. Input/output interface 1838 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 1838 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 1800. Human interface components can be physically separate from network computer 1800, allowing for remote input and/or output to network computer 1800. For example, information routed as described here through human interface components such as display 1850 or keyboard 1852 can instead be routed through the network interface 1832 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1858 to receive user input.

GPS transceiver 1840 can determine the physical coordinates of network computer 1800 on the surface of the Earth, which typically outputs a location as latitude and longitude values. GPS transceiver 1840 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1800 on the surface of the Earth. It is understood that under different conditions, GPS transceiver 1840 can determine a physical location for network computer 1800. In at least one embodiment, however, network computer 1800 may, through other components, provide other information that may be employed to determine a physical location of the client computer, including for example, a Media Access Control (MAC) address, IP address, and the like.

Memory 1804 may include Random Access Memory (RAM), Read-Only Memory (ROM), and/or other types of memory. Memory 1804 illustrates an example of computer-readable storage media (devices) for storage of information such as computer-readable instructions, data structures, program modules or other data. Memory 1804 stores a Unified Extensible Firmware Interface (UEFI) 1808 for controlling low-level operation of network computer 1800. The memory also stores an operating system 1806 for controlling the operation of network computer 1800. It will be appreciated that this component may include a general-purpose operating system such as a version of UNIX, or LINUX™, or a specialized operating system such as Microsoft Corporation's Windows® operating system, or the Apple Corporation's macOS® operating system. The operating system may include, or interface with a Java virtual machine module that enables control of hardware components and/or operating system operations via Java application programs. Likewise, other runtime environments may be included.

Memory 1804 may further include one or more data storage 1810, which can be utilized by network computer 1800 to store, among other things, applications 1820 and/or other data. For example, data storage 1810 may also be employed to store information that describes various capabilities of network computer 1800. The information may then be provided to another device or computer based on any of a variety of methods, including being sent as part of a header during a communication, sent upon request, or the like. Data storage 1810 may also be employed to store social networking information including address books, buddy lists, aliases, user profile information, or the like. Data storage 1810 may further include program code, data, algorithms, and the like, for use by one or more processors, such as processor 1802 to execute and perform actions such as those actions described below. In one embodiment, at least some of data storage 1810 might also be stored on another component of network computer 1800, including, but not limited to, non-transitory media inside processor-readable removable storage device 1836, processor-readable stationary storage device 1834, or any other computer-readable storage device within network computer 1800, or even external to network computer 1800. Data storage 1810 may include, for example, raw sensor data 1811, external data 1812, vehicle models 1814, user data 1816, ledger block chains 1818, or the like. Raw sensor data 1811 may be a data store that contains one or more records, logs, events, file system entries, databases, or the like, collected from one or more vehicle sensors and/or external source sensors. In some embodiments, data storage 1810 may also include external data 1814 provided by one or more external data sources. In some embodiments, vehicle models 1814 may include data that represents performance and operational characteristics of various vehicles. In some embodiments, vehicle models 1814 may include compact data structures that represent how different sensor values may affect the performance and/or operation of vehicles. User data 1816 may store user profile information and/or historical vehicle operational information of users (e.g., drivers, operators, owners, or the like) as well as user access rights, user biometric information (e.g., voice recognition information), user authentication information, user profiles, or the like, or combination thereof.

Ledger block chains 1818 may store portions of a distributed vehicle information transaction ledger that may be cryptographically signed to ensure the veracity of the information as well as maintain an accessible ledger recording various information related to a vehicle. In some embodiments, each vehicle monitored by the system may be associated with its own vehicle ledger. In some embodiments, the vehicle ledger may include various pertinent information about the vehicle's history including but not limited to usage information, wear information, harshness information, repair information, service information, or the like, to create a rich vehicle history profile. In some embodiments, the ledger may be accessible by one or more users based on their access level.

Applications 1820 may include computer executable instructions which, when executed by network computer 1800, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1820 may include analysis engine 1822, ingestion engine 1824, modeling engine 1826, or learning engine 1827 that may be arranged to perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, analysis engine 1822, ingestion engine 1824, modeling engine 1826, or learning engine 1827 may be operative in one or more cloud-based computing environments. In at least one of the various embodiments, these applications, and others, may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to analysis engine 1822, ingestion engine 1824, or modeling engine 1826, or learning engine 1827 may be provisioned and de-commissioned automatically.

Also, in at least one of the various embodiments, analysis engine 1822, ingestion engine 1824, modeling engine 1826, or learning engine 1827 or the like, may be located in virtual servers running in a cloud-based computing environment rather than being tied to one or more specific physical network computers.

In some embodiments, analysis engine 1822, ingestion engine 1824, modeling engine 1826, or learning engine 1827, or the like, may be arranged to operate in one or more distributed systems, including lambda architecture based systems.

Further, network computer 1800 may also comprise hardware security module (HSM) 1860 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 1860 may be a stand-alone network computer, in other cases, HSM 1860 may be arranged as a hardware card that may be installed in a network computer.

Additionally, in one or more embodiments (not shown in the figures), network computer 1800 may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Sensor Computer

Figure 19:
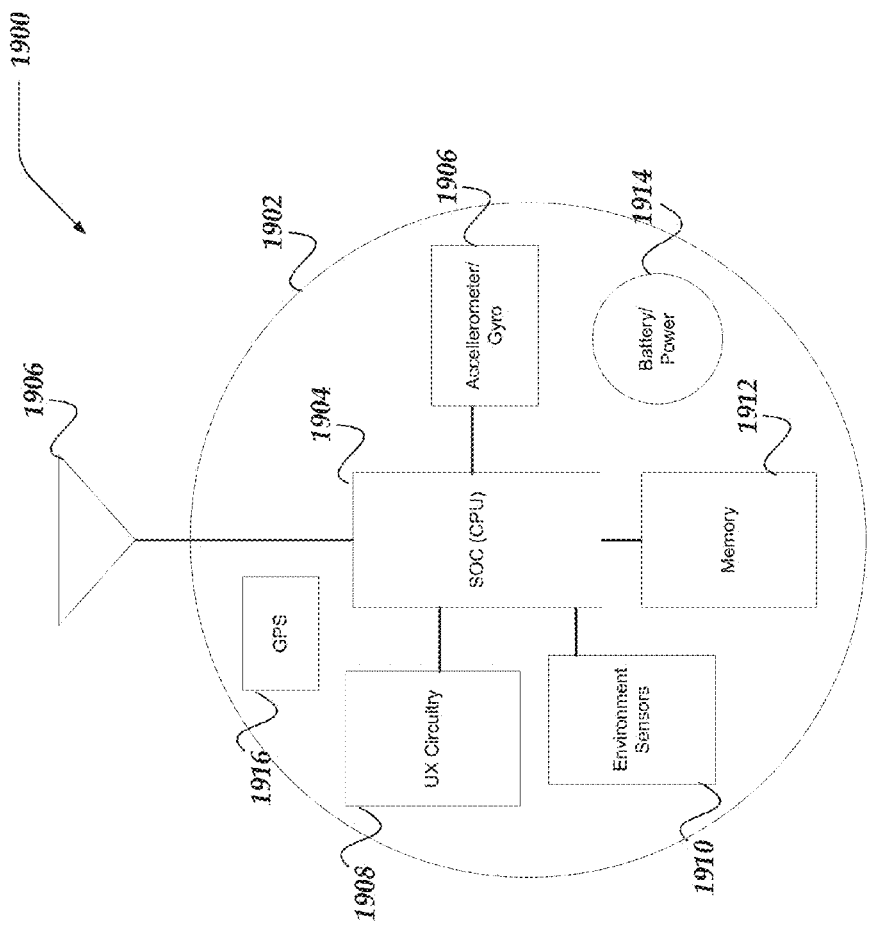
FIG. 19 shows one embodiment of a sensor computer that may be included in a system implementing at least one of the various embodiments.

FIG. 19 shows one embodiment of sensor computer 1900 that may be included in a system implementing at least one of the various embodiments. Sensor computer 1900 may include more or less components than those shown in FIG. 19. However, the components shown are sufficient to disclose an illustrative embodiment for practicing these innovations.

In some embodiments, the sensor computer 1900 may be independent of a vehicle and thus designed to be placed into the vehicle by the user. In other embodiments, sensor computer 1900, may be integrated into the vehicle at the point of manufacture. Or, in some embodiments, sensor computer 1900 may be installed in the vehicle by an installer as an aftermarket sensor.

In at least one of the various embodiments, sensor computer 1900 may be included on a housing 1902 that may be arranged to enable sensor computer 1900 to be attached to a steering column in a vehicle as described above. Housing 1902 may arranged to be attached using different mechanisms, such as, magnets, fixed or removable mounts, or the like.

Further, in at least one of the various embodiments, system on a chip (SOC) 1904 may include one or more processors, local cache memory, memory, wireless radios, sensor inputs, one or more bus connections for connecting to other components of sensor computer 1900.

Sensor computer 1900 may include accelerometer/gyro 1906 for sensing and/or measuring acceleration, in one or more axes. Also, accelerometer/gyro 1906 may be arranged to support one or more gyroscope features, such as, reporting orientation by reporting direction information that enables the calculation of orientation and rotation.

Sensor computer 1900 may include one or more user interface circuitry components, such as, UX Circuitry 1908. In some embodiments, UX circuitry 1908 may be arranged to integrate with one or more user interface components (not shown) such as, LCDs, electronic paper displays, buttons, switches, touch screens, or the like, or combination thereof.

Sensor computer 1900 may include one or more environment sensors components, such as, environment sensors 1910. Environment sensor 1910 may include one or more sensors, such as, audio sensors (microphones), temperature sensors, touch pressure sensors, atmospheric pressure sensors, light sensors, or the like, or combination thereof. In some embodiment, environment sensors 1910 may be arranged to interface with one or more sensors that may be external to housing 1902.

Sensor computer 1900 may include one or more memory components, such as, memory 1912. In some embodiments, memory 1912 may be memory such as described above for client computer 1700, or the like. In some embodiment memory 1912 may be fixed, or other non-removable. In other embodiments, memory 1912 may be removable memory. Further, in some embodiments, sensor computer 1900 may be arranged to include both fixed memory and volatile memory.

In at least one of the various embodiments, sensor computer 1900 may include one or more antennas, such as, antenna 1906, to support one or more radio transceivers. Supported radios and/or wireless communications systems, such as, NFC, Bluetooth, Bluetooth Low Energy, WiFi, or the like, or combination thereof. In some embodiments, SOC 1904 may be arranged to support one or more of the radio/wireless technologies discussed above. E.g., see description of client computer 1700 above. In some embodiments, sensor computer 1900 may be considered a variation of the system described in FIG. 1.

In at least one of the various embodiments, sensor computer 1900 may include one or more wired interfaces that enable direct communication with the sensor computer via one or more of wires, cables, or the like. In some embodiments, sensor computer 1900 may be arranged to employ one or more wired protocols, such as, I2C, SPI, RS232, CAN bus, or the like.

Sensor computer 1900 may include one or more GPS components, such as, GPS 1916. GPS 1916 may be similar to GPSs described above, such as, GPS 1758 in FIG. 17.

Sensor computer 1900 may include one or more battery/power supply components, such as, Battery/power 1914. In at least one of the various embodiments, sensor computer 1900 may be powered by one or more power sources, including, external batteries, internal batteries, direct vehicle power, solar power, or the like, or combination thereof.

In at least one of the various embodiments, sensor computer 1900 may include instructions that may be executed by a processor on SOC 1904 that enable sensor information to be sampled and collected. Further, sensor computer 1900 may include instructions for comparing captured sensor information with one or more vehicle models for determining if the sensor readings may be of potential interest to a user, vehicle monitoring client application, or analysis server, or the like.

In at least one of the various embodiments, instructions, firmware, programs, sensor calibrations, vehicle models, or the like, may be uploaded from sources, such as, mobile computers running a vehicle monitoring client application, the vehicles infotainment system, or the like. Further, in at least one of the various embodiments, sensor computers, such as, sensor computer 1900 may be paired with one or more mobile computers running a vehicle monitoring client application. For example, in some embodiments, pairing may be performed using BLE protocols.

Illustrative Logical System Architecture

Figure 20:
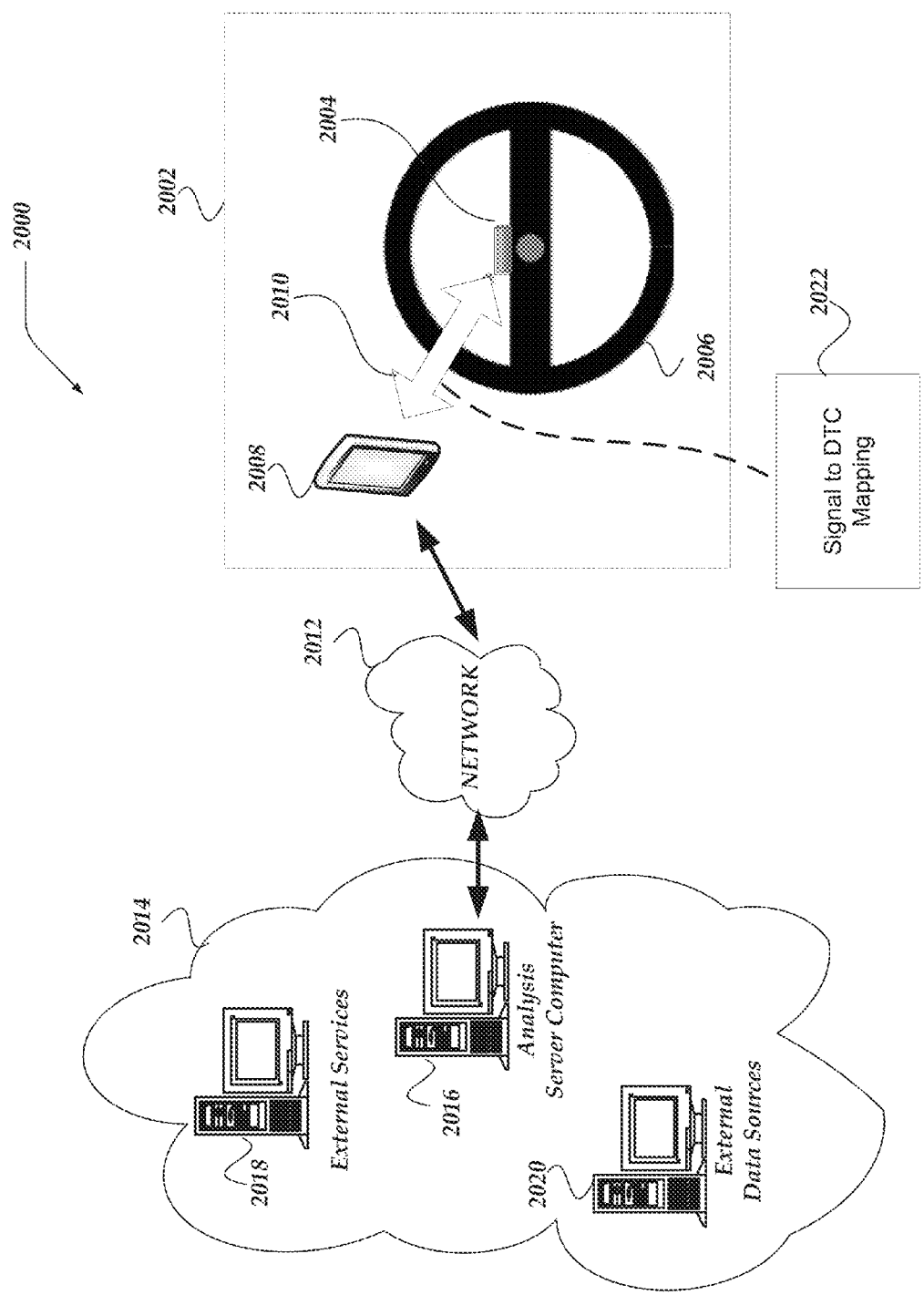
FIG. 20 illustrates a logical schematic of one embodiment of a system for automotive activity monitoring in accordance with at least one of the various embodiments.

FIG. 20 illustrates a logical schematic of system 2000 for automotive activity monitoring in accordance with at least one of the various embodiments. In at least one of the various embodiments, system 2000 may include one or more on-boards components that may be included and/or integrated in a vehicle, such as, on-board (e.g., on the vehicle) components 2002. In some embodiments, on-board component 2002 may include one or more sensor computers, such as, sensor computer 2004. Also, in at least one of the various embodiments, on-board components 2002 may include a vehicle steering wheel or steering columns, such as, steering column 2006. Further, the may be one or more mobile computers, such as, mobile computer 2008, that may be arranged to include one or more vehicle monitoring client application, or the like. In some embodiments, mobile computer 2008 may be an embedded vehicle computer (not shown) and/or integrated with onboard vehicle computer (not shown).

In at least one of the various embodiments, mobile computer 2008 and sensor computer 2004 may be arranged to communicate wirelessly using one or more wireless networking and/or communication technologies, such as, as Bluetooth, Bluetooth Low Energy, WiFi, NFC, or the like, or combination thereof. In at least one of the various embodiments, sensor computer 2004 may be arranged to be communicatively coupled to an on-board vehicle computer, including one or more electronic control unit computers.

Also, in some embodiments, sensor computer 2004 may be arranged to be coupled to a client computer, such as, mobile computer 2008 or an on-board vehicle computer, using wired connections, such as, USB, microUSB, or the like.

In at least one of the various embodiments, mobile computer 2008 may be arranged to communicate over network 2012 to one or more analysis server computers, such as, analysis server computer 2014, or the like. In at least one of the various embodiments, network 2012 may represent one or more networks, such as, wireless network 1608 or network 1610.

In at least one of the various embodiments, analysis server computer 2016, external services 2018, external data sources 2020, or the like, may be located in one or more data centers and/or cloud computing environments, such as, cloud computing environment 2014. In some embodiments, analysis server computer 2016, external services 2018, external data sources 2020 may be located in the same or separate computing environments. Further, in some embodiments, analysis server computer 2016, external services 2018, external data sources 2020, or the like, may be arranged to communicate with each other and/or other computers/services using networks, such as, wireless network 1608 and/or network 1610, or the like.

Note, one of ordinary skill in the art will appreciate that system 2000 may be comprised of more or less components than illustrated in FIG. 20, however, as shown, system 2000 includes sufficient detail to enable the embodiments disclosed herein.

In at least one of the various embodiments, sensor computer 2004, mobile computer 2008, and analysis server computer 2006 may be arranged to operate together to monitor, collect and analyze vehicle performance and/or vehicle operations for automotive activity monitoring as described herein.

In at least one of the various embodiments, sensor computer 2002 and/or mobile computer 2008 may be arranged to employ a mapping engine, such as, mapping engine 2022, to map one or more signals to one or more diagnostic trouble codes. In at least one of the various embodiments, DTCs created by capturing signals and mapping may be communicated to users using various reporting technologies, including, BLE, 3G, GSM, LTE, LTE-M, direct connect, on-board diagnostics, graphical user-interfaces, or the like, or combination thereof.

In at least one of the various embodiments, sensor computer 2004 may be arranged to capture signals corresponding to vibrations, including vehicle components associated with rotational energy that may generate a vibrations. Accordingly, the captured signals may be classified to enable mapping engine 2022 to map one or more signals (or signal sets) to one or more defined DTCs that may correspond to issues related to road shocks, road harshness, hard starts, hard stops, accidents, or the like, as well as, issues arising from the vehicle's, tires, wheels, alignment, suspension, engine, electric motor, brakes, or the like, or combination thereof.

In at least one of the various embodiments, the DTC provided by mapping engine 2022 may be communicated to a user or external system. In at least one of the various embodiments, mapping signals from the sensor computer into a new set of standardized DTCs tailored for vehicle issues detectable by vibrations and steering wheel angles enables integration with external third party components/systems.

In at least one of the various embodiments, the sensor computer 2002 may be integrated into the vehicle, and/or the mobile computer 2008 may also serve as the infotainment system of the said vehicle.

Generalized Operations

FIGS. 21-34 represent generalized operations for automotive activity monitoring in accordance with at least one of the various embodiments. In at least one of the various embodiments, processes 2100, 2200, 2300, 2400, 2500, 2600, 2700, 2800, 2900, 3000, 3100, 3200, 3300, and 3400 described in conjunction with FIGS. 21-34 may be implemented by and/or executed by one or more processors on a single network computer, such as network computer 1800 of FIG. 18. In other embodiments, these processes, or portions thereof, may be implemented by and/or executed on a plurality of network computers, such as network computer 1800 of FIG. 18. In yet other embodiments, these processes, or portions thereof, may be implemented by and/or executed on one or more virtualized computers, such as, those in a cloud-based environment. In at least one of the various embodiments, these processes may be implemented using one or more analysis server computers, one or more mobile computers, one or more sensor computers, one or more vehicle electronic control units (ECUs), one or more in-vehicle infotainment systems, one or more external services, one or more external data sources, or the like, or combination thereof. However, embodiments are not so limited and various combinations of network computers, client computers, mobile computers, sensor computers, or the like may be utilized. Further, in at least one of the various embodiments, the processes described in conjunction with FIGS. 21-34 may be used for automotive activity monitoring in accordance with at least one of the various embodiments and/or architectures such as those described in conjunction with FIGS. 1-20. Further, in at least one of the various embodiments, some or all of the action performed by processes 2100, 2200, 2300, 2400, 2500, 2600, 2700, 2800, 2900, 3000, 3100, 3200, 3300, or 3400 may be executed in part by analysis engine 1822, ingestion engine 1824, modeling engine 1826, or learning engine 1827, running on one or more processors of one or more network computers. Further, in at least one of the various embodiments, some or all of the actions performed by processes 2100, 2200, 2300, 2400, 2500, 2600, 2700, 2800, 2900, 3000, 3100, 3200, 3300, or 3400 may be executed in part by vehicle monitoring client application 1722, or the like.

Figure 21:
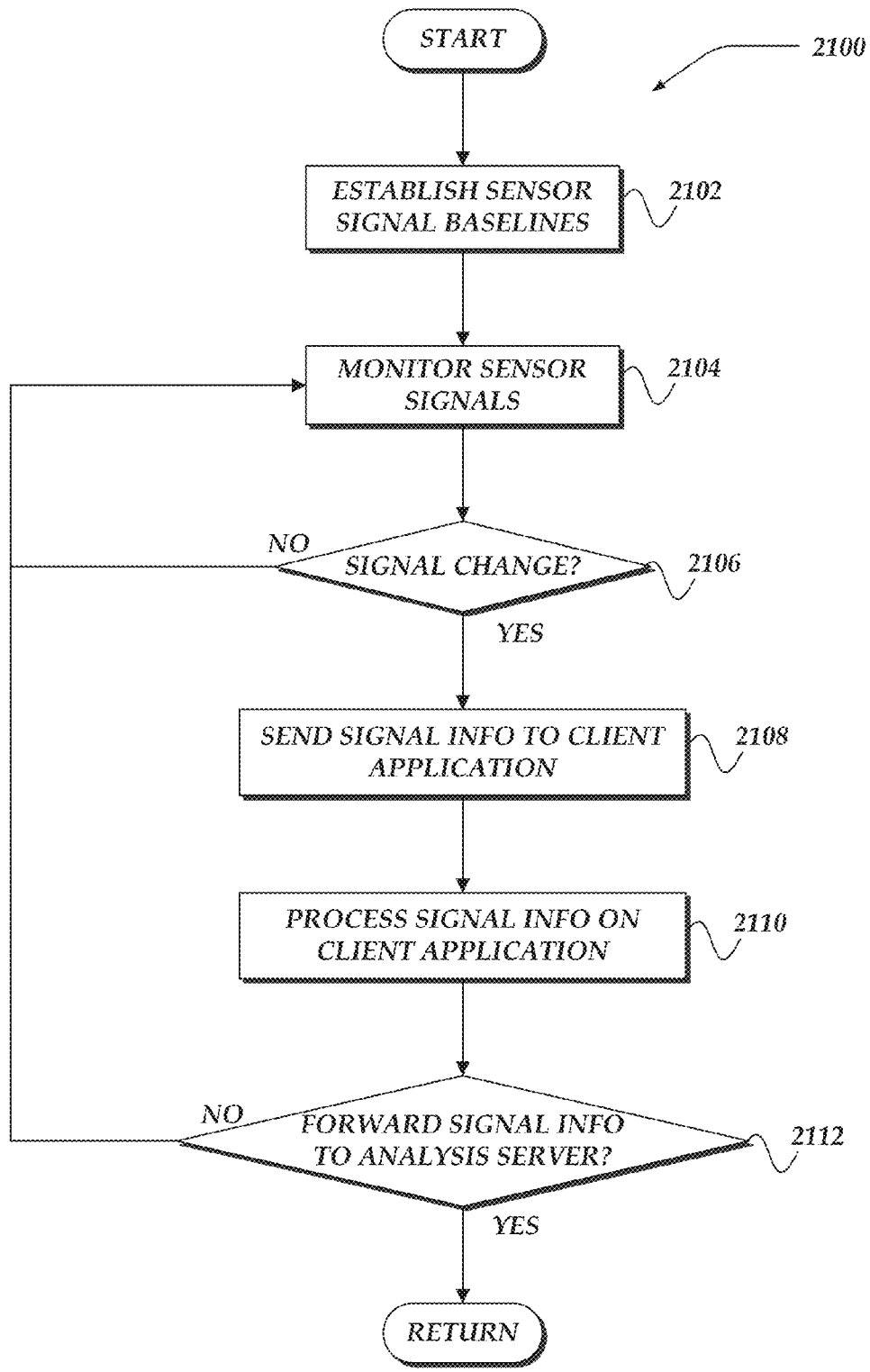
FIG. 21 illustrates an overview flowchart of one embodiment of a process for automotive activity monitoring in accordance with at least one of the various embodiments.

FIG. 21 illustrates an overview flowchart of process 2100 for automotive activity monitoring in accordance with at least one of the various embodiments. After a start block, at block 2102, in at least one of the various embodiments, one or one more sensor signal baselines may be established. In at least one of the various embodiments, each vehicle with a sensor computer installed, may be arranged to gather three datasets on day zero; these may be collected during steady state driving at various defined speeds, such as, 25 mph, 45 mph, or 70 mph (or 10 m/s, 20 m/s, or 30 m/s). In some embodiments, this data may serve as operational baselines for a monitored vehicle. After the baselines are collected, data collected from each vehicle trip may be compared to the baseline data.

At block 2104, in at least one of the various embodiments, sensor signals may be monitored. As described above, a sensor computer may include various sensors, such as, accelerometers and/or gyroscopes for detecting one or more signals, such as, vibrations, shock, rotation, tilt, yaw, speed, acceleration, internal sound/noise, external sound/noise, or the like, or combination thereof.

Further, in some embodiments, one or more other signal sources in addition to a sensor computer may provide signals that may be monitored. In some embodiments, other signal sources may include one or more other onboard sensor systems. Likewise, in at least one of the various embodiments, a user's mobile computer may be arranged to collect various signals that may be monitored as well, such as, vibration, acceleration, sound/noise, or the like, or combination thereof.

In at least one of the various embodiments, a sensor computer may be arranged to compare the signal samples to one or more models to determine if the signals represent a change in the operational characteristic of the vehicle that may be of interest to a user and/or the analysis server computer.

In at least one of the various embodiments, after the baselines are collected, the system may be arranged to collect data from each trip to compare to the baseline data. Also, in at least one of the various embodiments, the system may be arranged to set a maximum number of samples per trip per speed. For example, in some embodiments, the system may be configured to collect 10 samples for one or more speeds, such as, 25 mph, 45 mph, 70 mph, and so on. The sampling may occur at an exponentially decaying rate through the length of the trip. For example, in a given trip, data may be collected the first time a car hits a steady state at 25 mph. The next time that speed occurs, data may be collected if more than one minute has elapsed since the first collection or if a recognized event (e.g. road shock) has occurred. The time gap may then be increased geometrically. For example, the time gap may increase from one to two, four, eight etc. If a road shock exceeds a predefined threshold, the timer may be reset.

In at least one of the various embodiments, during a given trip, the first dataset collected may be always be saved. After that, each set collected may be compared to baseline and may be saved only if the difference from baseline exceeds a defined threshold.

In at least one of the various embodiments, in addition, to steady state driving, the sensor computer may be arranged to capture sensor data related to acceleration. For example, if a change of more than 1 m/s^2 (positive or negative) is detected (starting from one of the three baseline speeds) a dataset may be collected by the sensor computer. In some embodiments, this may trigger an investigation of potential braking issues, such as rotor warping and brake wear.

In at least one of the various embodiments, the sensor computer may be arranged to capture sensor data relating to the propulsion and/or propulsion systems of the vehicle. Accordingly, in some embodiments, acceleration may be tracked to detect electrical motor, engine, drivetrain, or exhaust issues, or the like.

At decision block 2106, in at least one of the various embodiments, if the signals indicate to the sensor computer that a change in the operational characteristics of the vehicle may have occurred, control may flow to block 2108; otherwise, control may loop back to block 2104 for continued monitoring of signals. In at least one of the various embodiments, one or more threshold values may be defined to indicate a change in sensed signals that may be of interest.

In at least one of the various embodiments, the particular threshold values may be based on one or more models associated with the current vehicle being monitored and/or one or more user preferences.

In at least one of the various embodiments, this initial decision may be determined by the sensor computer absent direct communication with another application or computer. In at least one of the various embodiments, models, configuration information, or the like, downloaded to the sensor computer from a vehicle monitoring client application may be employed by the sensor computer to determine if signal change of importance has occurred.

At block 2108, in at least one of the various embodiments, the sensor computer may be arranged to communicate signal information to a vehicle monitoring client application executing on a mobile computer (or other client computer) that may be associated with the sensor computer. In at least one of the various embodiments, one or more radios on the sensor computer may be employed to communicate the signal information to the vehicle monitoring client application. In at least one of the various embodiments, the sensor computer may be arranged to include the vehicle monitoring client application.

At block 2110, in at least one of the various embodiments, the vehicle monitoring client application may process the signal information provided by the sensor computer.

At decision block 2112, in at least one of the various embodiments, if the vehicle monitoring client application determines that some or all of the signal information should be communicated to an analysis server, control may be returned to a process that may be arranged to communicate the signal information to the appropriate analysis server computer. Otherwise, control may loop back to block 2104 for continued monitoring.

In at least one of the various embodiments, the sensor computer may be arranged to employ one or more radios to communicate directly with the analysis server computers rather than using the client computer as a go between.

Figure 22:
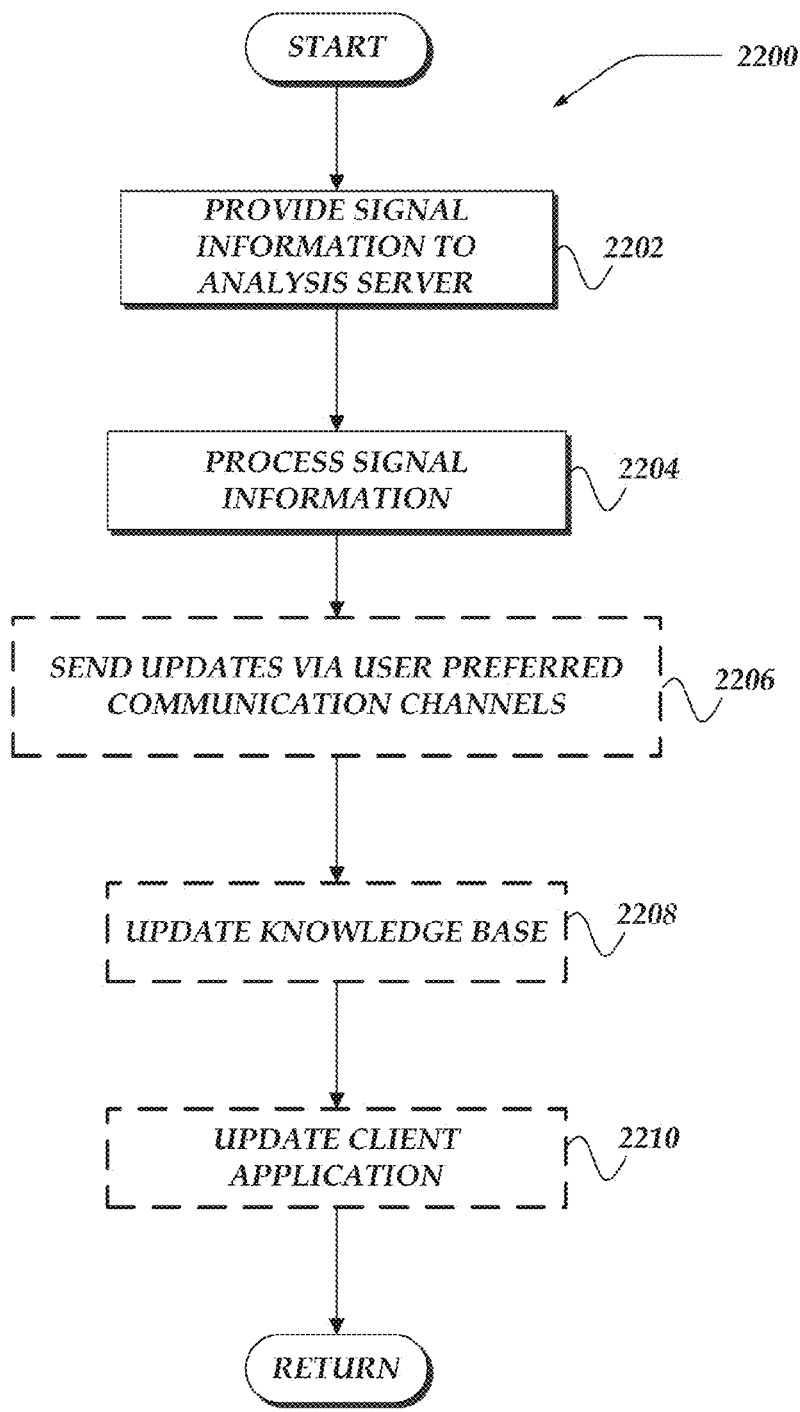
FIG. 22 illustrates an overview flowchart of one embodiment of a process for processing vehicle sensor information on an analysis server computer in accordance with at least one of the various embodiments.

FIG. 22 illustrates an overview flowchart of process 2200 for processing vehicle sensor information on an analysis server computer in accordance with at least one of the various embodiments. After a start block, at block 2202, in at least one of the various embodiments, signal information may be provided to the analysis server computer. In at least one of the various embodiments, a mobile computer running a vehicle monitoring client application may communicate signal information to the analysis server.

In at least one of the various embodiments, the format and type of signal information may vary depending on the circumstances. In some embodiments, the signal information may be raw sensor information collected by a sensor computer and provided to the mobile computer. In some cases, the signal information may be pre-processed metadata comprising metrics information collected/computed by the vehicle monitoring client application, sensor computer, other on-board sensors (on-board to the vehicle), or the like, or combination thereof.

At block 2204, in at least one of the various embodiments, the analysis server may process the provided signal information. For example, an analysis engine, such as analysis engine 1822 may be arranged to process the provided signal information. In at least one of the various embodiments, the particular processing performed by the analysis engine may depend on the type of information that may be provided. Also, in at least one of the various embodiments, the signal information may be provided using a communication protocol that allows for command information to be included.

Accordingly, in at least one of the various embodiments, the analysis engine may be arranged to different actions and/or processing depending on the command information.

Also, in at least one of the various embodiments, the analysis engine may be arranged determine the particular processing to perform based on configuration information that includes one or more rule-based policies and/or rules that may select processing actions based on the information provided by the vehicle monitoring client application.

At block 2206, in at least one of the various embodiments, optionally, one or more user preferred channels may be employed to communicate updates to the user. In at least one of the various embodiments, preferred channels may include, SMS, MMS, or social networks. Log records, ledgers, apps, or the like, that may be associated with the user may be updated based on the signal information and/or results of one or more of the processing actions performed by the analysis engine. For example, an analysis engine may include configuration information that may define more or more communication channels that should receive updates that may be associated with one or more events that may be determined from the signal information.

In at least one of the various embodiments, information such as, trip destination, distance traveled, average miles per hour, duration, or the like, may be updated and/or communicated according to permissions or rules established by the user.

In at least one of the various embodiments, this block may be considered optional since some signal information may trigger updates while other signal information may not trigger updates.

At block 2208, in at least one of the various embodiments, optionally, one or more knowledge bases may be updated. As described herein, in at least one of the various embodiments, one or more knowledge bases may be arranged to store signal information and/or event information derived from signal information. Accordingly, in some embodiments, depending on signal information and/or configuration information, the analysis engine may be arranged to update one or more knowledge bases or databases. In some embodiments, one or more knowledge bases may be provided raw sensor data. In other cases, some knowledge bases may be arranged to accept aggregated metric data rather than raw sensor information.

Likewise, in at least one of the various embodiments, information stored in the one or more knowledge bases may be restricted to particular users associated with the vehicle associated with the signal information. In some embodiments, one or more knowledge bases may be arranged to collect and store information associated with a plurality of users. For example, signal information from all vehicles may be collected and used by a modeling engine to produce various models. In such cases, the signal information provided to the community knowledge bases may be anonymized to remove protected personal information as necessary.

In at least one of the various embodiments, the modeling engine employ may employ a learning engine, such as, learning engine 1827 may provide ever-refining models. In some embodiments, the learning engine may employ supervised learning, clustering, dimensionality reduction, or other data science techniques. The learning engine may also use information from available sources including but not limited to a plurality of sensor inputs some of which may come from sensor computer 2004, while others may come from mobile computer 2008, and others may come from other vehicle systems and data sources.

In at least one of the various embodiments, this block may be considered optional since some signal information may trigger knowledge base updates while other signal information may not trigger knowledge base updates.

At block 2210, in at least one of the various embodiments, optionally, the analysis engine may determine that one or more updates be need to be provided to one or more mobile computers running vehicle monitoring client applications. In at least one of the various embodiments, the results of the processing in block 2204, or the like, may indicate that one or more of the user's mobile computer requires updated information. For example, processing may result in updated models that may need to be pushed out the client computer and/or to the sensor computers. In some embodiments, this may include updates to the vehicle monitoring client application, local models, local user data, or the like, or combination thereof.

In at least one of the various embodiments, updates to client computers and/or sensor computers may be limited to those that are associated with one or more users that may be associated with the vehicle providing the signal information. In other cases, in some embodiments, additional users may have their client computers and/or sensor computers updated. In at least one of the various embodiments, some updates may be targeted for all users, some users, or one user, depending on the type of update. For example, an updated vehicle model for a particular type of vehicle may be pushed to every user that is associated with that particular type of vehicle.

In at least one of the various embodiments, this block may be considered optional since some signal information may trigger client updates while other signal information may not trigger client updates. Next, control may be returned to a calling process.

Figure 23:
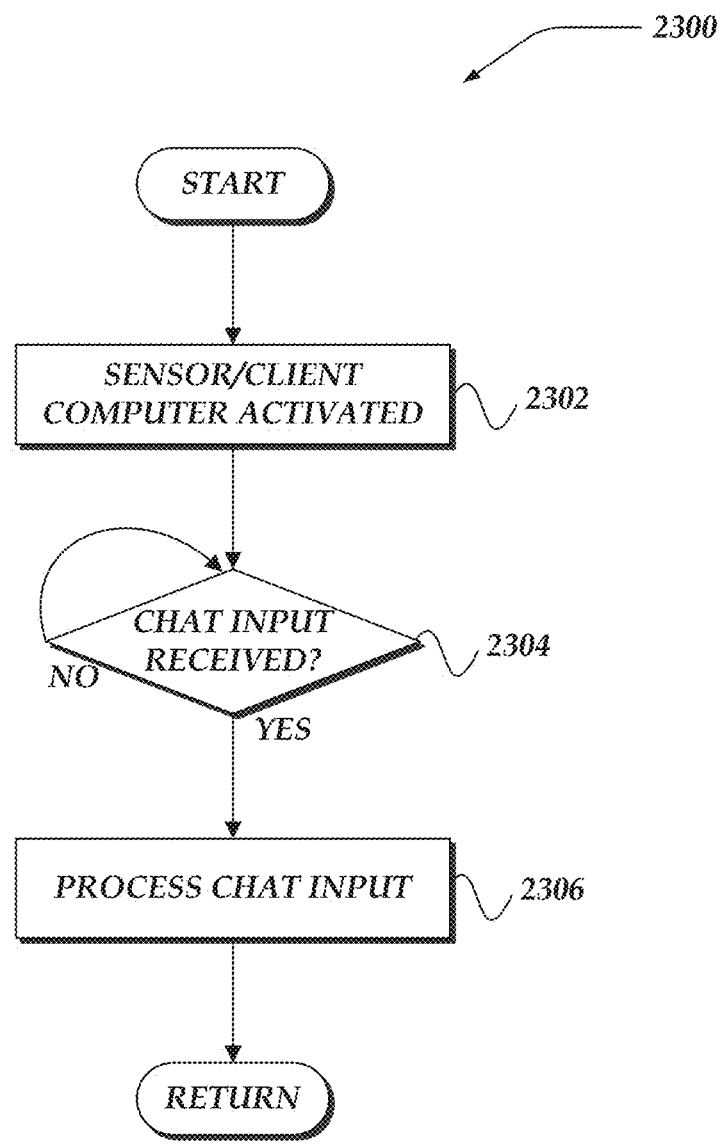
FIG. 23 illustrates an overview flowchart of one embodiment of a process for a chat bot for interacting with monitored vehicles in accordance with at least one of the various embodiments.

FIG. 23 illustrates an overview flowchart of process 2300 for a chat bot for interacting with monitored vehicles in accordance with at least one of the various embodiments. In at least one of the various embodiments, chat bots may represent various natural language interfaces that may be arranged to obtain voice commands from a user. In at least one of the various embodiments, the chat bots may be integral to one or more of, the sensor computer, the vehicle monitoring client applications on a mobile computer, onboard vehicles computers, or the like. In some embodiments, the one component may capture the audio for voice commands while another component perform the processing for interpreting the commands. Further, in some embodiments, different actions represent by process 2300 may be performed on the same of different components. For example, in some embodiments, a mobile computer may capture the voice commands and provide them to a cloud based application for further processing. In other embodiments, the voice audio may be captured by an onboard vehicle computer that may communicate them to a mobile computer running vehicle monitoring client applications.

After a start block, at block 2302, in at least one of the various embodiments, a sensor computer installed in a vehicle may be activated. In at least one of the various embodiments, a described herein, various mechanisms and/or methods may be employed to activate a sensor computer. For example, in some embodiments, a sensor computer may be arranged to be activated when a user presses a button. In other embodiments, the sensor computer may be automatically activated if the vehicle is opened, a user enters, a user touches the steering wheel, the vehicle is started, voice activation by a paired users, the presence of RFID dongles, or the like, or combination thereof. Alternatively, in at least one of the various embodiments, a client computer running a vehicle monitoring client application may be activated similarly. For example, the sensor computer may detect if a user has touched the steering wheel, started or entered a vehicle and then communicate an activation command/notification to the user's mobile computer that may be running a vehicle monitoring client application.

In another embodiment, the sensor computer 2004 may remain in a low power state until the user has touched the steering wheel, started or entered the vehicle, and then may wake up and reconnect with the mobile computer 2008.

At decision block 2304, in at least one of the various embodiments, if chat input is provided to the sensor computer or client computer, control may flow to block 2306; otherwise, control may loop waiting for chat input. As mentioned above, in at least one of the various embodiments, the chat input may be captured directly by one device and then communicated to another device (including cloud based computers) for further processing.

At block 2306, in at least one of the various embodiments, the provided chat inputs may be processed by the sensor computer or client computer. In at least one of the various embodiments, the extent of the processing may depend on the capabilities of the computer that is provided the chat inputs and/or the type of chat inputs. For example, some voice chat inputs may require off-board (e.g., cloud-based) systems to perform the voice recognition processing that may be required to interpret the chat inputs.

In at least one of the various embodiments, there may a plurality of defined chat commands supported by the system. One or more of the chat commands may activate one or more processes related to operation and/or monitoring of the vehicle. In other embodiments, one or more chat commands may be arranged to interact with one or more external systems, such as, vehicle maintenance providers, messaging systems, event calendars, social networks, or the like, or combination thereof.

In at least one of the various embodiments, one or more prompts may be provided to initiate one or more expected chat inputs. For example, if a sensor computer detects that a user has started his or her vehicle, the sensor computer may be arranged communicate a corresponding event to the user's mobile computer (e.g., running a vehicle monitoring client application). Accordingly, in this example, the mobile computer may be used to issue a chat prompt, such as, asking the user for their desired destination.

In at least one of the various embodiments, a user's mobile computer may be running a chat bot, such as, chat bot 1723 that may be arranged to establish an interactive session with the user. Accordingly, the chat bot may be configured to associate one or more chat prompts and/or chat inputs with one or more operations that may be performed by the vehicle monitoring client application and/or the sensor computer.

Next, control may be returned to a calling process.

Figure 24:
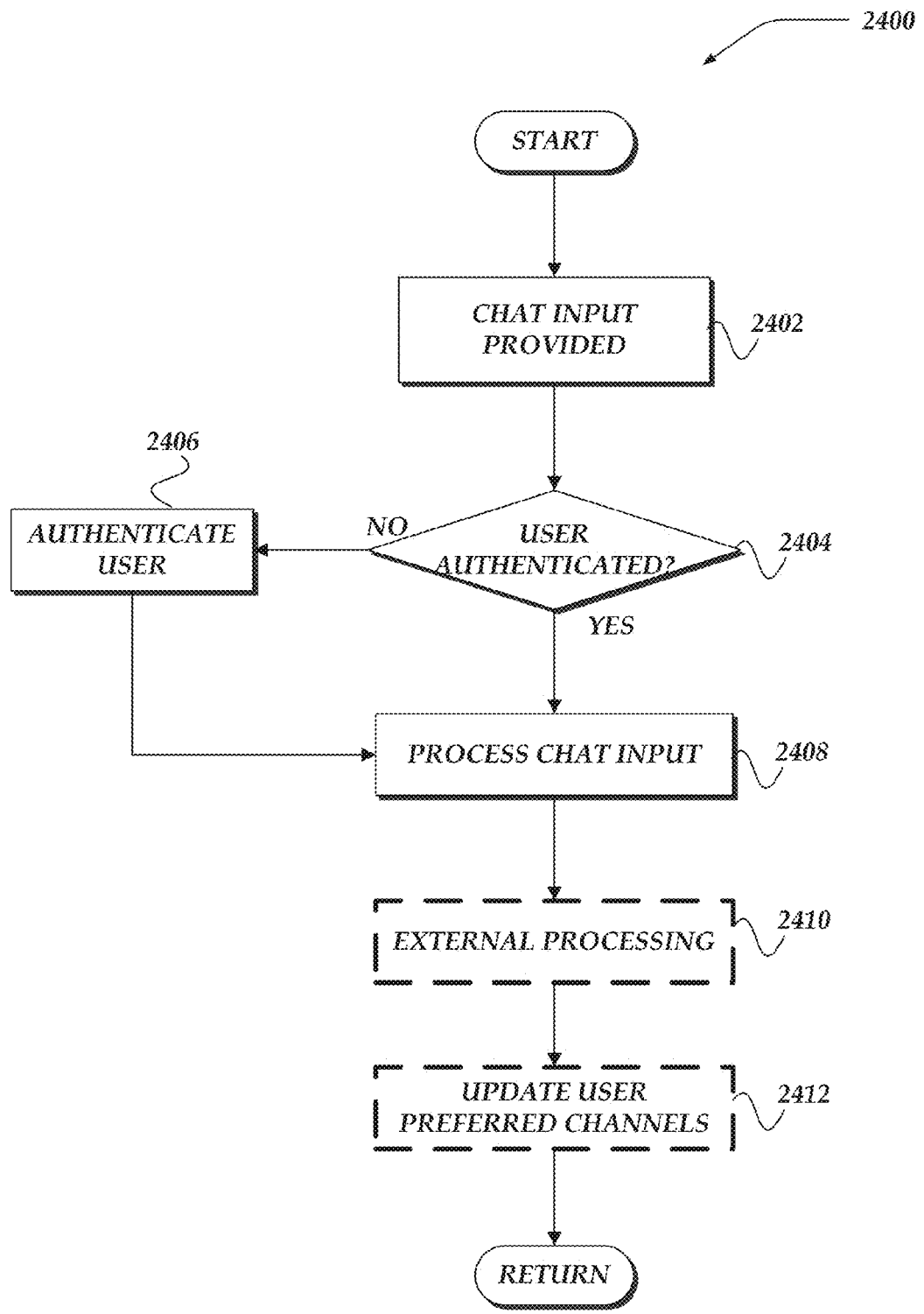
FIG. 24 illustrates a flowchart of one embodiment of a process for a chat bot for interactions in accordance with at least one of the various embodiments.

FIG. 24 illustrates a flowchart of process 2400 for a chat bot for interactions in accordance with at least one of the various embodiments. After a start block, at block 2402, in at least one of the various embodiments, chat inputs may be provided to a client computer. In at least one of the various embodiments, depending on the capabilities of the computer processing the input, chat inputs may be short one or two word commands. In some embodiments, chat inputs may be natural language expressions. Further, in at least one of the various embodiments, chat inputs may be part of a larger chat session that the user may be participating. Accordingly, various chat inputs may be associated with different operations depending on the sequence of given command as well as the results of previously issued chat commands.

At decision block 2404, in at least one of the various embodiments, before taking actions or attempting to process the chat inputs, the client computer may attempt to authenticate the user. In at least one of the various embodiments, a user may be authenticated using various methods. In some cases, a voice print associated with a user may be compared to the chat inputs. In some embodiments, the client computer may be arranged to ask for a pin number, passphrases, or the like, or combination thereof.

In at least one of the various embodiments, authentication of the user may be inferred from the user having authorized access to the client computer running the vehicle monitoring client application. For example, if the user has unlocked the client computer, in some embodiments, it may be assumed that the user is authenticated. In at least one of the various embodiments, multifactor authentication may be employed. For example, in at least one of the various embodiments, a user may be required to be in the vehicle before chat inputs are accepted. Accordingly, if the user is authenticated, control may flow block 2408; otherwise control may flow to block 2406

At block 2406, in at least one of the various embodiments, the client computer and/or sensor computer, may perform one or more actions to authenticate the user. As described above one or more methods may be performed to identify and authenticate the user. In at least one of the various embodiments, if authentication is not successful, the chat inputs may be discarded or otherwise ignored.

At block 2408, in at least one of the various embodiments, the chat input may be processed. In at least one of the various embodiments, a vehicle monitoring client application may be arranged to interpret various chat inputs and perform one or more corresponding actions.

In at least one of the various embodiments, a chat input profile may be developed and/or maintained for one or more users. In at least one of the various embodiments, the user profiles may be used to associate particular chat inputs and/or chat options with a given user. Also, in at least one of the various embodiments, user profiles may include information for tracking individual voice characteristics for users. For example, a chat bot system may be arranged to enable users to choose between conflicting interpretations of their voice input. Accordingly, for this example, a user's chat input profile may include (or reference) such user provided choices/corrections so they may be used in future if needed. Likewise, in at least one of the various embodiments, the user profile may define the chat inputs that the user is authorized to provide.

At block 2410, in at least one of the various embodiments, optionally, one or more chat inputs may trigger and/or require external processing. In at least one of the various embodiments, the chat inputs may be associated with one or more operations that may be performed by external services. In this context, external services may include services/facilities external to the user's client computer and external to the sensor computer. Thus, in at least one of the various embodiments, external services may include operating the vehicle's infotainment system. Also, for example, in some embodiments, an external service may be an email system, secondary voice recognition systems, online search engines, online references, or the like, that may be accessed because of the chat inputs.

In at least one of the various embodiments, external services in this context may include other applications running on the client computer. For example, the chat inputs processed by the vehicle monitoring client application may be configured to initiate a SMS text messages using the texting facility of the client computer.

In at least one of the various embodiments, this block may be considered optional since some chat inputs may trigger external processing while other chat inputs may not trigger external processing.

At block 2412, in at least one of the various embodiments, optionally, one or more user preferred channels may be employed to communicate updates to the user. In at least one of the various embodiments, preferred channels may include, SMS, MMS, social networks, log records, ledgers, apps, or the like, that may be associated with the user may be updated based on the chat input and/or results of processing the one or more chat inputs.

In at least one of the various embodiments, this block may be considered optional since some chat inputs may trigger updates while other chat inputs may not trigger updates.

Next, control may be returned to a calling process.

Figure 25:
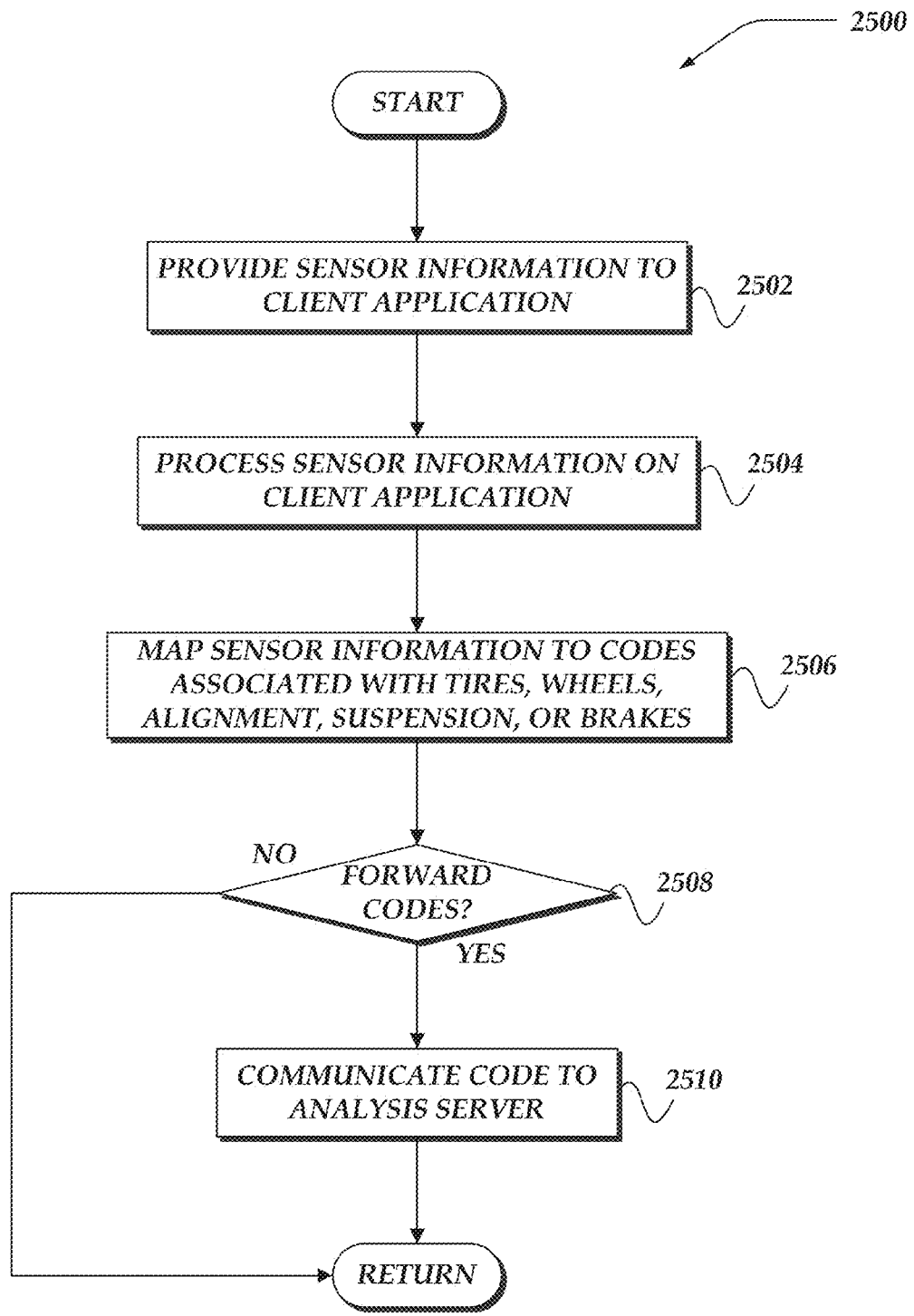
FIG. 25 illustrates a flowchart of one embodiment of a process for a collecting sensor information in accordance with at least one of the various embodiments.

FIG. 25 illustrates a flowchart of process 2500 for a collecting sensor information in accordance with at least one of the various embodiments. After a start block, at block 2502, in at least one of the various embodiments, a sensor computer may provide sensor information to a vehicle monitoring client application. As described above, sensor information may be provided to the client application if the sensor computer determines that some or all of the signal information should be provided to the user's client computer.

At block 2504, in at least one of the various embodiments, the signal information may be processed by the vehicle monitoring client application to determine how to proceed. In at least one of the various embodiments, the vehicle monitoring client application may be arranged to compare the signal information to one or more models stored on the mobile computer that may be running the client applications.

At block 2506, in at least one of the various embodiments, the vehicle monitoring client application may be arranged to map the sensor information to one or more diagnostic codes that may be associated with issues related one or more of tires, wheels, alignment, suspension, internal combustion engine, electric propulsion system, drivetrain, or brakes of the vehicle. In at least one of the various embodiments, the issue type may be identified based on information retrieve from the vehicle model corresponding the vehicle that is hosting the sensor computer.

In at least one of the various embodiments, the client application may be arranged to employ configuration information to map particular codes to particular signal information. In some embodiments, the signal information may include mapping information. For example, in some cases, the sensor computer or client computer may transform raw sensor signals in diagnostic trouble codes corresponding to one or more internal combustion engine, electric propulsion system, drivetrain, tires, wheels, alignment, suspension, or brake events. In at least one of the various embodiments, the client computer may be required to process the signal information to determine how to map one or more codes to the signals. In other cases, the sensor computer may be able to assign a trouble code directly and provide it to the vehicle monitoring client application. See, FIG. 33 and FIG. 34.

At decision block 2508, in at least one of the various embodiments, if the codes are to forwarded to another application or computer, control may flow to block 2510; otherwise, control may be returned to a calling process. In some embodiments, the diagnostic trouble codes may be provided to the analysis server and recorded in vehicle ledger. In at least one of the various embodiments, the vehicle monitoring client application may be arranged to use configuration information to determine if trouble code information should be communicated to the analysis server.

At block 2510, in at least one of the various embodiments, the codes may be communicated to an analysis server for further processing. In at least one of the various embodiments, the analysis server may be arranged to analyze the sensor data and map it to one or more trouble code as necessary. For example, the analysis server may have access to more recent and/or more advanced vehicle models that it may use to determine if the sensor data should be mapped to one or more diagnostic trouble codes.

Next, control may be returned to a calling process.

Figure 26:
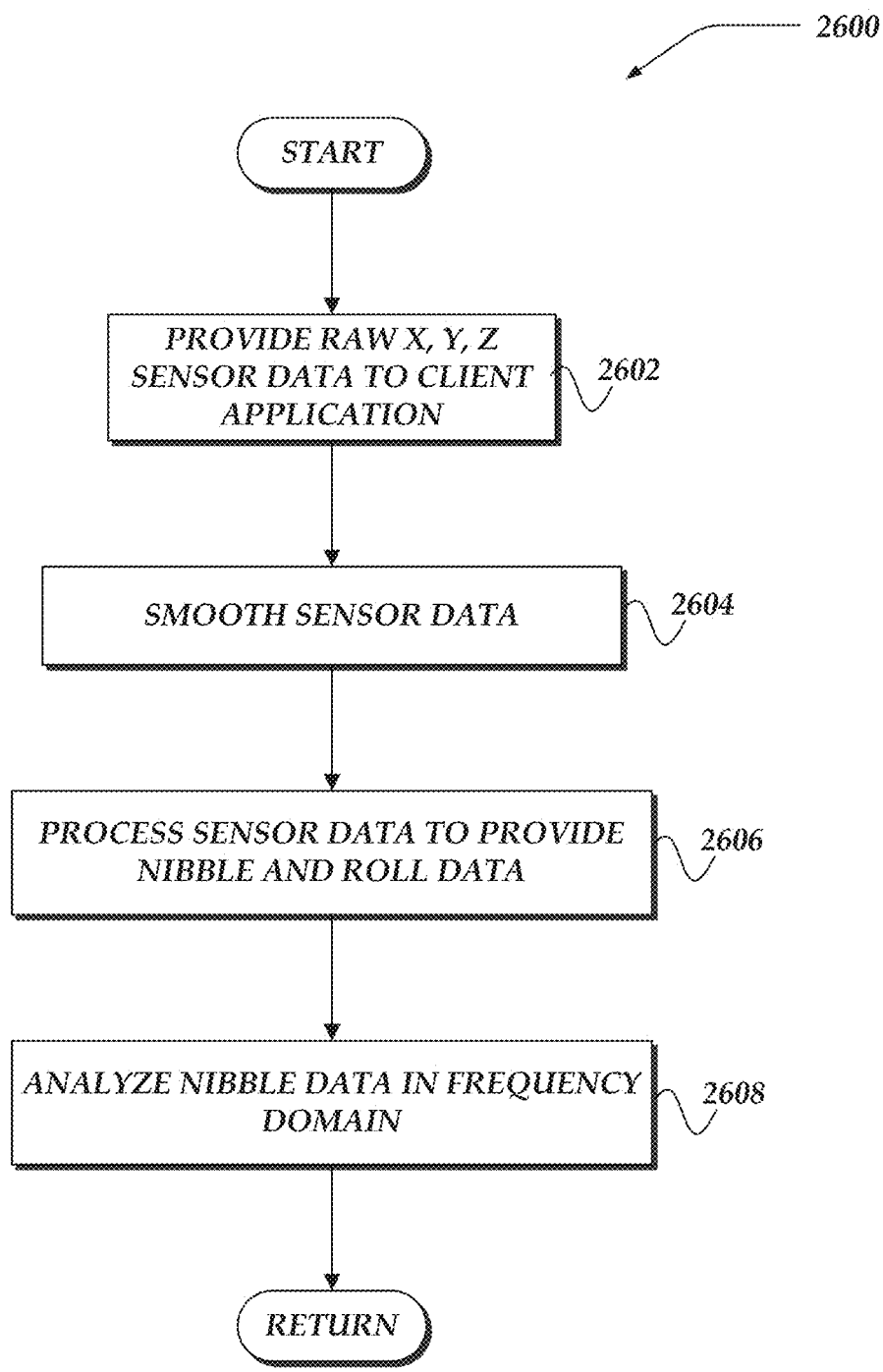
FIG. 26 illustrates a flowchart of one embodiment of a process for a processing steering system data in accordance with at least one of the various embodiments.

FIG. 26 illustrates a flowchart of process 2600 for a processing steering system data in accordance with at least one of the various embodiments. After a start block, at block 2602, in at least one of the various embodiments, raw sensor data may be provided to the client application by the sensor computer. In at least one of the various embodiments, the sensor data may include x-axis, y-axis, and z-axis information generated from one or more accelerometer/gyro sensors of the sensor computer.

At block 2604, in at least one of the various embodiments, the sensor data may be smoothed using one or more signal processing methods. In at least one of the various embodiments, the sensor data may be smoothed to dampen the effect of road noise on the calculations. In at least one of the various embodiments, a moving average (moving window) may be employed as a high pass filter on the x-axis, y-axis, and z-axis sensor values. In some embodiments, smoothing may be accomplished using a Gaussian blurring or other signal processing techniques.

In at least one of the various embodiments, a moving average may be computed by selecting a window size to determine how many values may be grouped together. In general, a larger window size may result in smoother data with less small-scale accuracy. If smoothing is successful, the sampled sensor data points may be replaced using the average of all the data points in the selected smoothing window. The window is moved to the next sensor data point and the smoothing operation may repeat. For example, if a window of size three is defined, then each point may be replaced with the average of seven values (the three points preceding the data point of interest, the data point itself, and the three following points).

At block 2606, in at least one of the various embodiments, the sensor data may be processed to provide nibble and roll data corresponding the monitored vehicle. In at least one of the various embodiments, after smoothing the sensor data roll values may be computed where:

$$Roll = x^2/(y^2 + z^2),$$

where x, y, and z are accelerometer readings provided by the sensor computer.

Next, nibble values may computed to represent the change in roll from one sensor measurement to the next:

$$Nibble_i = Roll_i - Roll_{(i-1)}$$

For $1 <= i <=$ (number sensor data points). Thus, a sequence of x-axis, y-axis, and z-axis values from the sensor computer enables the determination of a sequence of roll values, which may be used to produce a sequence of nibble values.

At block 2608, in at least one of the various embodiments, the nibble data may be analyzed in the frequency domain. In at least one of the various embodiments, a discrete Fourier transform (DFT) may be computed based on the provided nibble values enabling an analysis of the nibble values to use the frequency domain.

In at least one of the various embodiments, DFTs may be used to search for anomalous behavior. In some embodiments, an alert may be raised if the spectral power rises above a defined threshold in a given frequency range. For example, it may be observed that wheel imbalances may produce high spikes at characteristic frequencies (depending on wheel size).

In at least one of the various embodiments, anomalies in vehicle operations may detected using Dynamic Time Warping (DTW) where DTW is a distance metric between two time series, such as a nibble value time series. For example, two nibble time series having a large DTW distance may trigger an alert that vehicle service is needed. Accordingly, differences from established base lines series values may trigger an alert.

Next, control may be returned to a calling process.

Figure 27:
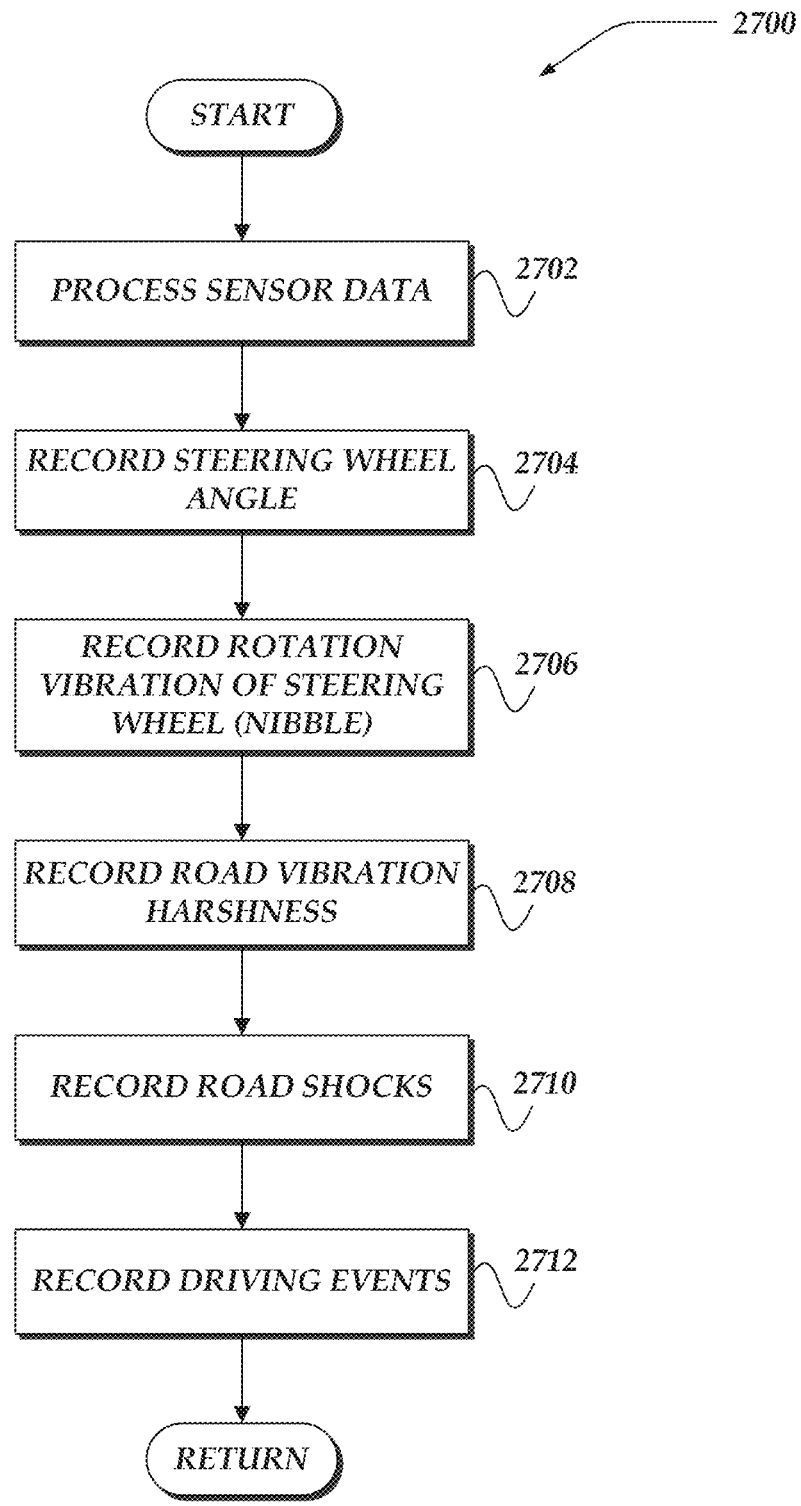
FIG. 27 illustrates a flowchart of one embodiment of a process for a collecting metrics based on sensor data in accordance with at least one of the various embodiments.

FIG. 27 illustrates a flowchart of process 2700 for a collecting metrics based on sensor data in accordance with at least one of the various embodiments. After a start block, at block 2702, in at least one of the various embodiments, the client application may process the sensor data. In at least one of the various embodiments, the sensor computer may be arranged to measure vibrations that indicate various potential problems with a monitored vehicle.

At block 2704, in at least one of the various embodiments, steering wheel angle may be determined and recorded. In at least one of the various embodiments, ideal steering angle may be considered to be zero degrees. Accordingly, the sensor computer may be arranged to sample and capture the difference in the steering wheel's angle from the ideal of zero degrees.

In at least one of the various embodiments, non-ideal steering angle and/or changes in steering wheel angle may indicate issues such as, steering wheel offset, vehicle wheel alignment, low tire pressure on one or more of the wheels, problems with steering linkages, or the like.

At block 2706, in at least one of the various embodiments, rotational vibration of the steering wheel may be determined and recorded. In at least one of the various embodiments, rotational vibration of the steering wheel may be measured using nibbles as discussed above. Deviation from expected values may indicate potential problems such as wheel imbalance, tire damages, or the like. Also, in at least one of the various embodiments, rotational vibration during de-acceleration may indicate potential problem with the monitored vehicles brakes.

At block 2708, in at least one of the various embodiments, road vibration related to harshness may be determined and recorded. Excessive road vibration may indicate vehicle suspension issues. In some embodiments, road vibration measurement may be compared against peer data of other vehicles to determine if the measured values indicate potential problems.

At block 2710, in at least one of the various embodiments, road shocks may be determined and recorded. In some embodiments, road shocks may be indicated by short-lived extreme vibration measurements. In at least one of the various embodiments, road shocks may indicate major or minor collisions have occurred that may require maintenance follow-ups to ensure that vehicle is safe to operate.

At block 2712, in at least one of the various embodiments, driving events may be determined and recorded such as extreme acceleration/de-acceleration, or the like. In at least one of the various embodiments, additional post-capture operations such as those described herein may also be performed depending the type of signal and configuration. Next, control may be returned to a calling process.

Figure 28:
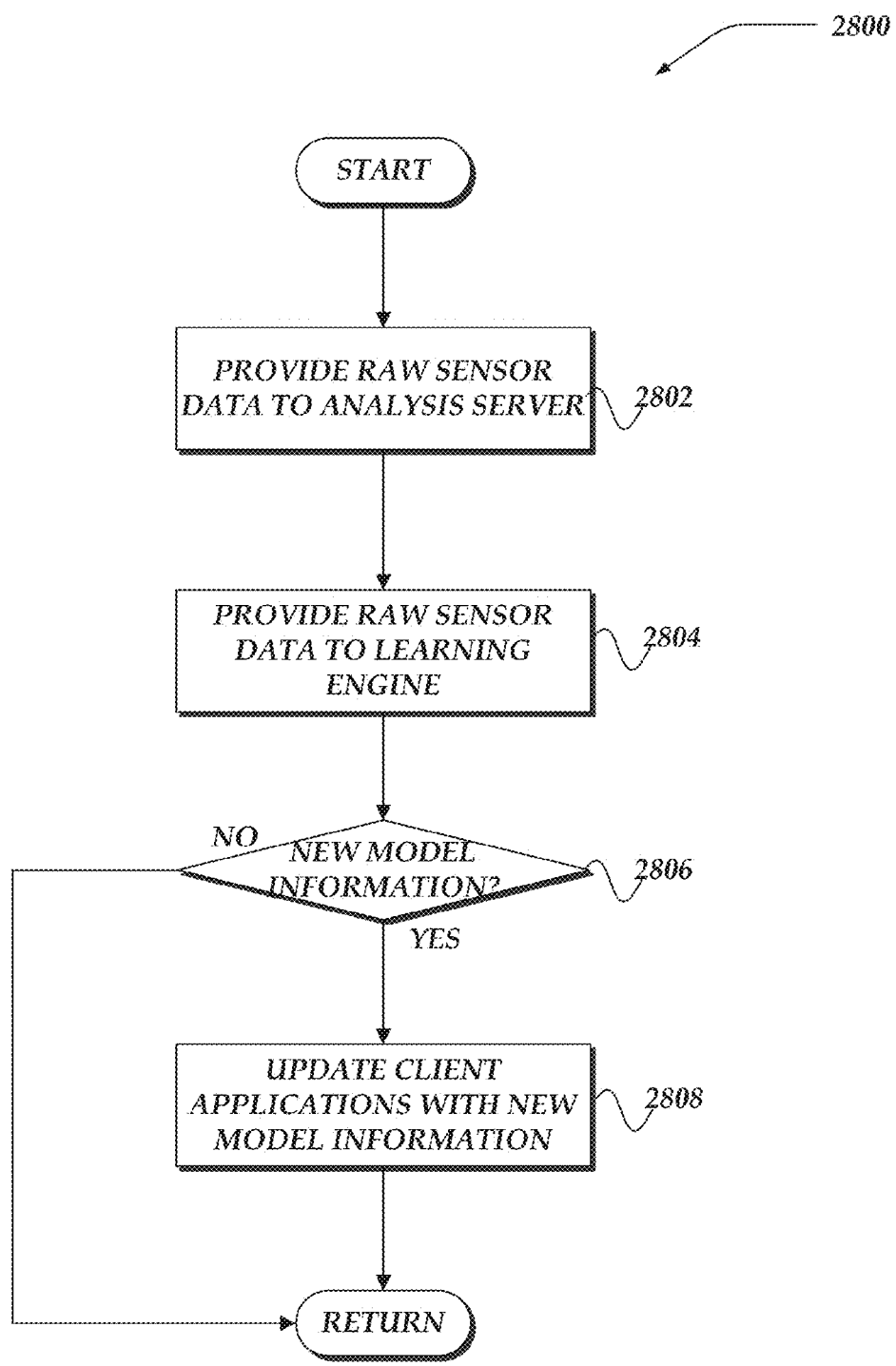
FIG. 28 illustrates a flowchart of one embodiment of a process for a learning engine to provide models based on sensor data in accordance with at least one of the various embodiments.

FIG. 28 illustrates a flowchart of process 2800 for a machine learning engine to provide models based on sensor data in accordance with at least one of the various embodiments. After a start block, at block 2802, in at least one of the various embodiments, raw sensor data may be provided to an analysis server. In at least one of the various embodiments, a vehicle monitoring client application may be arranged to collect sensor data from the sensor computer and forward it to an analysis server. In some embodiments, the analysis server may store the raw sensor data in a data store so it may be used for later analysis. In at least one of the various embodiments, the raw sensor data may be classified based on vehicle characteristics (including year, make and model), user characteristics (e.g., age, gender, or the like), trip characteristics (e.g., duration, time-of-day, climate, location, or the like), sensor type, or the like.

At block 2804, in at least one of the various embodiments, the raw sensor data may be provided to the learning engine. A learning engine, such as, learning engine 1827, may be arranged to perform one or more machine learning processes to generate models that may be used for identifying anomalies based on sensor data. Also, in at least one of the various embodiments, predictive models may be generated that predict potential vehicle problems based on observed sensor data.

In at least one of the various embodiments, the learning engine may also be arranged to define/recommend one or more of the threshold values used by models to determine if a measured sensor value is within a baseline range or if it may be anomalous indicating a potential problem with the monitored vehicle.

In at least one of the various embodiments, the learning engine may be arranged to provide confidence scores for models that may be associated with values, features, classifiers, or the like, for the different models. These confidence values may be increased or decreased as more raw data collected. Also, in at least one of the various embodiments, expert users may be enable to tune models, including modifying confidence score, as necessary.

At decision block 2806, in at least one of the various embodiments, if there is new or updated model information, control may flow to block 2808; otherwise, control may be returned to a calling process. In at least one of the various embodiments, in some cases, the modeling engine and/or the learning engine may be arranged to process the raw sensor data to determine if one or more of the current models, if any, remain effective for mapping signals to trouble codes and/or predicting vehicle problems. However, in other cases, the models may have been modified enough to warrant updating vehicle monitoring client applications and/or installed sensor computers. In at least one of the various embodiments, one or more threshold values may be defined for determine if models need to be updated. In some embodiments, models may be continuously updated.

At block 2808, in at least one of the various embodiments, one or more client applications, client computers, sensor computers, or the like, or combination thereof, may be updated using the new/updated model information. In at least one of the various embodiments, the analysis server may maintain a list of registered vehicles that may be used for tracking the models and model versions used to monitor those vehicles. Accordingly, the analysis server may be arranged communicate the updated model information to one or more user mobile computers for use by their vehicle monitoring client applications. The vehicle monitoring client application may be arranged to communicate model information to the sensor computers as required.

Next, control may be returned to a calling process.

Figure 29:
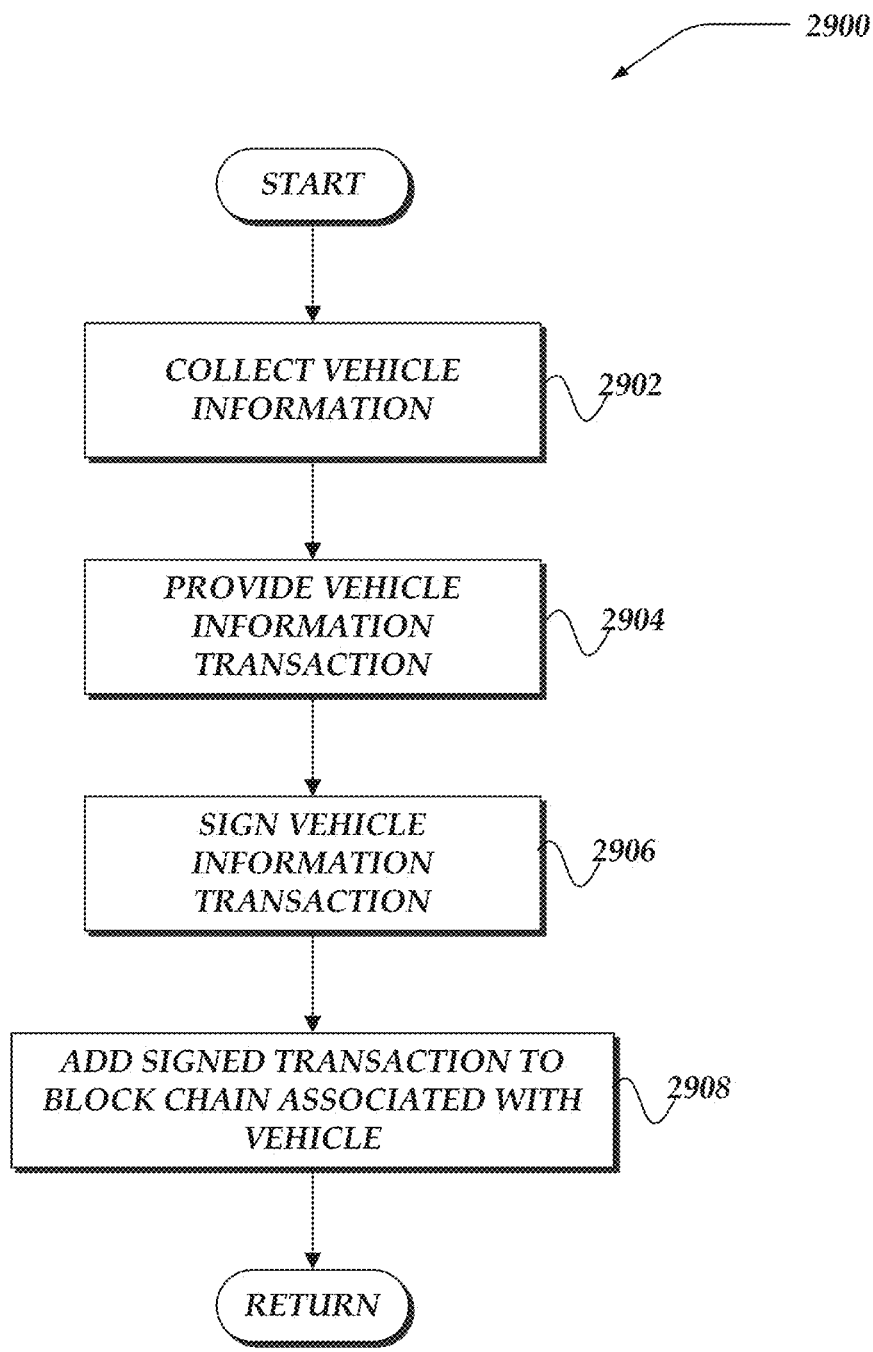
FIG. 29 illustrates a flowchart of one embodiment of a process for generating block chained ledger information regarding a monitored vehicle in accordance with at least one of the various embodiments.

FIG. 29 illustrates a flowchart of process 2900 for generating block chained ledger information regarding a monitored vehicle in accordance with at least one of the various embodiments. After a start block, at block 2902, in at least one of the various embodiments, information may be collected about/related to the vehicle. In at least one of the various embodiments, this information may be generated automatically by the analysis server, and may include records related to, trip reports, performance history, warnings/alerts generated, user/driver changes, performance changes in the vehicles, recall notices, or the like. In at least one of the various embodiments, the automatically generated information may be annotated by users, such as, drivers, authorized mechanics, or the like. In some embodiments, information may be user generated, such as, maintenance notes, or the like.

At block 2904, in at least one of the various embodiments, provide a vehicle transaction based on the vehicle information. One or more information entries associated with the monitored vehicle may be transformed and/or formatted in a vehicle information transaction record. In some embodiments, multiple information entries may be included on a single transaction.

At block 2906, in at least one of the various embodiments, the vehicle information transaction record may be signed to associated it with the monitored vehicle.

At block 2908, in at least one of the various embodiments, the signed transaction may be added to the block chain of vehicle transactions that may be associated with the vehicle. This block chain of vehicle information transactions may provide a ledger of events that is uniquely associated with an individual vehicles. Accordingly, each ledger entry may be signed using a signature value based on previous entries in the ledger. In some embodiments, the block chained ledger may enable a user to verify that the ledger entry has not been modified and that it is associated with a particular vehicle. For example, the root ledger entry may include a cryptographic signature based in part on the vehicle's unique vehicle identification number (VIN).

Next, control may be returned to a calling process.

Figure 30:
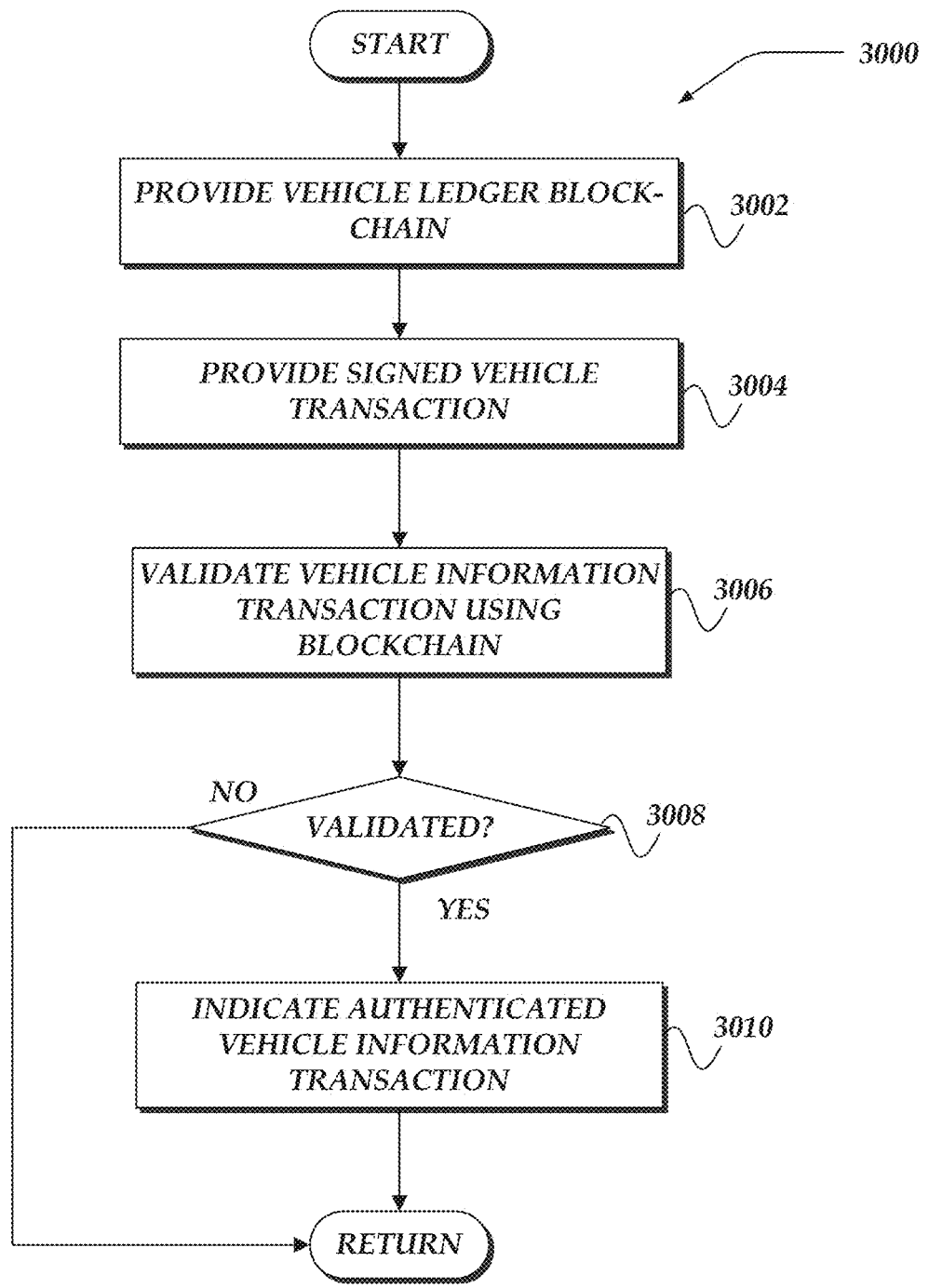
FIG. 30 illustrates a flowchart of one embodiment of a process for using block chained ledger information associated with a monitored vehicle in accordance with at least one of the various embodiments.

FIG. 30 illustrates a flowchart of process 3000 for using block chained ledger information associated with a monitored vehicle in accordance with at least one of the various embodiments. After a start block, at block 3002, in at least one of the various embodiments, a block-chained ledger associated with a vehicle may be provided. In some embodiments, the ledger may be confirmed to be associated with a particular vehicle by confirming that the root ledger entry has a signature that is consistent with the monitored vehicle's VIN.

At block 3004, in at least one of the various embodiments, one or more signed vehicle information transactions (ledger entries) may be provided. In at least one of the various embodiments, a user or application may obtain one or more ledger entries from various sources, such as, part of a maintenance record provided by a user car dealer before a sale of a previously owned vehicle. For example, the ledger entries may be provide to potential buyers to enable them to verify the operational history of the vehicle.

At block 3006, in at least one of the various embodiments, the vehicle information transaction may be authenticated based on the ledger block chain. In at least one of the various embodiments, block chain ledger entries may include information that defines an authoritative source that may be used to authenticate the provided for the ledger entries. Accordingly, the block chain may be examined to confirm that the provided ledger entries are authentic.

At decision block 3008, in at least one of the various embodiments, if the vehicle information transaction is authenticated, control may flow to bloc 3010; otherwise, the vehicle information transaction may be discarded and control returned to another process. At block 3010, in at least one of the various embodiments, the vehicle information transaction may be confirmed as representing information associated with the vehicle and provided to the user.

In at least one of the various embodiments, action performed by blocks 3004 through 3010 may be automated. For example, in at least one of the various embodiments, the vehicle monitoring client application may be arranged to automatically attempt to authenticate ledger entries for a vehicle.

Next, control may be returned to a calling process.

Figure 31:
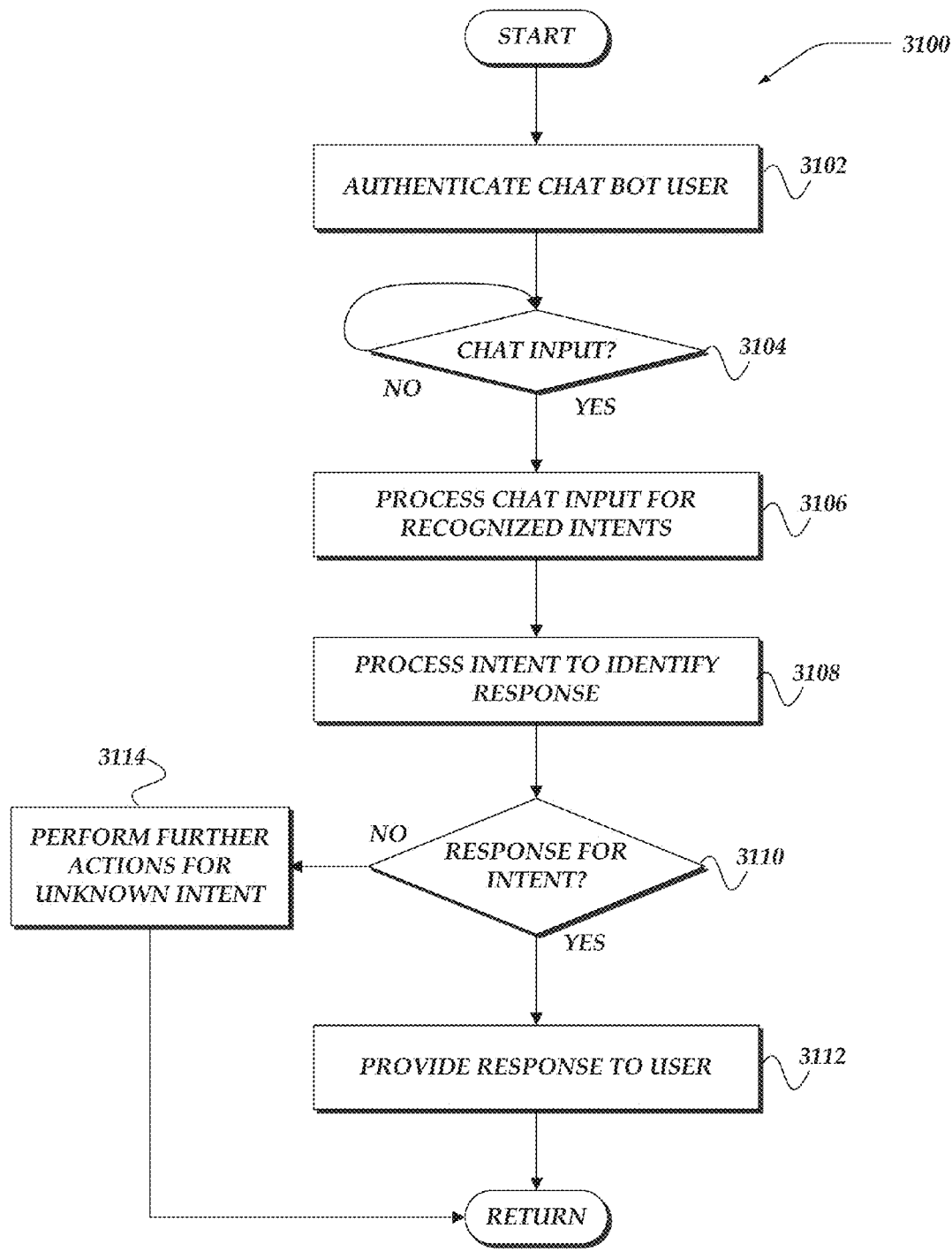
FIG. 31 illustrates a flowchart of one embodiment of a process for processing voice commands with a natural language interface in accordance with at least one of the various embodiments.

FIG. 31 illustrates a flowchart of process 3100 for processing commands with a natural language interface (e.g., chat bots) in accordance with at least one of the various embodiments. After a start block, at block 3102, in at least one of the various embodiments, the chat bot user may be authenticated. Various well-known methods, such as, passwords, biometrics, or the like may be employed to authenticate a user.

At decision block 3104, in at least one of the various embodiments, if chat input is received, control may flow to block 3106; otherwise, control may loop back to decision block 3104 to wait for chat input. In at least one of the various embodiments, chat inputs may be provided in various forms, through various channels, and/or in various formats, including, but not limited to, voice commands, chat messages, SMS messages, in-app text commands, user-interface prompts, or the like, or combination thereof.

At block 3106, in at least one of the various embodiments, the chat input may be processed to identify one or more intents that may be included in the chat inputs.

At block 3108, in at least one of the various embodiments, the intents included in the chat inputs may be further processed to match them to an appropriate response action.

At decision block 3110, in at least one of the various embodiments, if a response action is found for an intent, control may flow to block 3112; otherwise, control may flow to block 3114.

At block 3112, in at least one of the various embodiments, the response action may be performed. In some cases, the response action may comprise an answer to a user's question. For example, in embodiments, chat inputs such as "where is the spare tire for this car?" may result in a response action that may generate a message, using text and/or audio, such as, "behind the removable panel located near the driver-side rear wheel well." In some embodiments, the response actions may prompt the user for more chat inputs. Next, control may be returned to a calling process.

At block 3114, in at least one of the various embodiments, further actions may be performed to process intents that are not matched to a response action. In at least one of the various embodiments, unknown intents may trigger a real-time search action. In at least one of the various embodiments, the search action may search the knowledge base. Also, in at least one of the various embodiments, the search action may search the internet via one or more special purpose or general search engines. Further, in some embodiments, one or more operators may be notified that chat input has resulted in unknown intents. Accordingly, in at least one of the various embodiments, one or more operators may be notified to interpret the unknown intents to select/assign an appropriate response actions.

Next, control may be returned to a calling process.

Figure 32:
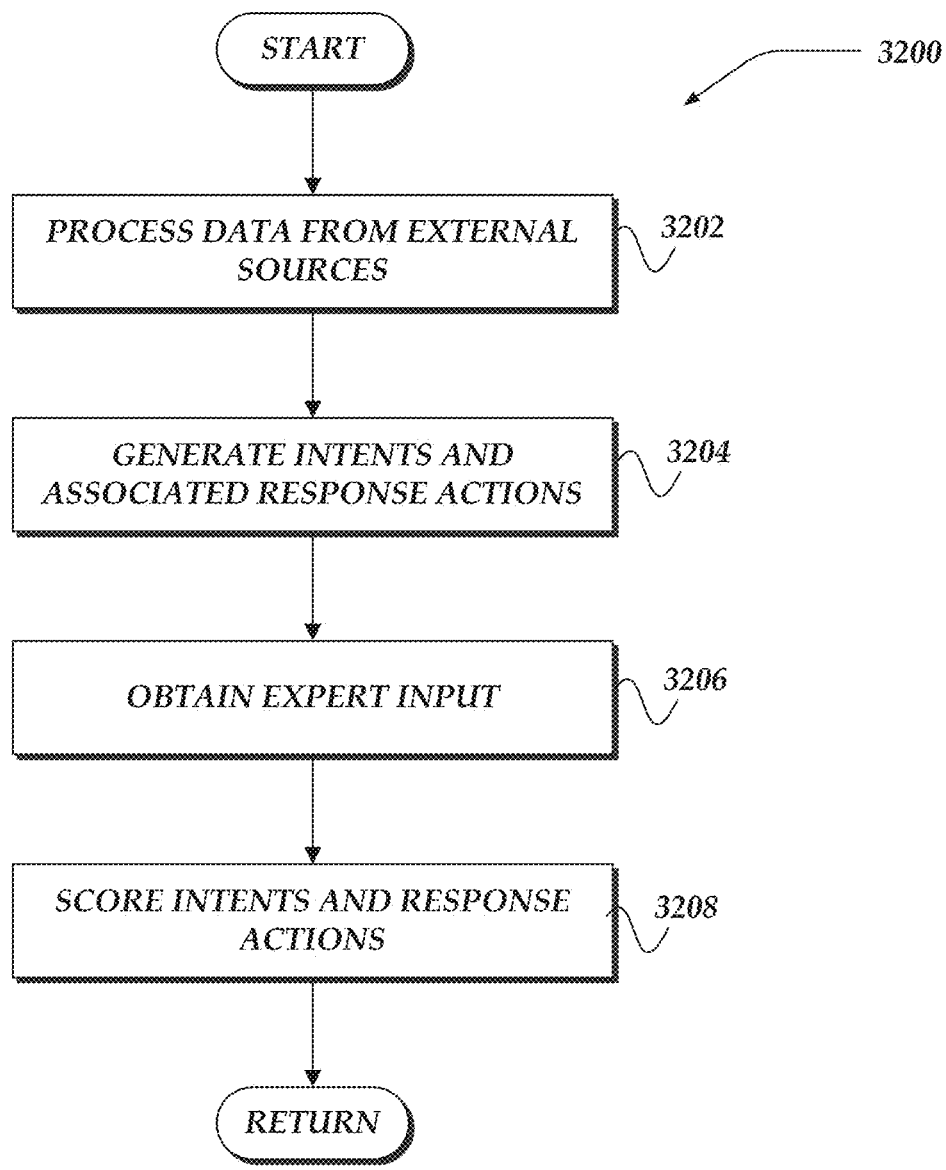
FIG. 32 illustrates a flowchart of one embodiment of a process for training a natural language interface in accordance with at least one of the various embodiments.

FIG. 32 illustrates a flowchart of process 3200 for training a natural language interface (e.g., chat bots) in accordance with at least one of the various embodiments. In at least one of the various embodiments, process 3200 may be trained to handle various types of inputs and output sources/methods, including, but not limited to, voice, text, user-interface prompts, or the like, or combination thereof. After a start block, at block 3202, in at least one of the various embodiments, data from one or more external information may be processed. In at least one of the various embodiments, one or more public question/answer forums and/or services may be scanned to find question answer pairs. For example, a web spider may crawl one or more well-known vehicle information website to find questions and answers.

At block 3204, in at least one of the various embodiments, intents and response actions may be generated from the collected information. In at least one of the various embodiments, the intents and their corresponding response actions may be stored in data store. Also, in some embodiments, intents and responses may be relevant for particular vehicles. Accordingly, in some embodiments, intent/response pairs may be associated one or more vehicle models.

At block 3206, in at least one of the various embodiments, expert user input may be obtained to correct, tune, and/or augment the automatically generated intents-response actions pairs.

At block 3208, in at least one of the various embodiments, the intents and response actions may be scored. In at least one of the various embodiments, users may be enabled to rate responses for relevancy, clarity, correctness, or the like. Likewise, in some embodiments, expert users may be enabled to score intent/response pairs.

Next, control may be returned to a calling process.

Figure 33:
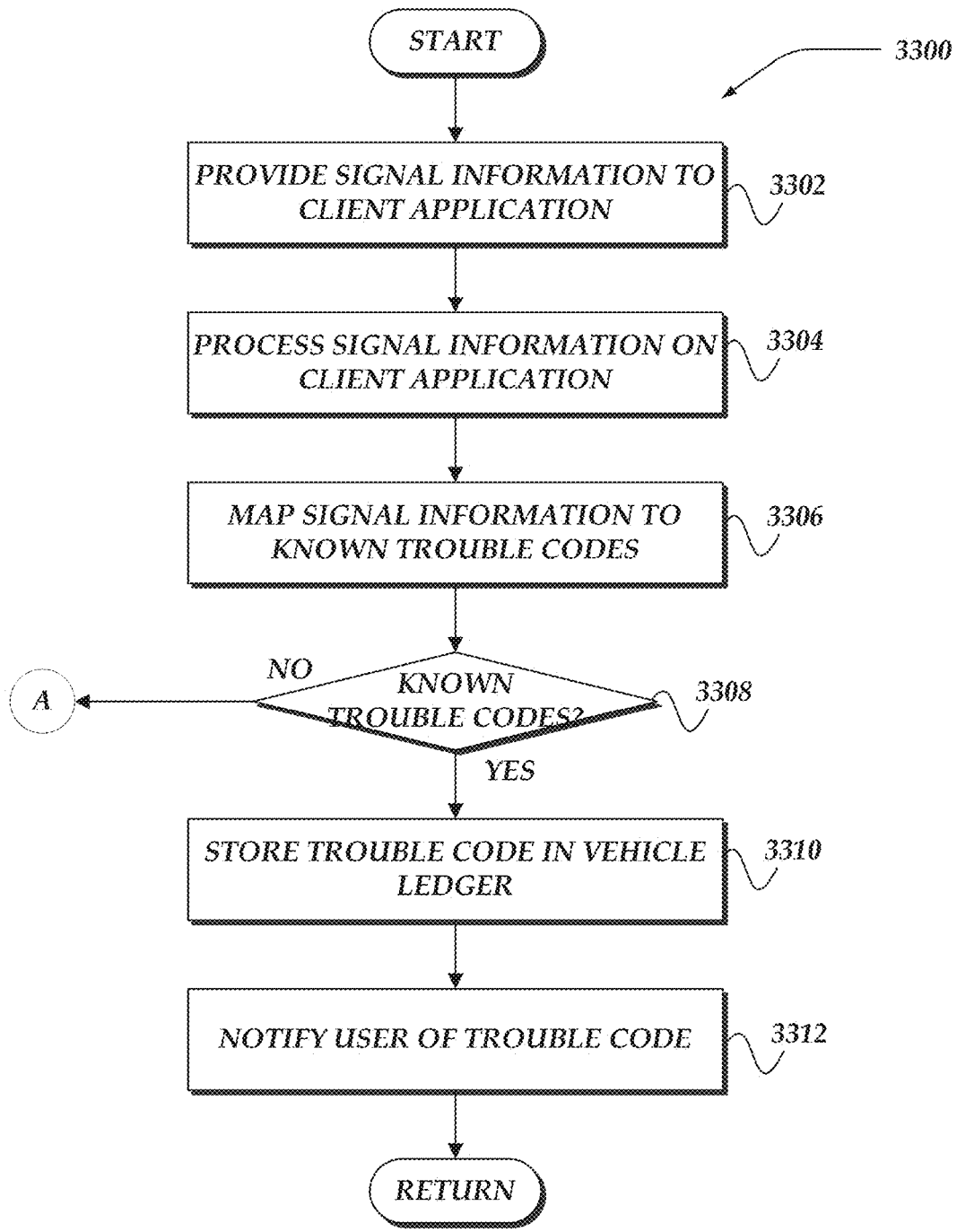
FIG. 33 illustrates a flowchart of one embodiment of a process for mapping trouble codes to signals in accordance with at least one of the various embodiments.

FIG. 33 illustrates a flowchart of process 3300 for mapping trouble codes to signals in accordance with at least one of the various embodiments. After a start block, at block 3302, in at least one of the various embodiments, signal information captured by a sensor computer may be provided to a vehicle monitoring client application. In some embodiments, the sensor computer may be arranged to perform some or all of process 3300.

At block 3304, in at least one of the various embodiments, the provided signal information may be processed. In at least one of the various embodiments, the signal information processing may include filtering, smoothing, transforming, or the like, or combination thereof.

At block 3306, in at least one of the various embodiments, the signal information may be mapped to known trouble codes.

At decision block 3308, in at least one of the various embodiments, if the trouble codes for the signal information are known, control may flow to block 3310; otherwise, control flow to process 3400 via flow connector A.

At block 3310, in at least one of the various embodiments, the trouble codes may be stored in records of the vehicle's vehicle ledger. In at least one of the various embodiments, block chained ledgers may be used. Accordingly, in some embodiments, the record may be cryptographically signed using the ledger's block-chain process.

At block 3312, in at least one of the various embodiments, the user may be notified of the trouble codes. User may be provided message based notifications, such as, emails, SMS texts, or the like, describing the trouble code. In some embodiments, the notification may be presented in a user interface on a client computer and/or on the sensor computer. Also, in some embodiment, the notifications may be displayed using the vehicle's on-board display.

Next, control may be returned to a calling process.

Figure 34:
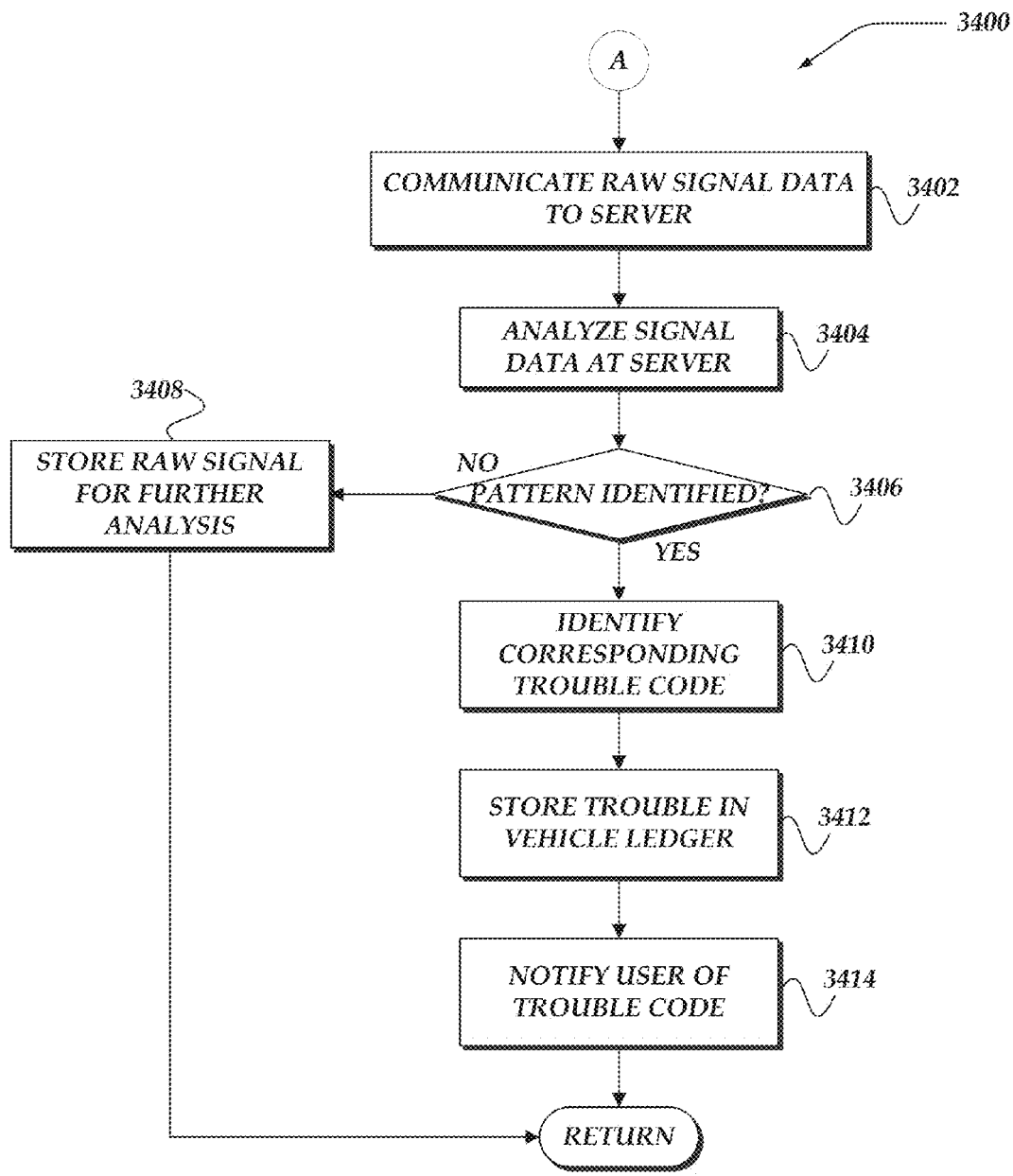
FIG. 34 illustrates a flowchart of one embodiment of a process for processing signal information that was not initially mapped to a trouble code in accordance with at least one of the various embodiments.

FIG. 34 illustrates a flowchart of process 3400 for processing signal information that was not initially mapped to a trouble code in accordance with at least one of the various embodiments. After flow connector A, at block 3402, in at least one of the various embodiments, the raw signal data that failed to map to a trouble code may be communicated to an analysis server.

At block 3404, in at least one of the various embodiments, the raw signal data may be analysis at the server. In at least one of the various embodiments, additional information stored in the knowledge base may be employed during this analysis.

At decision block 3406, in at least one of the various embodiments, if a pattern is identified, control may flow block 3410; otherwise, control may flow to block 3408.

At block 3408, in at least one of the various embodiments, since the raw signal could not be identified it may be stored for further analysis. Also, in at least one of the various embodiments, notifications may be provided to one or more operator users that unknown signal have been received. Next, control may be returned to a calling process.

At block 3410, in at least one of the various embodiments, since the pattern has been identified one or more trouble codes associated with the pattern may be identified.

At block 3412, in at least one of the various embodiments, the trouble codes may be stored in records of the vehicle's vehicle ledger. In at least one of the various embodiments, block chained ledgers may be used. Accordingly, in some embodiments, the record may be cryptographically signed using the ledger's block-chain process.

At block 3414, in at least one of the various embodiments, the user may be notified of the trouble codes. User may be provided message based notifications, such as, emails, SMS texts, chat notifications via the user's preferred social network, or the like, describing the trouble code. In some embodiments, the notification may be presented in a user interface on a client computer and/or on the sensor computer. Also, in some embodiment, the notifications may be displayed using the vehicle's on-board display. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of one or more CPUs, such as, Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. In at least one embodiment, one or more microcontrollers may be arranged to directly execute their own embedded logic to perform actions and access its own internal memory and its own external Input and Output Interfaces (e.g., hardware pins and/or wireless transceivers) to perform actions, such as Systems On a Chip (SOCs), or the like.

What is claimed as new and desired to be protected by Letters Patent of the United States is:

1. A method for monitoring vehicle operations, wherein one or more processors in a network computer execute instructions to perform actions, comprising:
   providing sensor information based on sensor data captured by a sensor computer installed in a vehicle;
   employing the provided sensor information to use the network computer to perform further actions, including:
      storing the sensor information in a memory;
      employing a local analysis engine to compare the sensor information to one or more vehicle models and one or more machine learning models that are based in part on one or more knowledge bases that include information from a plurality of other vehicles and determined habits of an operator of the vehicle, wherein the one or more vehicle models and the one or more machine learning models are updated with the information provided by the one or more knowledge bases and associated with the vehicle; and
      providing one or more reports based on the comparison, wherein the one or more reports are distributed to one or more registered subscribers.

2. The method of claim 1, wherein the sensor computer is installed, to directly capture the sensor information, on one or more of a dashboard of the vehicle, the steering wheel of the vehicle, or a steering column of the vehicle.

3. The method of claim 1, further comprising:
   employing a modeling engine to update the one or more vehicle models based in part on the sensor information; and
   communicating the one or more updated vehicle models to one or more client computers associated with one or more users.

4. The method of claim 1, further comprising:
   employing the sensor computer to capture sensor data during operation of the vehicle;
   employing the sensor computer to compare the sensor data to one or more vehicle baselines models; and
   based on the comparison indicating an anomaly, communicating the sensor information to a client computer operated by a user of the vehicle, wherein the sensor information is based in part on the sensor data captured by the sensor computer.

5. The method of claim 1, further comprising:
   mapping one or more portions of the signal information to one or more trouble codes, wherein the one or more trouble codes are associated with one or more vehicle systems that generate vibrations, including one or more of tires, wheels, alignment, suspension, engine, electric motor, or brakes.

6. The method of claim 1, wherein the sensor information, further comprises, one or more metrics associated with the current operation of the vehicle, wherein the metrics include one or more of, timestamps, road shocks, straight line driving, harshness, acceleration, deceleration, trip length, hard starts, hard stops, accidents, highway driving, city driving, being stopped, enroute, or travel speeds.

7. The method of claim 1, further comprising, employing a natural language engine to provide one or more response actions based on one or more chat inputs from one or more users of the vehicle.

8. The method of claim 1, further comprising:
   collecting vehicle information from one or more data sources;
   providing one or more intents that are associated with one or more responses; and
   updating a natural language engine to use the one or more intents and the one or more associated responses.

9. A system for monitoring vehicle operations comprising:
   a network computer, comprising:
      a transceiver that communicates over a network;
      a memory that stores at least instructions; and
      one or more processors that execute instructions that perform actions, including:
         when sensor information based on sensor data captured by a sensor computer installed in a vehicle is provided, performing further actions, including:
            storing the sensor information in a memory;
            employing a local analysis engine to compare the sensor information to one or more vehicle models and one or more machine learning models that are based in part on one or more knowledge bases that include information from a plurality of other vehicles and determined habits of an operator of the vehicle, wherein the one or more vehicle models and the one or more machine learning models are updated with the information provided by the one or more knowledge bases and associated with the vehicle; and
            providing one or more reports based on the comparison, wherein the one or more reports are distributed to one or more registered subscribers; and
   a client computer, comprising,
      a transceiver that communicates over the network;
      a memory that stores at least instructions; and
      one or more processors that execute instructions that perform actions, including:
         obtaining the sensor information from the sensor computer; and
         providing the sensor information to the network computer; and the sensor computer, comprising:
- a transceiver that communicates over the network with the client computer;
- a memory that stores at least instructions;
- one or more processors that execute instructions that perform actions, including:
  - capturing sensor data.

10. The system of claim 9, wherein the sensor computer is installed, to directly capture the sensor information, on one or more of a dashboard of the vehicle, the steering wheel of the vehicle, or a steering column of the vehicle.

11. The system of claim 9, wherein the network computer performs actions, further comprising:
- employing a modeling engine to update the one or more vehicle models based in part on the sensor information; and
- communicating the one or more updated vehicle models to one or more client computers associated with one or more users.

12. The system of claim 9, further comprising:
- employing the sensor computer to capture sensor data during operation of the vehicle;
- employing the sensor computer to compare the sensor data to one or more vehicle baselines models; and
- when the comparison indicates an anomaly, communicating the sensor information to a client computer operated by a user of the vehicle, wherein the sensor information is based in part on the sensor data captured by the sensor computer.

13. The system of claim 9, further comprising:
- mapping one or more portions of the signal information to one or more trouble codes, wherein the one or more trouble codes are associated with one or more vehicle systems that generate vibrations, including one or more of tires, wheels, alignment, suspension, engine, electric motor, or brakes.

14. The system of claim 9, wherein the sensor information, further comprises, one or more metrics associated with the current operation of the vehicle, wherein the metrics include one or more of, timestamps, road shocks, straight line driving, harshness, acceleration, deceleration, trip length, hard starts, hard stops, accidents, highway driving, city driving, being stopped, enroute, or travel speeds.

15. The system of claim 9, further comprising, employing a natural language engine to provide one or more response actions based on one or more chat inputs from one or more users of the vehicle.

16. The system of claim 9, wherein the network computer performs actions, further comprising:
- collecting vehicle information from one or more data sources;
- providing one or more intents that are associated with one or more responses; and
- updating a natural language engine to use the one or more intents and the one or more associated responses.

17. A network computer for monitoring vehicle operations, comprising:
- a transceiver that communicates over a network;
- a memory that stores at least instructions; and
- one or more processors that execute instructions that perform actions, including:
  - when sensor information based on sensor data captured by a sensor computer installed in a vehicle is provided, performing further actions, including:
    - storing the sensor information in a memory;
    - employing a local analysis engine to compare the sensor information to one or more vehicle models and one or more machine learning models that are based in part on one or more knowledge bases that include information from a plurality of other vehicles and determined habits of an operator of the vehicle, wherein the one or more vehicle models and the one or more machine learning models are updated with the information provided by the one or more knowledge bases and associated with the vehicle; and
  - providing one or more reports based on the comparison, wherein the one or more reports are distributed to one or more registered subscribers.

18. The network computer of claim 17, wherein the sensor computer is installed, to directly capture the sensor information, on one or more of a dashboard of the vehicle, the steering wheel of the vehicle, or a steering column of the vehicle.

19. The network computer of claim 17, further comprising:
- employing a modeling engine to update the one or more vehicle models based in part on the sensor information; and
- communicating the one or more updated vehicle models to one or more client computers associated with one or more users.

20. The network computer of claim 17, further comprising:
- employing the sensor computer to capture sensor data during operation of the vehicle;
- employing the sensor computer to compare the sensor data to one or more vehicle baselines models; and
- when the comparison indicates an anomaly, communicating the sensor information to a client computer operated by a user of the vehicle, wherein the sensor information is based in part on the sensor data captured by the sensor computer.

21. The network computer of claim 17, further comprising:
- mapping one or more portions of the signal information to one or more trouble codes, wherein the one or more trouble codes are associated with one or more vehicle systems that generate vibrations, including one or more of tires, wheels, alignment, suspension, engine, electric motor, or brakes.

22. The network computer of claim 17, wherein the sensor information, further comprises, one or more metrics associated with the current operation of the vehicle, wherein the metrics include one or more of, timestamps, road shocks, straight line driving, harshness, acceleration, deceleration, trip length, hard starts, hard stops, accidents, highway driving, city driving, being stopped, enroute, or travel speeds.

23. The network computer of claim 17, further comprising, employing a natural language engine to provide one or more response actions based on one or more chat inputs from one or more users of the vehicle.

24. A processor readable non-transitory storage media that includes instructions for monitoring vehicle operations, wherein execution of the instructions by one or more processors performs actions, comprising:
- when sensor information based on sensor data captured by a sensor computer installed in a vehicle is provided, employing a network computer to perform further actions, including:
  - storing the sensor information in a memory;
  - employing a local analysis engine to compare the sensor information to one or more vehicle models and one or more machine learning models that are based in part on one or more knowledge bases that include information from a plurality of other vehicles and determined habits of an operator of the vehicle, wherein the one or more vehicle models and the one or more machine learning models are updated with the information provided by the one or more knowledge bases and associated with the vehicle; and providing one or more reports based on the comparison, wherein the one or more reports are distributed to one or more registered subscribers.

25. The media of claim 24, wherein the sensor computer is installed, to directly capture the sensor information, on one or more of a dashboard of the vehicle, the steering wheel of the vehicle, or a steering column of the vehicle.

26. The media of claim 24, further comprising:

employing a modeling engine to update the one or more vehicle models based in part on the sensor information; and communicating the one or more updated vehicle models to one or more client computers associated with one or more users.

27. The media of claim 24, further comprising:

employing the sensor computer to capture sensor data during operation of the vehicle;

employing the sensor computer to compare the sensor data to one or more vehicle baselines models; and when the comparison indicates an anomaly, communicating the sensor information to a client computer operated by a user of the vehicle, wherein the sensor information is based in part on the sensor data captured by the sensor computer.

28. The media of claim 24, further comprising:

mapping one or more portions of the signal information to one or more trouble codes, wherein the one or more trouble codes are associated with one or more vehicle systems that generate vibrations, including one or more of tires, wheels, alignment, suspension, engine, electric motor, or brakes.

29. The media of claim 24, wherein the sensor information, further comprises, one or more metrics associated with the current operation of the vehicle, wherein the metrics include one or more of, timestamps, road shocks, straight line driving, harshness, acceleration, deceleration, trip length, hard starts, hard stops, accidents, highway driving, city driving, being stopped, enroute, or travel speeds.

30. The media of claim 24, further comprising, employing a natural language engine to provide one or more response actions based on one or more chat inputs from one or more users of the vehicle.

* * * * *

UNITED STATES PATENT AND TRADEMARK OFFICE
CERTIFICATE OF CORRECTION

Page 1 of 3

PATENT NO. : 9,779,557 B2
APPLICATION NO. : 15/233840
DATED : October 3, 2017
INVENTOR(S) : Hauser et al.

It is certified that error appears in the above-identified patent and that said Letters Patent is hereby corrected as shown below:

On the Title Page

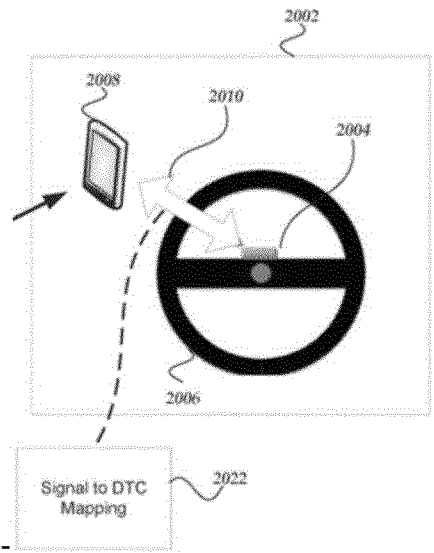

The Figure, should read -- --, therefor.

In the Drawings

In Fig. 5, Sheet 5 of 34, delete "SELECTION (PRESS ONCE" and insert -- SELECTION (PRESS ONCE) --, therefor.

In Fig. 10, Sheet 10 of 34, delete "START CALIBRATE" and insert -- START CALIBRATION --, therefor.

In Fig. 19, Sheet 19 of 34, for Tag "1906", Lines 1-2, delete "Accellerometer/Gyro" and insert -- Accelerometer/Gyro --, therefor.

Signed and Sealed this
Fourth Day of June, 2019

Andrei Iancu
*Director of the United States Patent and Trademark Office*

CERTIFICATE OF CORRECTION (continued)

U.S. Pat. No. 9,779,557 B2

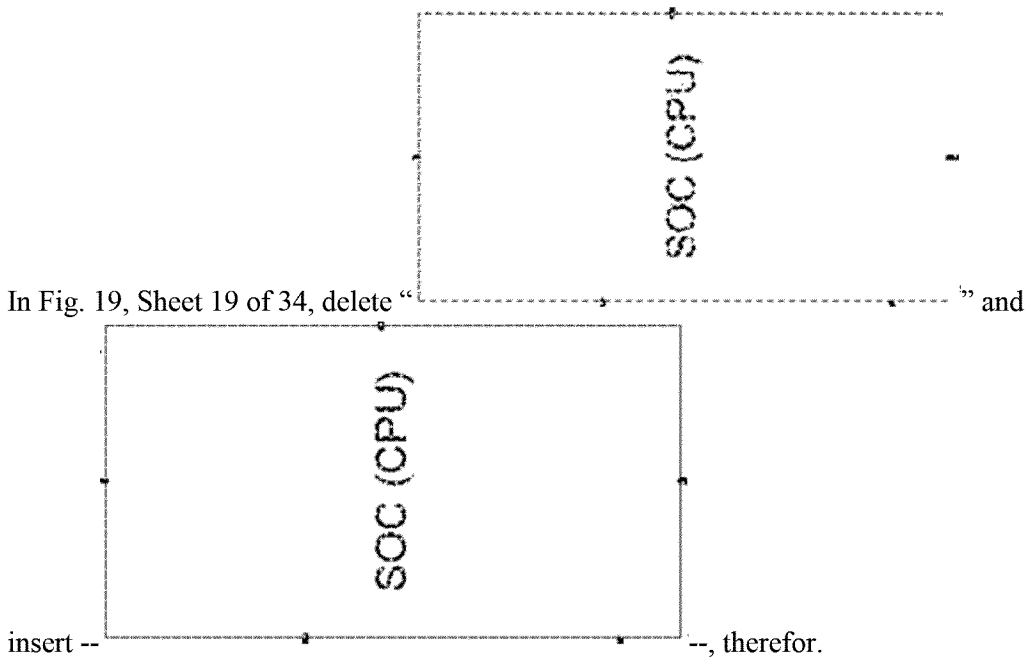

In Fig. 19, Sheet 19 of 34, delete " " and insert -- --, therefor.

In the Specification

In Column 1, Line 7, delete "Application U.S." and insert -- Application --, therefor.

In Column 2, Line 10, delete "a Engine" and insert -- an Engine --, therefor.

In Column 2, Line 20, delete "a Factors" and insert -- Factors --, therefor.

In Column 7, Line 10, delete "(20, 26))" and insert -- (20, 26) --, therefor.

In Column 7, Line 22, delete "(20, 26))" and insert -- (20, 26) --, therefor.

In Column 13, Line 33, delete "a Factors" and insert -- Factors --, therefor.

In Column 15, Line 51, delete "(4G)" and insert -- (4G), --, therefor.

In Column 15, Line 59, delete "Mobil" and insert -- Mobile --, therefor.

In Column 15, Line 61, delete "Enhanced Data GSM Environment (EDGE)," and insert -- Enhanced Data rates for GSM Evolution (EDGE), --, therefor.

In Column 17, Line 46, delete "OSI model for mobile communication (GSM)," and insert -- OSI model for global system for mobile communication (GSM), --, therefor.

In Column 17, Line 48, delete "SIP/RTP, GPRS," and insert -- SIP/RTP, --, therefor.

In Column 18, Line 62, delete "the may" and insert -- that may --, therefor.

CERTIFICATE OF CORRECTION (continued)
U.S. Pat. No. 9,779,557 B2

In Column 23, Lines 38-39, delete "external data 1814" and insert -- external data 1812 --, therefor.

In Column 26, Line 59, delete "the may" and insert -- there may --, therefor.

In Column 27, Line 16, delete "analysis server computer 2014," and insert -- analysis server computer 2016, --, therefor.

In Column 27, Lines 39-40, delete "analysis server computer 2006" and insert -- analysis server computer 2016 --, therefor.

In Column 27, Lines 44-45, delete "sensor computer 2002" and insert -- sensor computer 2004 --, therefor.

In Column 28, Lines 7-8, delete "sensor computer 2002" and insert -- sensor computer 2004 --, therefor.

In Column 34, Line 22, delete "flow" and insert -- flow to --, therefor.

In Column 34, Line 23, delete "2406" and insert -- 2406. --, therefor.

In Column 35, Line 63, delete "are to forwarded" and insert -- are to be forwarded --, therefor.

In Column 39, Line 30, delete "associated it" and insert -- associate it --, therefor.

In Column 42, Line 20, delete "flow" and insert -- flow to --, therefor.